US012124554B2

(12) United States Patent
Sharieh et al.

(10) Patent No.: US 12,124,554 B2
(45) Date of Patent: Oct. 22, 2024

(54) IMAGE RECOGNITION REVERSE TURING TEST SYSTEM

(71) Applicant: ROYAL BANK OF CANADA, Toronto (CA)

(72) Inventors: Salah Sharieh, Toronto (CA); Nebojsa Djosic, Toronto (CA); Bingzhou Zheng, Toronto (CA); Bojan Nokovic, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 0 days.

(21) Appl. No.: 16/913,465

(22) Filed: Jun. 26, 2020

(65) Prior Publication Data

US 2020/0410082 A1 Dec. 31, 2020

Related U.S. Application Data

(60) Provisional application No. 62/867,307, filed on Jun. 27, 2019.

(51) Int. Cl.
*G06F 21/36* (2013.01)
*G06F 16/54* (2019.01)
(Continued)

(52) U.S. Cl.
CPC .............. *G06F 21/36* (2013.01); *G06F 16/54* (2019.01); *G06V 10/945* (2022.01); *H04L 63/10* (2013.01);
(Continued)

(58) Field of Classification Search
CPC ........ G06F 21/36; G06F 16/54; G06F 3/0482; G06F 2221/2133; G06K 9/62; G06K 9/6253; G06K 9/6282; H04L 63/10
See application file for complete search history.

(56) References Cited

U.S. PATENT DOCUMENTS

2008/0066014 A1* 3/2008 Misra ............... G06F 21/36
715/846
2011/0208716 A1* 8/2011 Liu ............... G06F 16/583
707/E17.108
(Continued)

OTHER PUBLICATIONS

Chan, P.K., Stolfo, S.J .: Toward scalable learning with non-uniform class and cost distributions: a case study in credit card fraud detection. In: KDD 1998 (1998).
(Continued)

*Primary Examiner* — Cesar B Paula
*Assistant Examiner* — John M Heffington
(74) *Attorney, Agent, or Firm* — Norton Rose Fulbright Canada LLP

(57) ABSTRACT

Computer implemented methods and systems are provided for controlling access to one or more computational resources by discriminating between a human user or an automated process. An example system comprises one or more computer processors operating in conjunction with computer memory and data storage to render a set of question images including at least two images having one or more inter-image visually ascertainable relationships, and at least one image having one or more intra-image visually ascertainable relationships, the inter-image visually ascertainable relationships and the intra-image visually ascertainable relationships having one overlapping visually ascertainable relationship. The system further renders a set of candidate answer images including at least an incorrect subset of images and a correct subset of images portraying the overlapping visually ascertainable relationship, and determines whether to grant access to the one or more computational resources based upon a user selection from the set of candidate answer images.

20 Claims, 26 Drawing Sheets

(51) Int. Cl.
*G06V 10/94* (2022.01)
*H04L 9/40* (2022.01)
*G06F 3/0482* (2013.01)

(52) U.S. Cl.
CPC .... *G06F 3/0482* (2013.01); *G06F 2221/2133* (2013.01)

(56) References Cited

U.S. PATENT DOCUMENTS

| | | | | |
|---|---|---|---|---|
| 2015/0143495 | A1* | 5/2015 | Okada | H04L 63/08 726/7 |
| 2016/0004856 | A1* | 1/2016 | Wang | G06F 3/04883 726/7 |
| 2016/0275304 | A1* | 9/2016 | Jiang | G06F 21/36 |
| 2016/0328551 | A1* | 11/2016 | Thompson | G06F 21/36 |
| 2017/0011279 | A1* | 1/2017 | Soldevila | G06V 30/194 |
| 2019/0116136 | A1* | 4/2019 | Baudart | H04L 63/1433 |
| 2021/0125001 | A1* | 4/2021 | Guo | G06F 16/55 |

OTHER PUBLICATIONS

Chu, Z., Gianvecchio, S., Koehl, A., Wang, H., Jajodia, S.: Blog or block: Detecting blog bots through behavioral biometrics. Computer Networks 57, 634-646 (2013).

Cresci, S., Pietro, R.D., Petrocchi, M., Spognardi, A., Tesconi, M.: Fame for sale: efficient detection of fake twitter followers. CoRR abs/1509.04098 (2015), http://arxiv.org/abs/1509.04098.

Hinton, A., Kwiatkowska, M., Norman, G., Parker, D.: PRISM: A tool for automatic verification of probabilistic systems. In: Hermanns, H., Palsberg, J. (eds.) Proc. 12th International Conference on Tools and Algorithms for the Construction and Analysis of Systems. Lecture Notes in Computer Science, vol. 3920, pp. 441-444. Springer (2006).

Igal, Z.: Bot Traffic Report 2016. https://www.incapsula.com/blog/bot-trafficreport-2016.html (Feb. 2019).

Khomh, F., Adams, B., Cheng, J., Fokaefs, M., Antoniol, G.: Software engineering for machine-learning applications: The road ahead. IEEE Software 35(5), 81-84 (Sep./Oct. 2018).

Kwiatkowska, M., Norman, G., Parker, D.: Prism 4.0: Verification of probabilistic real-time systems. In: Gopalakrishnan, G., Qadeer, S. (eds.) Computer Aided Verification. Lecture Notes in Computer Science, vol. 6806, pp. 585-591. Springer Berlin Heidelberg (2011).

Morstatter, F., Wu, L., Nazer, T.H., Carley, K.M., Liu, H.: A new approach to bot detection: Striking the balance between precision and recall. In: 2016 IEEE/ACM International Conference on Advances in Social Networks Analysis and Mining (ASONAM). pp. 533-540 (Aug. 2016). https://doi.org/10.1109/ASONAM.2016.7752287.

Nokovic, B., Sekerinski, E.: Verification and code generation for timed transitions in pcharts. In: Proceedings of the International C* Conference on Computer Science and Software Engineering. C3S2E '14, ACM, New York, NY, USA (2014).

Oeltjen, J.: Authentication and machine learning: Taking behavior recognition to a new level, Jan. 2017.

University of Oxford.: PRISM. http://www.prismmodelchecker.org/ , Dec. 2012.

Van Der Walt, E., Eloff, J.: Using machine learning to detect fake identities: Bots vs humans. IEEE Access 6, 6540 {6549 (2018).

Villamarin-Salomón, R., Brustoloni, J.C.: Bayesian bot detection based on DNS traffic similarity. In: Proceedings of the 2009 ACM Symposium on Applied Computing. pp. 2035-2041. SAC '09, ACM, New York, NY, USA (2009).

Zhao, D., Traore, I., Sayed, B., Lu, W., Saad, S., Ghorbani, A., Garant, D.: Botnet detection based on traffic behavior analysis and flow intervals. Computers & Security 39 (Nov. 2013).

* cited by examiner

```
<Story Challenge 1>                              ~ 2400
   <Image1="Cat">                                ~ 2402
      <inter-image_relation_Mouse1>animal, feeding, chasing, skittish, flexible,
      unpredictable, hunting, stalking, </inter-image_relations_Mouse1>     ~ 2408
      <difficulty_Mouse1>2</difficulty>                                      ~ 2412
      <inter-image_relation_Lion1> animal, feeding, family, growth, brothers, ~ 2410
      sisters, adulthood </inter-image_relations_Lion1>
      <difficulty_Lion1>1</difficulty>                                       ~ 2412
      <Region>Global</Region>                                                ~ 2414
   </Image1>
   <Image2="Mouse1">                              ~ 2404
      <inter-image_relation_Cat1>animal, feeding, chasing, skittish, flexible,
      unpredictable, hunting, stalking, </inter-image_relations_Mouse1>     ~ 2408
      <difficulty_Mouse1>2</difficulty>                                      ~ 2412
      <Region>Global</Region>                                                ~ 2414
   </Image2>
   <Image3="Cat and Kitten"">                     ~ 2406
      <intra-image_relation>motherhood, feeding, family, nurturing intra-    ~ 2416
      image_relation>
      <difficulty_Cat1_Mouse1>2</difficulty>                                 ~ 2418
      <Region>Global</Region>
   </Image3>
</Story Challenge 1>
```

FIG. 24

IMAGE RECOGNITION REVERSE TURING TEST SYSTEM

CROSS REFERENCE

This application is a non-provisional of, and claims all benefit, including priority of U.S. Provisional Application No. 62/867,307 filed Jun. 27, 2019, entitled "IMAGE RECOGNITION REVERSE TUNING TEST SYSTEM", incorporated herein by reference in its entirety.

FIELD

Embodiments of the present disclosure generally relate to the field of mechanisms for machine/human discrimination, and more specifically, embodiments relate to devices, systems and methods for discriminating between machine and human controlled agents ("users") using media objects presented having at least one common inner and outer relations.

INTRODUCTION

The majority of web traffic is created by software applications called web robots or "bots". Bots can be divided into two groups; good bots and bad bots.

Good bots are used for website health checks, to conduct testing, to extract authorized data, to collect data for search engine algorithms, etc. Bad bots are used to bypass security using false identity, to extract unauthorized data, inject spam links, conduct unwanted scraping, malware, etc. Bad bots that present false identity to bypass security are referred to as impersonators or malicious automated processes and create up to 84% of all bad bot web traffic. Bad bots can consume large amounts of electronic resources, increasing the cost of running a particular platform, or end up slowing down the system for other users.

Bad bots try to mimic human behaviour to bypass security tools. Existing approaches to combat bad bots include the use of identity assurance in place of or supplementing security tools to catch and remove bad bots. However, identity assurance mechanisms can be difficult and expensive to implement. Existing approaches also include personal verification questions (PVQ), which can suffer as a result of users providing the PVQ data to others, or users using predictable PVQs that are comparatively easily determined (e.g., their home address, name of children, etc.).

Improved security mechanisms which can distinguish between agents operated by one and more of good bots, bad bots and users are desirable.

SUMMARY

An authentication system is described herein that may provide a more accurate means of distinguishing between agents operated by a malicious automated process (bad bot, hereinafter referred to simply as a bot), a good bot, and a human user. The authentication system includes a set of question media objects and a set of candidate answer media objects that are rendered on the display of the target device being operated by the user being authenticated. In some cases, even non-malicious bots are desired to be caught, identified, and/or denied access (e.g., when resources are limited to handle many requests, so web-scraping is not permitted).

The technical challenges associated with distinguishing between agents operated by malicious automated processes, so called good bots, and human users is that the malicious automated processes are continually being updated to adapt to new authentication challenges. The further technical challenges associated with distinguishing between agents operated by malicious automated processes and other users is that the field of machine learning has greatly increased the capability of automated processes to navigate traditional authentication challenges which rely on media objects. For example, malicious automated processes, as a result of machine learning, are much better at identifying or naming an object portrayed in an image.

A further technical challenge to identifying malicious automated processes is that the malicious automated processes evolve over time. As the automated processes increase in sophistication, which may be a result of increased availability of data sets for the automated process to analyse, authentication systems need to have a means of adapting to or incorporating a new automated process capability. Existing bots have already undergone significant changes include the incorporation of machine learning, and rudimentary machine vision/object recognition tools into the bot architecture. For example, a "captcha" mechanism that utilizes a basic human recognition gatekeeper mechanism such as "click all of the traffic lights", "click all of the sidewalk crossings", can now be defeated by a bot that uses object recognition approaches on the pictures shown. In this example, the bot would simply run a trained machine vision object detection neural network to computationally estimate the likelihood of the target object in the various images.

Another technical challenge is that the authentication system must be able to utilize available data sets which are readily interpretable by both humans and machines but have different possible outcomes depending on whether the machine or the human is interpreting the data. Typically available media objects are used, however with the increase of machine learning architectures embedded into malicious automated processes, the technical challenge of utilizing existing media object data sets to convey differing information to a malicious automated process and a human exists. In some embodiments, these types of outcomes can be used to establish "traps" where the selected trap answer is more indicative of a machine.

Furthermore, as described in some embodiments below, approaches are utilized to modify how the specific media objects (e.g., icons, images) are organized on a display for increasing a difficulty level for bots/machines. The specific arrangement and placement for rendering on a graphical user interface can be modified such that certain objects are not positionally proximate to one another by manipulating the order in which they are rendered. The graphical user interface, in this example, would determine and modify the placement of the images having the "outer relation" as described herein such that they are not consecutive, yielding an improved user interface for electronic devices.

The proposed authentication system includes a set of question media objects (for example, images) which a user of a target system (e.g., the user seeking access to a computing resource) needs to interpret to determine an overlapping visually ascertainable relationship in order to correctly select the correct media object from a set of candidate answer media objects (for example, images). The set of question media objects includes at least two images having one or more inter-image visually ascertainable relationships (alternatively referred to as the images having an outer relation) and at least one image having one or more intra-image visually ascertainable relationships (alternatively referred to as the image having an inner relation)

which the user interprets to determine the overlapping visually ascertainable relationship.

Repositories can be maintained where sets of images are stored along with their associated metadata indicating intra-image or inter-image relationships (e.g., as between tuples of images). The metadata for inter-image relationships can be stored as pairwise (or n-object-wise) matrices or vectors, and in some embodiments, can include directionality. In an example, CAT-MOUSE (e.g., animals, mammals, cat->feeds on->mouse, cat->chases->mouse, mouse->flees from->cat, cat->larger than->mouse), among others. The metadata for intra-image relationships can be stored corresponding to each image (e.g., image45=cat nursing kittens, metadata: feeding, animals, offspring).

As described herein, there may be technical approaches for selecting objects from repositories that add additional layers of technical protection against malicious bots (e.g., selecting "seed" or "base images" that already have a low machine object detection score (e.g., an adversarial example of a panda image that has been altered to read as a gibbon), and then using that for selecting the other objects (e.g., then selecting an image of bamboo, and then selecting the cat nursing kitten images, respectively). Separate repositories can be used for metadata, inner relation data objects, outer relation data objects, etc. There may be a further repository for "noise" data objects that are used for incorrect answers.

The inter-image visually ascertainable relationships can be one or more relationships shared between objects in the outer relation images. For example, an image of a cat and mouse can have multiple inter-image relationships, not limited to both objects being mammals, being below a certain size, having fur, having teeth, being common in similar geographic areas, and so forth. These relationships can be tracked in the form of metadata as described above.

The intra-image visually ascertainable relationships can be one or more relationships shared between objects in the inner relation image itself, or a specific concept being shown in the inner relation image. For example, an image which contains a balloon and a pump can represent the interrelation of growth or inflation. In a further example, an image of a cat nursing kittens can represent or portray the relation of feeding between the object and the kitten object in the inner relation image. These relationships can be tracked in the form of metadata as described above.

In some embodiments, the object shown in the images is a partial object, or a representation of a concept or an idea, or an incomplete object, and variants thereof. For example, the object shown in image can include a smiling mouth, half of a moustache, a clearly incomplete drawing, and the like.

An agent, possibly operated by a human, is provided a set of instructions to, when viewing the set of question images, to find an outer relation common to the two outer relation images, which outer relation is shown or portrayed in the relationship between the multiple objects in the interrelation image. For example, the set of question images can include a picture of a cat mouse and a picture of a cat nursing kittens. The human user may correctly identify that the cat and mouse picture share an outer relation, namely that cats eat mice. This outer relation of feeding, or eating, would overlap (or be in common) with the inner relation of nursing or feeding shown in the image of a cat nursing kittens. The system automatically obtains these image objects from the repositories and selects the image objects that correspond to the inner relation, and the outer relation, with only one possible overlap/commonality between the inner relation and outer relation that is then utilized for selecting a correct answer image object among a set of candidate image objects.

Therefore, when the user is prompted with a set of candidate answer images, a human user would know to select the image which portrays the overlapping relation of feeding or nursing. The relation, in this example, is selected such that there is a unique common/overlapping inner and outer relation, which is then rendered as one of the answer objects for selection.

As the authentication system relies upon inner and outer relationships, which although visually ascertainable by a human, are not directly associated with identifying the objects displayed in the image, the authentication system may be able to overcome the technical challenge of incorporating available data sets to provide for predictable different outcomes when the data sets are interpreted by a human as compared to a malicious automated process. The system is thus able to defeat technical challenges where the automated process is coupled with object recognition machine learning and is a technical improvement over other approaches, such as asking a human to conduct object identification (pick all stop signs).

Similarly, as the system relies upon outer relationships which are revealed or narrowed based on an inner relation, the system may be able to overcome the technical challenge of adapting to increased bot ability to interpret objects in images by relying upon a relationship which is not inherently visible when viewing a single image. These relationships are not readily ascertained from an automated machine recognition engine, and provide a useful mechanism for requiring human-level pattern recognition and context, which significantly raises the difficulty level for bots (e.g., the bot would also have to be trained for contextual identification) without overly raising a difficulty level for humans.

The authentication system populates the set of candidate answer media objects with at least one correct media object, which shares the overlapping relationship, and one or more noise media objects, and requests that the user select one of the candidate answer media objects. The noise media objects, in some embodiments, can obtained from other images that are available in the various object repositories. In some embodiments, the noise media objects are specifically selected based on a tracked difficulty level of machine object recognition using machine learning architectures (e.g., noise images are all adversarial attack examples).

The authentication system can adjust the difficulty of the authentication challenge presented to the user by adjusting the number of media objects presented as questions or candidate answers. By increasing the difficulty the authentication challenges, the authentication system can account for the various abilities of users to interpret the authentication challenge while ensuring that malicious automated processes are not authenticated. This can be adjusted, for example, by modifying a variable in the code. The number of objects, however, can be limited by available screen display area, for example, such as on a mobile device.

The authentication system may include a feedback engine which is used to track interactions between users and authentication challenges over time. The feedback engine may be configured to adapt the amount of authentication challenges that a user is required to navigate successfully in order to gain authentication to the system, in order to combat an increased observed proficiency of malicious automated processes. The feedback engine may use machine learning architectures, including binary classifiers, in order to determine malicious automated process behaviour over time.

The machine learning architecture of the feedback engine may further be configured to evaluate the likelihood of a malicious automated process based on additional information retrieved from the target device attempting to authenticate. For example, the feedback engine can use the machine learning architecture to learn from expected non authentication inputs such as user agent properties (e.g., browser type), biometric data such as typing speed, and other such factors. This can be used a gatekeeper mechanism to provide a threshold of when the authentication system as described herein is invoked (instead of having it invoked all the time).

The authentication system, via the candidate answer media objects, may include, in some variant embodiments, trap configuration mechanisms including trap images which are more likely to be selected as the correct answer by a malicious automated process as compared to a human user. The trap configuration may allow for the authentication system to more quickly determine with a greater degree of certainty whether a user is an automated process, and to log or ascertain information about the suspected malicious automated process. For example, the trap configuration can allow the authentication system to present multiple authentication challenges to a user determined to be a malicious automated process to learn likely characteristics of the automated process, which characteristics can be used by the machine learning features of the feedback engine to increase bot detection.

The authentication system can include two or more levels to prevent unauthorized access. On the first level, authentication can be based on system information such as keystroke dynamics, mouse movement, location (etc.), used to estimate the probability of bot presence. If the bot is detected at this level, the authentication is done.

If the bot is not detected, the second level of authentication that consists of challenge stories or questions related to (1) media object context, (2) semantics of presented media object(s), and (3) relations between media object(s) can be presented. Based on the answer, the system can increase the confidence in a decision as to whether the user is a bot or human.

The third level can include the user answering PVQ to gain access to the requested electronic resources. Various combinations of the levels, and various amounts of levels are contemplated.

In this manner, the authentication system employs a reverse tuning test, or reverse Turing test, based on the human ability to recognize visual relationships and construct narratives from a series of media objects. The authentication challenge in part relies upon a human mind's default approach of interpreting media objects as, rather than the most apparent identity of the object within the media object, as ideas or narratives between the a series of media objects, even if seemingly completely unrelated, and look for a pattern, a relationship, a story, something that a series of media objects have in common, using human-based common sense to infer the relationships between the media objects.

In addition, none of what humans can "see" needs to be necessarily represented on the image. For instance, two thick horizontal lines on a sheet of paper turned landscape, a fatter blue on the top, with a thinner green below it could be interpreted to mean blue sky and green grass if put next to other landscape images, but it could also be interpreted as a flag if put next to other flags, or along with a coat of arms and similar state symbols.

The system described in various embodiments is designed to exploit this discrepancy between machines and humans. The mechanism provides an automated gatekeeper that may be straightforward for humans and hard for bots (machines), using similarity relations.

In one aspect, an authentication system for controlling access to one or more computational resources by computationally attempting to discriminate whether a user is a human or an automated process includes one or more computer processors operating in conjunction with computer memory and data storage, the one or more computer processors configured to render, on a display, a set of question images, the set of question images including a first image and a second image which when observed together portray one or more inter-image relationships, and at least a third image having one or more intra-image visually ascertainable relationships, the one or more inter-image relationships and the one or more intra-image visually ascertainable relationships both including an overlapping relationship. The system further renders, on the display, a set of candidate answer images, the set of candidate answer images including at least an incorrect subset of images and a correct subset of images, the correct subset of images including a fourth image portraying the overlapping relationship; and provides or grants access to the one or more computational resources in response to receiving an input data set representative of a user selection of the fourth image.

In another aspect, a system for controlling access to one or more computational resources by computationally discriminating between users and automated processes, includes one or more computer processors operating in conjunction with computer memory and data storage, the one or more computer processors configured to render, on a display, a set of question images, the set of question images including at a first image having a first narrative element, a second image having a second narrative element, and at least a third image having one or more connecting narrative elements, where the connective narrative element associates the first narrative element with the second narrative element such that the first narrative element and the second narrative element interpreted together can include the connective narrative element. The system renders, on the display, a set of candidate answer images, the set of candidate answer images including at least an fourth image having the connective narrative element, and an incorrect subset of images including at least one media object that does not have the connective narrative element. The system then determines whether to grant access to the one or more computational resources should be provisioned based upon an input data set representative of a user selection of media objects from the set of candidate answer images.

In some embodiments, the system can be implemented by, or incorporated into a computer server for online banking. User devices may connect to the online banking platform computer server, which may require successful authentication by the authentication system prior to granting the user access to or the ability to perform banking functions.

The online banking platform computer server may retrieve (from the authentication system) and display the challenge story on the user device or include an API allowing the authentication system to directly display the challenge story on the user device. In some embodiments, the authentication system is a special-purpose machine or integrated circuit within the online banking platform computer system. The authentication system may be a program or agent stored within the banking platform computer server which is a one or more dynamically or statically linked libraries which are available to the online banking platform.

In some variant embodiments, the online banking platform computer server is operated to retrieve images from dynamically updated image repositories stored remote to the online banking platform computer server. For example, the online banking platform computer server may be operable to retrieve images from an image database in order to annotate the images for use in authentication systems. The images may be retrieved already having annotations (e.g., tags from photograph databases) or automatically annotated based on the objects shown therein and/or relations thereof. In this approach, the images that are retrieved and presented from dynamically updated sources during the test are less likely to be encountered by the agent in previous incarnations. In some embodiments, to reduce computational load at runtime, a "bank" of candidate images are pre-selected and cached into database for use without additional processing.

The authentication system may be configured to retrieve two or more first images from a first image repository having a plurality of first images, and at least one image from a second image repository having a plurality of second images in order to populate the challenge story. The first image repository, the second image repository, or the authentication system may be co-located within a single server, stored on digitally distinct repositories in a cloud system, or co-located within a system which includes the online banking platform computer server, or located on a variety of computer resource servers, or variations or combination thereof.

The authentication system may, in some embodiments, query a bot detection database for information to use to assess whether the user is a bot. The authentication system may retrieve from the bot detection database known bot characteristics or features, such as known IP addresses, known identity breaches, and the like.

In an aspect, a system for computationally discriminating whether an agent is a human or an automated process is described. The system includes one or more computer processors operating in conjunction with computer memory and data storage, the one or more computer processors configured to render, on a display, a set of question images, the set of question images including at least two images having one or more inter-image visually ascertainable relationships, and at least one image having one or more intra-image visually ascertainable relationships, the one or more inter-image visually ascertainable relationships and the one or more intra-image visually ascertainable relationships having one overlapping visually ascertainable relationship.

The one or more computer processors are configured to render, on the display, a set of candidate answer images, the set of candidate answer images including at least an incorrect subset of images and a correct subset of images, the correct subset of images including at least one image portraying the overlapping visually ascertainable relationship. The one or more computer processors are configured to determine whether access to one or more electronic resources should be granted based upon an input data set representative of a user selection of images of the set of candidate answer images.

In example embodiments, the at least two images having one or more inter-image visually ascertainable relationships are selected from a first image repository storing a first plurality of images and first metadata indicating inter-image visually ascertainable relationships between images of the first plurality of images; and wherein the at least one image having one or more intra-image visually ascertainable relationships is selected from a second image repository storing a second plurality of images and second metadata indicating the one or more intra-image visually ascertainable relationships relating to each image in the second plurality of images.

In example embodiments, the one or more computer processors are configured to: select a seed image from the first image repository, the seed image having a machine vision recognition characteristic below a pre-defined difficulty threshold.

The computer processor(s) select a corresponding image from the first image repository having the one or more inter-image visually ascertainable relationships with the seed image, and the seed image and the corresponding image are utilized for the set of question images.

In example embodiments, the one or more computer processor(s) are configured to select a seed image from the second image repository, the seed image having a machine vision recognition characteristic below a pre-defined difficulty threshold and having the one or more intra-image visually ascertainable relationships. The computer processors select the at least two images having one or more inter-image visually ascertainable relationships based on the overlapping visually ascertainable relationship.

In example embodiments, the incorrect subset of images includes at least one trap image associated one or more of the one or more inter-image visually ascertainable relationships that are not the one overlapping visually ascertainable relationship.

In example embodiments, the computer processor(s), upon a determination that the trap image is the user selection, are configured to flag the agent as a potential malicious agent.

In example embodiments, the one or more computer processors are configured to establish a positional layout for the set of question images for a graphical user interface, the positional layout establishing at least one non-adjacent position between a pair of the least two images having one or more inter-image visually ascertainable relationships.

In example embodiments, the one or more computer processors are configured to select the overlapping visually ascertainable relationship based upon a geographic indication of where a user is residing.

In example embodiments, the at least two images having one or more inter-image visually ascertainable relationships include respectively a first object and a second object, the inter-image visually ascertainable relationships being relationships between the first object and the second object, and the at least one image has one or more intra-image visually ascertainable relationships includes a third object and a fourth object, the intra-image visually ascertainable relationships being relationships the third object and the fourth object within the at least one image having intra-image visually ascertainable relationships.

In example embodiments, the one or more computer processors are further configured to grant access to the electronic resources to the agent in response to determining the user selection of images includes the correct subset of images.

In example embodiments, the at least two images having one or more inter-image visually ascertainable relationships and the at least one image having one or more intra-image visually ascertainable relationships are stored within a relationship object, the relationship object further storing the set of candidate answer images.

In another aspect, a method for computationally discriminating whether an agent is a human or an automated process is disclosed. The method includes rendering, on a display, a set of question images, the set of question images including at least two images having one or more inter-image visually ascertainable relationships, and at least one image having one or more intra-image visually ascertainable relationships, the one or more inter-image visually ascertainable relationships and the one or more intra-image visually ascertainable relationships having one overlapping visually ascertainable relationship, and rendering, on the display, a set of candidate answer images, the set of candidate answer images including at least an incorrect subset of images and a correct subset of images, the correct subset of images including at least one image portraying the overlapping visually ascertainable relationship.

The method includes determining whether access to one or more electronic resources should be granted based upon an input data set representative of a user selection of images of the set of candidate answer images. Granting access can include triggering a switch or modifying a state such that the agent is able to proceed in a next step of a process. For example, the state change can include enabling a web instance to proceed to an "authenticated state" whereby the agent is able to, for example, obtain account balances for an online banking service or initiate transactions through inputs that are provided to the interface.

In example embodiments, the method further includes selecting the at least two images having one or more inter-image visually ascertainable relationships from a first image repository storing a first plurality of images and first metadata indicating inter-image visually ascertainable relationships between images of the first plurality of images, and selecting the at least one image having one or more intra-image visually ascertainable relationships from a second image repository storing a second plurality of images and second metadata indicating the one or more intra-image visually ascertainable relationships relating to each image in the second plurality of images.

In example embodiments, the method further includes selecting a seed image from the second image repository, the seed image having a machine vision recognition characteristic below a pre-defined difficulty threshold and having the one or more intra-image visually ascertainable relationships, and selecting the at least two images having one or more inter-image visually ascertainable relationships based on the overlapping visually ascertainable relationship.

In example embodiments, the incorrect subset of images of the method includes at least one trap image associated one or more of the one or more inter-image visually ascertainable relationships that are not the one overlapping visually ascertainable relationship.

In example embodiments, the method further includes flagging the agent as a potential malicious user in response to determining that the trap image is the user selection.

In example embodiments, the method further includes establishing a positional layout for the set of question images for a graphical user interface, the positional layout establishing at least one non-adjacent position between a pair of the least two images having one or more inter-image visually ascertainable relationships.

In example embodiments, the method further includes selecting the overlapping visually ascertainable relationship based upon a geographic indication of where the agent is residing.

In example embodiments, the method further includes granting access to the electronic resources to the agent in response to determining the user selection of images includes the correct subset of images.

In a further aspect, a non-transitory computer readable storage medium (CRM) having stored therein computer executable program code for discriminating whether an agent is a human or an automated process is described. The CRM, when executed by a processor, causes the processor to render, on a display, a set of question images, the set of question images including at least two images having one or more inter-image visually ascertainable relationships, and at least one image having one or more intra-image visually ascertainable relationships, the one or more inter-image visually ascertainable relationships and the one or more intra-image visually ascertainable relationships having one overlapping visually ascertainable relationship, and render, on the display, a set of candidate answer images, the set of candidate answer images including at least an incorrect subset of images and a correct subset of images, the correct subset of images including at least one image portraying the overlapping visually ascertainable relationship. The processor executing the CRM further determines whether access to one or more electronic resources should be granted based upon an input data set representative of a user selection of images of the set of candidate answer images.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 24 is an example code representation of media data object inner and outer relationships, according to some embodiments.

DETAILED DESCRIPTION

Figure 1:
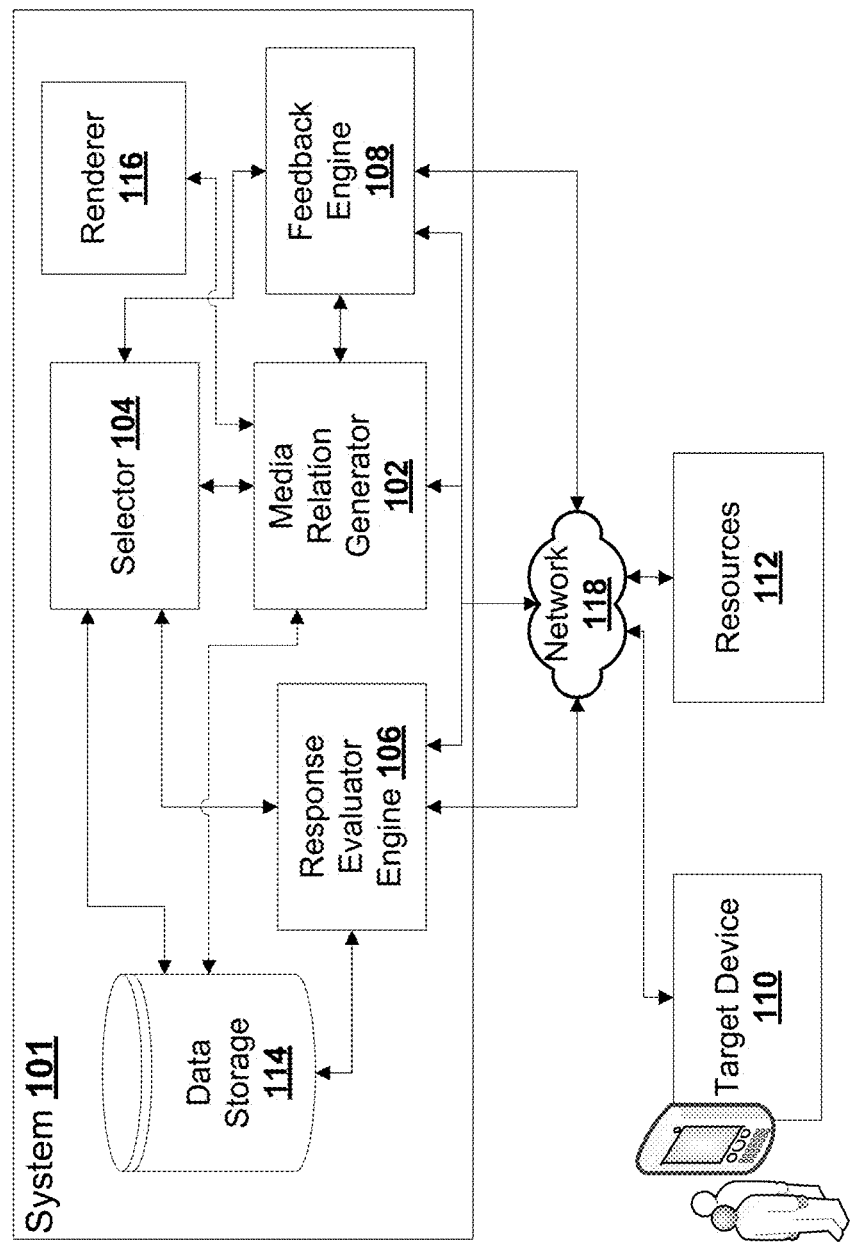
FIG. 1 is a block schematic diagram of an example system for authentication based on outer and inner relation similarity, according to some embodiments.

Online authentication processes (OAP) based on image recognition are considered herein. Other types of authentication processes using different types of media objects types are also considered (videos, audio).

The proposed authentication system estimates the likelihood that an agent operating a target device requesting access to electronic resources is a bot by requiring the user to complete a challenge story (alternatively referred to as an authentication mechanism).

The challenge story assesses whether the agent is operated by a human by assessing the users ability to discover relations between media objects which are not immediately obvious from viewing the media objects in isolation. The challenge story presents the agent with a set of question media objects, two of which have an outer relation (e.g., a relation that becomes apparent when the two objects are viewed together).

While the two images may have many outer relations, the outer relation which the system requires to be discovered is disclosed in part by a third image which relates two objects within itself (e.g., the inner relation). There may be many inner relations, and many outer relations apparent in the at least three media objects, however, the challenge story is configured to present the set of question images so that there is only one overlapping relation, or a most correct overlapping relation, between the outer relations and the inner relations. This overlapping relation must be discovered by the user to successfully navigate the challenge story. The overlapping relation can be a "common" relation that provides a linkage between the inner relations and the outer relations, which, from a computational perspective, be represented in the form of data values (e.g., metadata) that is associated with the various images and between various images. In some embodiments, the data values tracking outer relations can be directed (e.g., cat eats mouse, but mouse does not eat cat).

Stated alternatively, a user is required to determine and select one of possibly many relations between two images based on an inner image relationship within a third image which overlaps with the correct outer relation. In this way, the user is required to discover relations between images and not just identify the objects within the image.

In the case of the image with an inner relation, the user must correctly determine one or more objects within the image, and identify the relationship between the images. Finally, the user is required to compare and find overlap between the inner relation in the multi-object image, and the outer relations between the first two images.

In order to successfully complete the challenge story, the system presents the agent with a set of candidate answer media objects, one of which will share or portray the overlapping relation shown in the set of question media objects, which the user must select.

Therefore, the authentication challenge (alternatively referred to as a challenge story) requires faculties that are not directly tied to recent advances in machine learning identifying objects within images as it requires finding relations between images and objects. In one embodiment, the objects in the images can be thought of as nouns, while the relation between the images can be thought of as verbs. Accordingly, a technical solution is proposed that is adapted specifically to reduce the effectiveness of machine learning-based automated agents.

In some embodiments, the system uses probabilistic computational tree logic formula (PCTL) to quantify false or likely false negative detection (e.g., detecting a human as a bot) and to show how to identify and analyze both weak and strong sides of the proposed authentication process of some embodiments. The process is tuned and refined over time to establish convenience for the user while maintaining the integrity of the authentication process. The tuning process can include increasing or decreasing a difficulty level, for example, by changing the number of media objects (e.g., images) shown, the number of "noise" images, the number of "trap" images, a seed object difficulty level when selecting media objects, among others. The test may be conducted multiple times, the number of times depending on the difficulty level.

In some embodiments, machine learning (ML) features are used to further improve the authentication system, for example, as feedback or for tuning, in combination with other monitored data, such as suspiciousness of keyboard/mouse entry, IP address, time of use, type of resources accessed, impact of resources accessed, etc.

For example, the ML features may, in conjunction with the challenge story, be used to assess information extraneous to the challenge story to determine whether the agent is operated by human (alternatively referred to as adaptive risk analysis). The extraneous information may be used in any combination with the challenge story. In some embodiments, for example, the extraneous material based ML is weighed to be 40% of the decision, such that if the ML processing the extraneous information believes the user is human, but the challenge story is indicative of a bot, the challenge story determination will take precedence over the ML processing. In another non-limiting example, where the ML features determine that the user is likely a bot, but the user successfully navigates the challenge story, the system 101 may require further authentication notwithstanding the successful navigation of the challenge story. In a further non-limiting example, the challenge story is integrated into the ML and its importance is learned through training the ML.

The extraneous information processed by the ML features may include a variety of information received from the target device or otherwise to determine whether the agent is operated by a human. For example, the ML features may process the user's input cadence to delineate between human indicative input entry (e.g., typing at a certain speed or cadence) and bot like input entry, through the use of, for example, a binary classifier based on existing labelled data points. In another non-limiting example, the ML may be configured to process multiple pieces of information extraneous to the challenge story to determine whether the user is human. For example, the ML may process both input entry characteristics as well as an IP address location, and a browser type, to determine whether the agent is operated by a human, for example by using a binary classifier to group the agent actions with known bot data points.

The ML features can also be used to learn the tendencies or abilities of bots based on challenge story interactions, and attempt to adjust facets of the authentication system. For example, the ML features can be used to assess how likely a bot is to successfully navigate a challenge story by comparing to a combination of existing data about bot abilities. The ML features may then be able to augment or influence the challenge story authentication to require the agent to complete multiple rounds of authentication where it determines bots are being too successful passing a single or few rounds of authentication.

In some embodiments, the ML features of the authentication system may select media objects with varying degrees of difficulty in order to interpret in order to increase the difficulty of the challenge stories, increasing the ability to distinguish between agents operated by humans and bots. For example, the ML features may learn which media objects or stories bots have difficulty identifying, (e.g., where the ML features include a binary classifier trained on existing bot performance), and compare new or candidate stories to the difficult stories to predict bot performance. However, ML in this context may rely upon employing engineered features such as friend-to-followers ratio on social media platforms (SMPs) or on people reporting discrepancies in their credit card activity.

In applying ML to agent authentication, the focus of the model shifts from fraud detection to identity assurance. It is shown that by learning from data in users' past authentication attempts, such as: location/network, time of day, device fingerprint, pattern of access, keystroke dynamics, the Applicant can increase the confidentiality that a given agent is who he or she claims to be.

The authentication system can include a combination of ML and authentication mechanisms (e.g., visual challenge stories) as described herein. For example, in the data set used for ML, the pattern of image recognition challenge responses is added. For instance, if a system is confident that a bot fails to detect semantics on particular image, the system can provide that question to bot whenever the system suspects that it is encountering a bot.

The procedure that requires online banking customers to provide personal verification questions (PVQ) is standard practice in many financial institutions. Customers are asked to provide three to five PVQs that are used to issue a new password in the event a customer forgot the original password. As described herein, an alternate system is described that may be compatible with PVQs. The authentication system can supplement, and not necessarily replace PVQ, adding a new layer of verification.

Software systems are traditionally constructed deductively by program code as the rules that govern the system behaviours, but with ML techniques those rules can be changed inductively from set of trained data. The rule system imposed by ML might be incorrect even if the algorithm is correctly implemented.

So far, image based bot detection is based on showing distorted images with a number or letters and the task is to write down what is on the image. Another popular technique is to show multiple images of which some have similar content, say cars, or trees, while others don't. The task here is to select all images that show a specific object. AI, neural networks, or ML have became very good in recognizing what is on a single image, or to group or compare images according to what is on them. For instance, they can be very accurate in facial recognition.

Internet bots today could defeat simple challenges based on recognizing or naming objects within an image. As a result of limited availability of media objects, Internet bots today can, when confronted with an authentication challenge which includes identifying an object in an image, determine the object in the image by comparing the authentication image to a plurality of labelled comparison images widely available. Therefore, the more universally recognizable objects in an image is, the more likely that an Internet bot is able to correctly identify the object in the image based on existing labelled comparisons.

This presents a conundrum to authentication system designers, where the more available images are also more likely to be understood by human users, thereby reducing the usefulness of media objects in authentication systems.

Moreover, bots has become increasingly sophisticated in retaining observations from past images, or comparing images in sequence to determine whether or not the subsequent image is part of the sequence or matches a feature of the sequence. For example, bots can determine which features identified in previous images are relevant to identifying objects in subsequent images. Moreover, existing ML techniques allow for bots to learn common sequences. Therefore, not only are bots able to more accurately identify an object within an image, they have the ability to, over a sequence, learn features which are most important within an image in order to classify the next element in a sequence.

However, internet bots have difficulties finding the relationship or performing causal reasoning between multiple media objects. While there is a plurality of images having label information associated with the object in the image, there is a relative paucity of images labelled with potential relationships between the object in the image and other objects. This can be explained in part by the fact that there are an almost unlimited number of relationships that an image can have with other images. Therefore, the Internet bot, when confronted with an authentication challenge which requires finding relationships between multiple media objects, ultimately has fewer examples to compare or learn from.

Moreover, common techniques used by bots to process images utilize some form of pixel-based partitioning, wherein a portion of the image is analyzed for a dominant feature. The techniques used to determine a dominant feature within a portion of the image may not translate well to the task of holistically reviewing the image, and determining a relation to another holistically evaluated image.

Referring now to FIG. 1, a block schematic diagram of an example system for authentication based on inter-image visually ascertainable relationships and intra-image visually ascertainable relationships (alternatively referred to as outer and inner relationships), according to some embodiments, is shown.

System 100 includes a computer system 101, that operates as a gatekeeper to control whether or not the agent operating the target device 110 is granted access to, or is provisioned access, to one or more underlying physical or virtual electronic resources 112.

The agent operating the target device 110 may be an agent that is operated by a human user, including scenarios where the human user is operating a mobile device target device 110. In some scenarios, the agent is a program for receiving user input, such as a web browser (e.g., Chrome) which uses or converts the user instructions to navigate the web, and in some instances, interacts with the authentication system in order to fulfil received user input. For example, the agent may convert a user pressing an link on a screen into a request to access the resources 112 associated with the selected link. In a further non-limiting example, the agent may be a program configured to control the further physical device, such as a touchscreen associated with a door lock. In the door lock example, the agent may open a door upon successful authentication.

The agent operating the target device 110 may be an agent that is operated by a malicious automated process. For example, an automated process may be programmed to use an agent such as a web browser to attempt to gain fraudulent access to online bank accounts The system 101 generates and interprets agent interaction with authentication mechanisms (e.g., visually story challenges) which are used to discriminate between human and computer agent operators. The computer system 101 acts as a gatekeeper by establishing a confidence level in discriminating between the agent is operated by a human and malicious automated processes (e.g., bad bots) based on the authentication mechanisms. In example embodiments, the system 101 can act as a gate keeping to financial institution computer resources 112, requiring the target device 110 to complete a visual story challenge authentication mechanism and establish that it is human operated before providing or granting access to the financial institution computer resources 112. For example, a financial institution can control whether the target device 110 is provisioned with, or granted access to a web-based platform, such as online banking, based on the authentication.

In example embodiments, the computer system 101 may operate with other computing devices, as an intermediary service. For example, system 101 may be used similar to a Captcha™ system, in that it is integrated into third party web platforms.

In another non-limiting example, the system 101 may be integrated into or embedded within a system having the resources 112 to control access to the resources 112 by system users. For example, the system 101 may be used to delineate between granting access for an agent operated by a user of a bank between databases which include sensitive personal information (e.g., access to personal banking info), databases which store sensitive data which does not have personal information (e.g., available interest rates the bank can provide), and databases which store information for public consumption (e.g., promotional materials). In another non-limiting example, the system 101 is integrated into systems for accessing physical resources. For example, the system 101 may be used to authenticate users for the purposes of controlling the electronic resources 112 which control whether a door is locked or unlocked.

In some embodiments, the resources 112 are operated by a party separate from the operator of system 101. For example a third party bank having resources 112 may require completion of an authentication via the system 101 prior to granting a user access to bank resources 112, similar to a captcha system.

The resources 112 can include a variety of electronic or computer resources capable of being accessed by system 101. For example, the electronic or computer resources can include electronic resources which operate on physical structures, such as a means of opening a locked door. In another non-limiting example, the electronic computer resources can include resources which operate on or interact with computer resources, such as a means of accessing a webpage including through the use of an application programming interface, submitting a request to central server to reset a password, a means of accessing a database, and so forth.

In further example embodiments, the system 101 is used as part of a program library that can be dynamically or statically loaded for use with protecting sensitive information or overall computing resource availability. For example, the system 101 may be used on a mobile/web-based interface for protecting access by an agent to back end electronic resources, reflecting the increased risk of access external to the back end resources. In another example, the system 101 may be used for protecting against bulk "web-scraper" bots (where the scrapers consume lots of resources or end up inadvertently overloading the user interface).

The computer system 101 controls renderings that are generated for display or otherwise distributed to a target device 110. The renderings can be generated based on question media objects and candidate answer media objects as described herein.

The target device 110 includes one or more input receivers that receive indications of selections or inputs based on user or automated process interaction with the target device 110 (e.g., in response to observing question media objects renderings) which are then transmitted to the computer system 101. In example embodiments, the target device 110 can be a computer, mobile device, tablet, etc. In further non-limiting example embodiments, the target device 110 is within the system 101 and is a touch display.

The computer system 101 can include a backend data storage 114, a media relation generator 102, a selector 104, a response evaluator engine 106, a renderer 116, and a feedback engine 108. These components are provided as examples and, in some embodiments, are implemented using electronic circuits, computing components, including processors, data storage, and non-transitory computer readable media.

The backend data storage 114 stores a set of question media objects and a set of candidate answer media objects to provide to the media relation generator 102. In some embodiments, the set of question media objects and the set of candidate answer media objects are stored remote to system 101, and are retrieved through the network 118, or otherwise. In example embodiments, the set of question media objects and the set of candidate answer media objects are stored on separate data storage devices. The separate data storage devices can be stored on system 101 (i.e., local storage), or a remote system (e.g., third party), or variations of different amounts and kinds of third party and local storage devices and/or locations.

The set of question media objects and the set of candidate answer media objects may be different types of observable or interpretable media, such as video (e.g., a short video clip of a cat playing with a mouse), image (e.g., an image of a cat), sound media (e.g., a recording of a cat meowing), or otherwise. For example, the set of question media objects may be a set of question images and a further image (for a total of three images) and the set of candidate answer media objects can be a set of candidate answer images. In another non-limiting example, the question media objects may be a set of question sounds and a further sound (for a total of three sounds) and the set of candidate answer media objects can be a set of candidate answer sounds. A variety of combinations of media objects for the set of question media objects and the set of candidate answer media objects is contemplated.

The set of question media objects may contain three or more media objects. In some example embodiments, the set contains no more than 4 objects. In some embodiments, the set of question media objects includes 3-5 images. The set of candidate answer media objects may contain two or more media objects. In some embodiments, the set of candidate answer media objects includes 3-5 images.

The set of question media objects and the set of candidate answer media objects may be configured to have the same amount of media objects. In some embodiments, the set of question media objects and the set of candidate answer media objects have varying amounts of media objects.

Figure 2A:
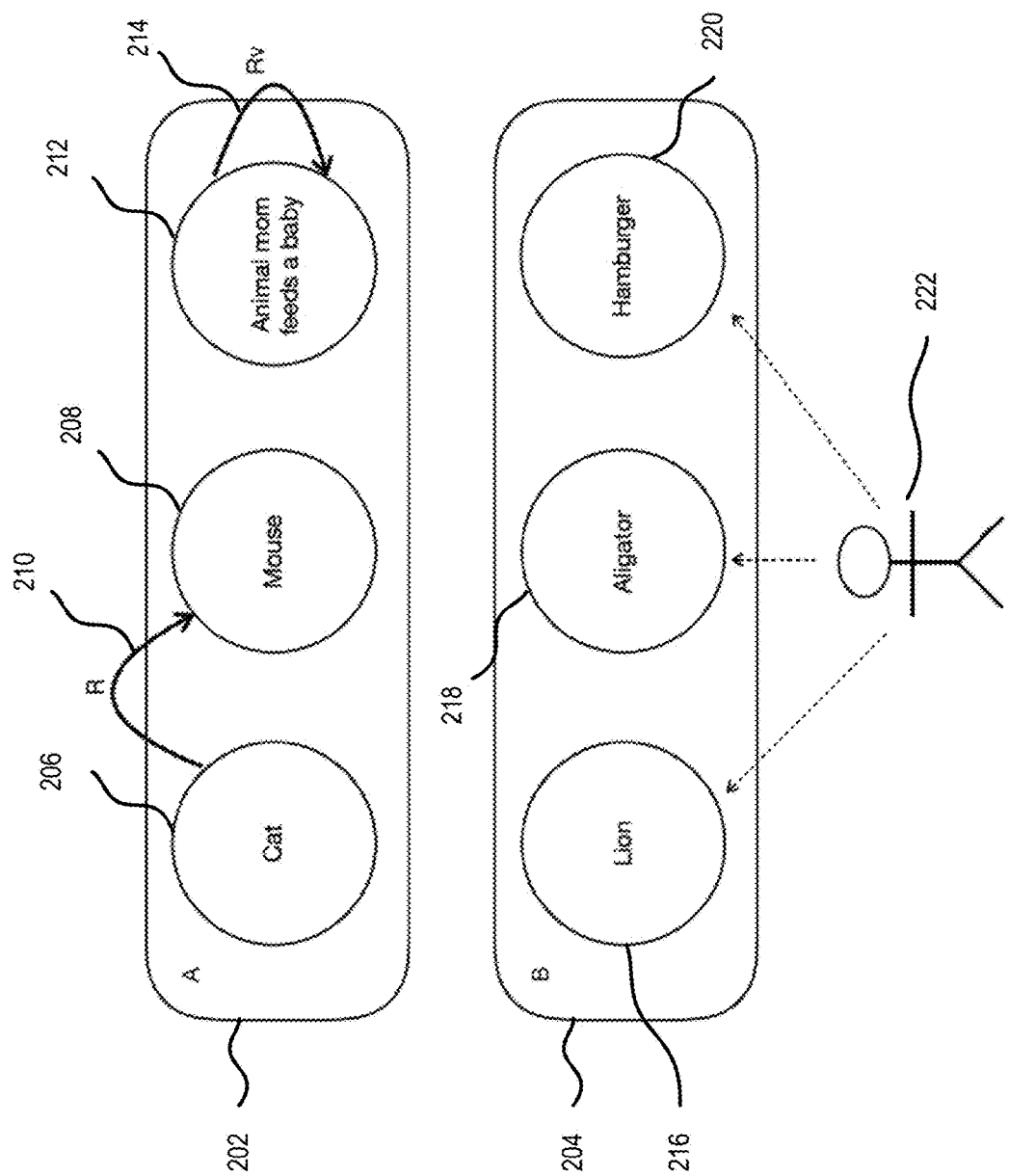
FIG. 2A is an example illustration of a conceptual rendering of a set of question images and a set of candidate answer images, according to some embodiments.
Figure 2B:
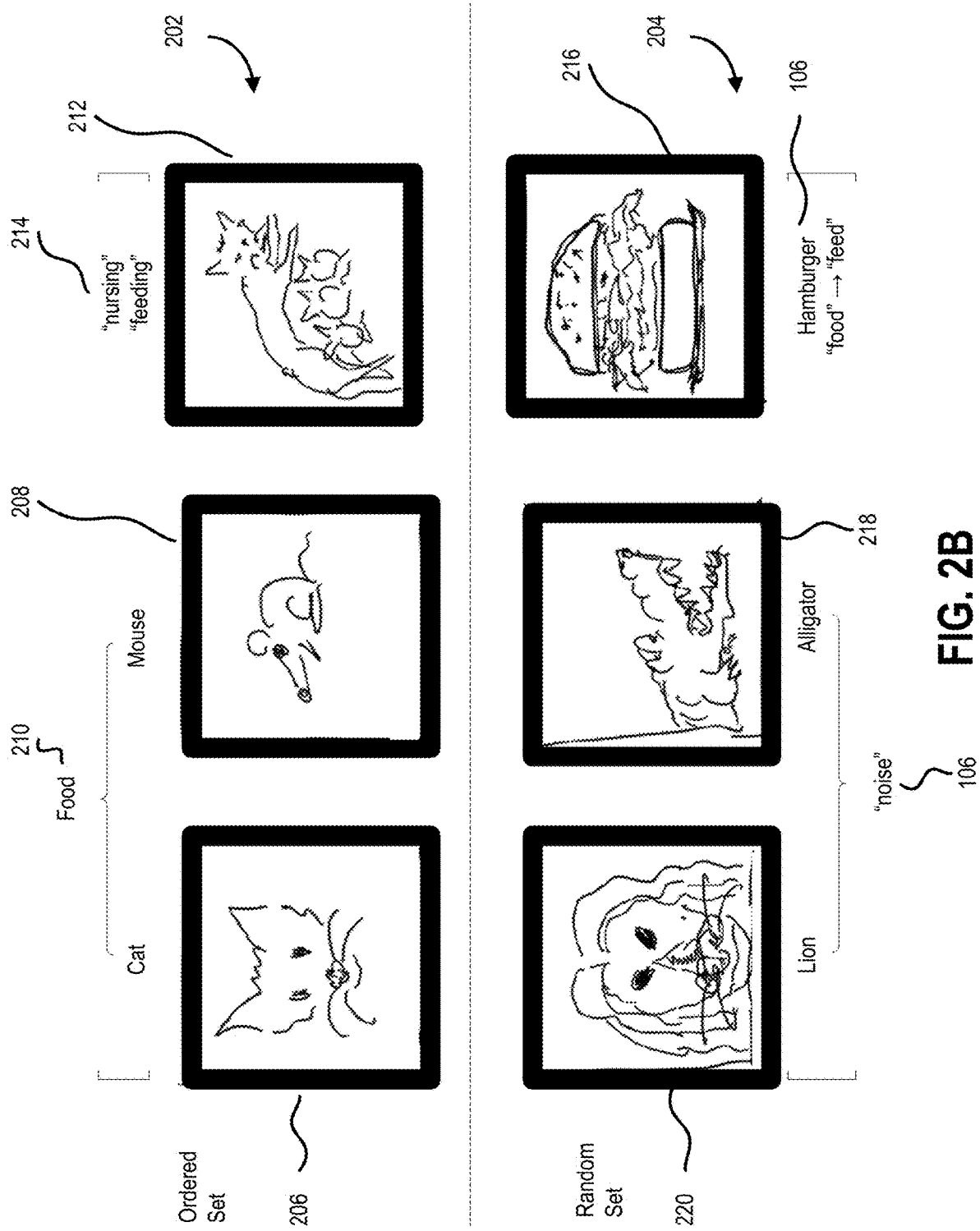
FIG. 2B is an example illustration of a rendering of a set of question images and a set of candidate answer images, according to some embodiments.

Referring now to FIG. 2A and FIG. 2B, example conceptualizations of a rendering of a set of question images 202 and a set of candidate answer images 204, and example illustrations of rendering the set of question images 202 and the set of candidate answer images 204, respectively, is shown.

The set of question media objects 202 includes at least two images (e.g., first image 206 and second image 208) having one or more inter-image visually ascertainable relationships 210. In some embodiments, the set of question media objects 202 are further rendered with additional graphical annotations showing which images have outer relations and which images are for the inner relation. The graphical annotations can include different colors (e.g., blue for outer relations and red for inner relations for the borders), arrows (e.g., arrows indicating a directionality of relationship cat->mouse), and these graphical annotations can be controlled by a graphical display or rendering engine through the provisioning of graphical output instructions. The directionality of the arrow can be based, for example, from metadata stored thereon in relation to the chosen common/overlapping relation (e.g., feeding is chosen, and cat has to be pointing to mouse because feeding is directional from cat to mouse and not the other way around). The graphical annotations can be selectively shown on lower difficulty levels and omitted on harder difficulty levels. For example, in a lowest difficulty level, both arrows and colors are shown; in a medium difficulty level, only colors are shown; and in a hard difficulty level, no annotations are shown.

The two images may have or represent one or more objects within each of the images. In the example shown, the first image 206 is a representative of a cat, and the second image 208 is representative of a mouse. In a non-limiting example, the images may have two objects shown, such as the first image 206 showing a seed and a chick, and the second image showing a fruit and a chicken.

The cat first image 206 and mouse second image 208 can share one or more inter-image visually ascertainable relationships 210. For example, in the example embodiment of a cat and mouse, both images represent or portray the concept or relation of animal, mammal, *omnivore*, being located within overlapping regions of the earth, and so forth. The cat first image 206 and mouse second image 208 also share the inter-image visually ascertainable relationships 210 that a cat eats mice, or alternatively stated an inter-image visually ascertainable relationships 210 that is indicative of feeding or food. In the example embodiment described above in respect of a seed/chick and fruit/chicken images, when the two images are observed together, they portray or show the one or more inter-image relationships of food, natural objects, outdoors, and so forth.

The set of question media objects 202 also includes the at least one image (e.g., the third image 212) having one or more intra-image visually ascertainable relationships 214. In the embodiment shown, the third image 212 is representative of or includes a cat feeding or nursing kittens, which portrays the intra-image visually ascertainable relationships 214 of feeding, food, nurturing, family, and so forth. In the example embodiment described above in respect of a seed/chick and fruit/chicken images, the third image 212 may be representative of or include a pump connected to a balloon which portrays the intra-image visually ascertainable relationships 214 of growth, pressure increases, effort, and so forth.

In example embodiments, the of question media objects 202 have, in addition to different images, different visual annotations. For example, the cat first image 206 and mouse second image 208 may be framed in a first colour, while the third image 212 may be outlined or framed in a second colour. In some embodiments, for example, there is an arrow shown relative to the images having an inter-image relationship, denoting a narrative direction between the two images. For example, the cat first image 206 may have an arrow nearby pointing to the mouse second image 208 to demonstrate directionality.

The one or more inter-image visually ascertainable relationships 210 and the one or more intra-image visually ascertainable relationships 214 have one overlapping visually ascertainable relationship. In the embodiment show in FIG. 2A and FIG. 2B, the inter-image visually ascertainable relationship 210 of feeding (e.g., the cat eats the mouse) is a relationship that is shared with, or overlaps, the intra-image visually ascertainable relationships 214 of feeding. In the example embodiment described above in respect of a seed/chick, fruit/chicken images, and pump/balloon images, the intra-image visually ascertainable relationships 214 includes growth, as does the inter-image visually ascertainable relationships 210.

In an example embodiment, the set of question media objects 202 can be denoted as a set of images A, containing n number of images $A=\{a_0, a_1 \ldots a_n\}$, and the one overlapping visually ascertainable relationship can be represented by R (alternatively stated, R is a relation on a set A, or a relation from A to A). Another set of images, $B=\{b_0,$ $b_1, \ldots, b_n\}_h$ as one image that should logically be in the same relation to the subject, as the relation between pictures inside set A.

In other words, a relation on a set A is a subset of A×A. Let A be the set {Dog, Cat, Mouse}. Order pairs that satisfy the relation $\mathcal{R} =\{(a, b)|$ a "eats" b$\}$ are $\mathcal{R} =\{$(Dog, Cat), (Cat, Mouse)$\}$. The relation "eats" indicates that a dog is natural predator of a cat and a cat is natural predator of a mouse.

In example embodiments, the relation R on the set A is irreflexive, denoting a relation which never holds between a term and itself. For example, (Dog, Dog) does not belong to R (does not have one overlapping visually ascertainable relationship) (i.e., –irreflexive, (Dog, Dog)$\notin \mathcal{R}$ ).

In example embodiments, the relation R on the set A is antisymmetric. Formally, antisymmetric relationships describe a scenario there is no pair of distinct elements of A each of which is related by R to the other. Alternatively stated, if R (a, b) and R (b, a), then a=b. In the example embodiment, if (Dog, Cat) belongs to R, then (Cat, Dog) does not belong to R, or (Cat, Dog) does not belong to R (does not have one overlapping visually ascertainable relationship) (i.e., –antisymmetric, (Dog, Cat)$\in \mathcal{R} \Rightarrow$(Cat, Dog)$\notin \mathcal{R}$ ).

In example embodiments, the relation R on the set A is intransitive. Intransitivity can be defined as capturing scenarios where, for all elements of A (e.g., Dog, Cat, Mouse), whenever R relates a first element (Dog) to a second element (Cat) and the second element (Cat) to the third element (Mouse), then R does not relates the first element (Dog) to the third element (Mouse) (i.e., —intransitive, (Dog, Cat)$\in \mathcal{R} \wedge$(Cat, Mouse)$\in \mathcal{R} \Rightarrow$(Dog, Mouse)$\notin \mathcal{R}$ ).

FIG. 2A and FIG. 2B further show a set of candidate answer images 204 including at least an incorrect subset of images (e.g., the fifth image 218, shown as an alligator, and the sixth image 220, shown as a lion), alternatively referred to as noise images, and a correct subset of images (e.g., the fourth image 216, shown as a hamburger).

The correct subset of images includes at least one image (e.g., the fourth image 216) portraying the overlapping visually ascertainable relationship. In the example embodiment shown, the correct fourth image 216 is a hamburger, which is related to the overlapping visually ascertainable relationship of feeding/food.

In the example embodiment described above in respect of a seed/chick, fruit/chicken images, and pump/balloon images, the correct subset of images can include a variety of images which portray the concept of growth. For example, a correct image can include a representation of a graph showing an upward trajectory, a picture of a teenager and an adult having similar features, a popcorn kernel and popped popcorn, and so forth.

The incorrect subset of images do not contain, portray or have the overlapping visually ascertainable relationship. For example, the fifth image 218, shown as an alligator, does not have a quality related to food or feeding on its own, nor does the sixth image 220, shown as a lion.

In the example embodiment described above in respect of a seed/chick, fruit/chicken images, and pump/balloon images, the noise images may include images which do not themselves relate to the concept of growth. For example, the incorrect subset of images can include an image of a barrel of oil, and an image of basketball shoes.

Alternatively stated Let B be the set {Lion, Alligator, Hamburger}, and C be the set of one element authentication subject {Subject}. A binary relation from C to B is a subset of C×B={(Subject, Lion), (Subject, Alligator), (Subject, Hamburger)}.

The only subset that satisfies relation $\mathcal{R}$ is:
$\mathcal{R} =\{$(Subject, Hamburger)$\}$ Meaning that only the image of the hamburger is the correct answer. This solution is intuitive for the subject human, but for not for the bot.

Such inter-media relation may be difficult for computers or automated processes (alternatively referred to as a bot) to learn, and intuitive for humans to understand. The bot may, in order to correctly select the correct image based on overlapping visually ascertainable relationship and the set of question media objects 202.

The bot would need to (1) recognize the object on each media object (e.g., image) (2) and the semantical relation (e.g., outer relation, inter-image visually ascertainable relationships 210) between objects presented in the media objects (e.g., images). In order to do so, the bot would have to find the relation correct R by recognizing the media objects and finding the set of possible relations between those objects. In the shown embodiment, for example, each object (e.g., image) can be described as noun, and there may be multiple but finite number of relations $\mathcal{R}_1, \mathcal{R}_2 \ldots R_n$ between the images.

The bot would further have to discover or find out the relation $\mathcal{R}_v$ (e.g., intra-image visually ascertainable relationships 214) within a media object. Discovering this relation can include discovering relationships between multiple subjects or objects depicted in the media object.

In the example embodiment shown, the relation shown on the picture has to be clear and to have only one semantics. The relation is a verb, and set of relations should contain only one element.

The bot would further need to find $\mathcal{R}_i$, $i \in$(1 . . . n), where i is one of 1 . . . n relations (e.g., outer relation, inter-image visually ascertainable relationships 210) that has the strongest semantic similarity to $\mathcal{R}_v$ (e.g., intra-image visually ascertainable relationships 214).

The bot would further need the functionality to select the correct media object (e.g., the fourth image 216) from the set B (e.g., set of candidate answer images 204) such that $\mathcal{R}_i=\{$(Subject, Solution)$\}$ and $\mathcal{R}_v=\{$(Subject, Solution)$\}$.

Although advanced bots are capable to analyze syntax and even the semantics of an image to some extent, it is hard for bots to figure out the relation between presented images.

To summarize, the visual story challenge has two major components: image recognition, and a subject discovery process performed which need to be successfully performed by an automated process (e.g., computerized system) in order to defeat the visual story challenge. The process can be made even more difficult for the bot by presenting of multiple objects on the same image. In addition to the relation between images bot needs to find out the relation between identified objects inside the same picture, the bot is required to correctly identify multiple objects within a single image.

Alternatively stated, the first image 206 and the second image 208 include first narrative elements, and the third image 212 contains a connective narrative element, where the connective narrative element associates the first narrative element with a second narrative element. The fourth image 216 contains the second narrative element, but the incorrect images do not.

Alternatively stated, the first image 206 and the second image 208 include a first and a second narrative element, and the third image 212 contains a connective narrative element, where the connective narrative element associates the first narrative element with the second narrative element. The fourth image 216 contains the connective narrative element, but the incorrect images do not.

Alternatively stated, the first image 206 and the second image 208 include between them an outer relation, which is not visible when viewing the images individually, and the third image 212 contains an inner relation, which reveal or highlight the outer relations between the first image 206 and the second image 208. The fourth image 216 contains or is associated with the outer relation, but the incorrect images are not.

Alternatively stated, the first image 206 and the second image 208 include between them a common relation, which is not visible when viewing the images individually, and the third image 212 contains the common relation which is visible between objects within the image, which aids in revealing or highlighting the common relation between the first image 206 and the second image 208. The fourth image 216 contains or is associated with the common relation, but the incorrect images are not.

In some variants, the set of question media objects includes two media objects, with one media object having and intra-image relationship which overlaps with the inter-image relationship between the two question media objects. For example, a first media object can include an image which shows Ben Affleck, while the second image can be an image of Ben Affleck in a Batman costume. The outer relation between the two images would include actors who've played Batman. Similarly, the intra-image relationship would include the relation of Ben Affleck playing Batman.

Further describing the embodiment which includes a set of question media objects including two media objects, the correct answer would include an actor who has played Batman. In some embodiments, the correct answer media object can include a recording of a person speaking the actors name, or the correct answer media object can include an image spelling the actors name.

In some example variants, the two images sharing an outer relation and the one image having an inner relation share multiple overlapping relations which are manifested within the correct image. For example, in example embodiments which include the following pair of images: seed/chick, fruit/chicken images, teenage/adult, the overlapping relation may include growth, but may also include aging, maturing, adulthood, and so forth. The correct image may manifest multiple overlapping relationships.

In example embodiments, the correct image is the image which portrays the greatest number of overlapping relationships shown in the set of question images. For example, in the example embodiments which include the following pair of images, seed/chick, fruit/chicken images, teenage/adult, and the candidate answer images include the following images/image pairs: a graph showing an upward trajectory, a grandfather, an inflated balloon, the correct image would be the grandfather, as it shares the most overlapping images (e.g., grandfather includes the overlapping relation of maturing/aging not present in the remaining images).

Referring again to FIG. 1, the media relation generator 102 is configured to retrieve or create or curate the underlying media elements (e.g., photos, audio, video) used as components of the set of question media objects and the set of candidate answer media objects to form the visual story challenge (alternatively referred to as a story or challenge).

The following examples will be described with respect to images, however other media objects can be used, such as videos, sounds, etc.

In example embodiments, the media relation generator 102 is configured to select one or more images for the set of question media objects 202 and the set of candidate answer images 204. For example, media relation generator 102 can be configured to select the at least two of the set of question media objects having an outer relation and the at least one of them having an inner relation which corresponds to the outer relation. The media relation generator 102 can also be configured to select only the incorrect images, or only the correct images.

The media relation generator 102 may select the images based on annotations stored along with the images, for example where images are stored having metadata indicative of the one or more inter-image relationships 210, the one or more intra-image visually ascertainable relationships 214, or the overlapping visually ascertainable relationship. For example, the media relation generator 102 may have access to a first image repository (e.g., a repository within database 114) storing a first plurality of images and first metadata indicating inter-image visually ascertainable relationships between images of the first plurality of images, and a second image repository (e.g., a repository within database 114) storing a second plurality of images and second metadata indicating the one or more intra-image visually ascertainable relationships relating to each image in the second plurality of images, correspondingly select the set of question media objects 202 and the set of candidate answer images 204.

The media relation generator 102 may be configured to select media objects based on a desired difficulty.

In some embodiments, for example, the media relation generator 102 is configured to select a seed image, from the first image repository, having a machine vision recognition characteristic below a pre-defined difficulty threshold. For example, the seed image may be the first image 206 with features deliberately modified to confuse a bot, such as reducing the resolution of the image, increasing blurriness of the object within the image, changing the location of the object in the image (e.g., Moving the image in a bottom right location of a designated zone for the image), and so forth.

The pre-defined difficulty threshold can be a value indicative of a predicted difficulty in having a machine learning engine, a component of the bot, correctly identify the object in the media object. For example, some media may only be correctly identified by the machine learning engine 80% of the time as compared to other media objects. For example, the machine vision recognition characteristic can be a blurriness of an image, which makes it difficult for the machine learning engine to correctly identify the subject of the image. In another non-limiting example, the machine vision recognition characteristic can be a scratchiness quality in a recorded sound.

The media relation generator 102 can then select a corresponding image from the first image repository having the one or more inter-image visually ascertainable relationships in common with the seed image, and render the seed image and the corresponding image for the set of question images.

Similarly, the seed image can be selected from the second image repository to have a desired machine vision recognition characteristic below a pre-defined difficulty threshold and having the one or more intra-image visually ascertainable relationships. The media relation generator 102 can then select the at least two images having one or more inter-image visually ascertainable relationships based on the overlapping visually ascertainable relationship.

The media relation generator 102 may be configured to, as part of selecting images for the set of candidate answer images, select at least one trap image associated one or more of the one or more inter-image visually ascertainable relationships that are not the one overlapping visually ascertainable relationship for the incorrect subset of images.

The trap images, or any incorrect images, may be selected to encourage a likely syntax error by the bot. A syntax error would include a situation where the object is misidentified within an image. For example, the trap image may be a picture of a person in a cat costume, which is likely to be misinterpreted by the bot as to what the image portrays or shows.

The trap images, or any incorrect images, may be selected to encourage a likely semantic error by the bot. The semantic error trap image may be an image that will likely be picked by a bot as indicative of a relation between images but unlikely to be picked by a human. For example, in FIG. 2A and FIG. 2B, the lion image may be a trap image, which would be an answer selected by a bot as a result of the set of question images having the apparent outer relation of being cat related, whereas a human user may understand that such a relation does not require an outer relation between the cat and mouse image.

In this way, the system 101 may not only increase the detection of bots, but it may also allow for flagging and documenting the target device 110 or entity performing the authentication as a potential malicious user. For example, the system 101 may log the IP address or target device 110 identifier used to attempt to authenticate as a potential malicious user. In response to encountering the flagged IP address or target device 110, the system 101 may immediately require a higher level of authentication in order to grant access to the electronic resources.

The system 101 may also try to build a profile of the suspicious bot in efforts to detect the bot despite minor variations to its features. For example, the system 101 may track, for each different challenge story presented to the trapped bot, the input characteristics of the user operating the agent, the response times, the IP address used, etc., to build a profile of the bot. Subsequently, users which portray a similar profile may be marked as suspicious, and require a greater level of certainty to authenticate.

The bot profiles may also be provided to the feedback engine 108, media relations generator 102, or selector 104 to augment challenge stories. For example, the amount of time a bot requires to identify an image may be part of the profile, and indicative of bot processing limitations. Such features may subsequently be used to introduce a time limit to answering which is specifically based on the bot latency, adding an increased level of difficulty for bots which require a lot of time to process images or media data. In some embodiments, the trapped bot may be shown multiple versions of the same trap image to detect the bots ability to identify objects within the trap image, and to test image distortion, or order to better calibrate challenge stories in the future.

The media relation generator 102 can assemble visual story challenges which include variations that modify a difficulty level of the story or visual story challenge. It is understood that the below discussion can be applied to both question media objects and candidate answer media objects.

For example, the difficulty of the visual story challenge may be increased by using one or more images (e.g., seed images) of either the set of question images or the set of candidate answer images which are difficult for machine learning engines to correctly identify.

The difficulty of the visual story challenge can be modified by increasing or decreasing the amount of images in either the set of question images or the set of candidate answer images. In a non-limiting example, the difficulty of the visual story challenge can be increased by using four images for the set of images which requires the image having intra-image visually ascertainable relationships to reveal the inter-image visually ascertainable relationship which requires the remaining three images to ascertain. In another non-limiting example, the set of candidate answer images are increased, making it harder to randomly select the correct image.

The difficulty of the mechanism can also be selected based on how many inter-image visually ascertainable relationships the set of question images contain. A set of images which has many inter-image visually ascertainable relationships (e.g., as shown in FIG. 2A and FIG. 2B) may make it more difficult for a bot to accurately predict the correct inter-image visually ascertainable relationship.

The difficulty of the mechanism can be selected based on how much cognitive distance is between the objects in the image and the intra-image visually ascertainable relationship. For example, where the first image and the second image are both actors (e.g., Michael Keaton, Christian Bale) and the third image is a picture of Batman from a movie, the intra-image relationship may be actors who have played Batman, which is not a very distant relation. However, where the intra-image visually ascertainable relationship is a verb such as growing or feeding, there is an increased level of cognitive distance between the object in the image and the relation between the objects.

The difficulty of the mechanism can be adjusted based on the order of the set of question images. In example embodiments, the question images, which may be typically associated with a left to right specific arrangements and placement for rendering on a graphical user interface, are changed so that the sequence is other than left to right. The relative arrangement of the images can be modified, for example, such that certain objects are not positionally proximate to one another by manipulating the order in which they are rendered, so that the images may be in a random order, or right to left, etc. For example, it may be difficult for the bot trained to read left to right to decipher a set of question images where the third image (e.g., the image with the intra-image visually ascertainable relationship) is the top left position, or a "first" position the bot is trained to seek, while it can be comparatively easier for a human user to adjust. The adjusted sequence may be presented to the agent prior to presenting the challenge story being rendered, and the mechanism may rely on human users having less difficulty in adapting to new sequences as compared to bots, where bot programming may be less inclined to exhibit this flexibility.

The adjusted order of the set of question images may be randomly generated, for example based on agent input information (e.g., random number generated based on agent mouse movements), or configured to change over time, etc.

The selector 104 selects a story or visual story challenge to be rendered on the display of the target device 110.

The selector 104 may select the story or visual story challenge from the database 114 or other storage location (e.g., the first image repository and the second image repository) based on a desired difficulty, based on difficulty described herein. For example, the selector 104 may be configured to select a more difficult visual story challenge where the request for authentication was provided as a result of suspicious activity.

In a non-limiting example embodiments, the selector 104 may be configured to select the story or visual story challenge based on the presence of or the type of suspicious activity resulting in the request for authentication. For example, the selector 104 may select progressively more difficult visual story challenges for agents which fail the visual story challenge, as described herein. In non-limiting example embodiment, the selector 104 may select an answer candidate set of images which includes the trap image where the suspicious activity of an unexpected location of an agent is detected, in an effort to trap a suspected bot.

In some embodiments the selector 104 selects a story based on the determined geographic indication of where the agent is residing. For example, where the database 114 receives or determines that the agent's IP address is associated with South Africa (e.g., 41.71.15.136), the selector 104 may select challenge stories which are more easily identifiable by a user from an African culture (e.g., using animals native to Africa, such as lions). In another non-limiting example, where the database 114 receives or determines that the agent's IP address is associated with Michigan (e.g., 173.162.61.13), the selector 104 may select challenge stories which are more easily identifiable by a North American culture (e.g. using animals native to North America, such as bears).

The renderer 116 renders or prepares for rendering the media objects selected by the selector 104 on the or for the target device 110.

The renderer 116 may be configured to render the selected images based on the display size of the target device 110. For example, the renderer 116 may reduce the size of the selected images to fit onto the display of the target device 110 in a 2 row format as shown in FIG. 2A and FIG. 2B. In some embodiments, the renderer 116 may configure the images to anchor points on the display to position the images in desired locations within the display of the target device 110. For example, the renderer may account for the display size and ensure that the first image is located on the top left of the target device 110.

In another non-limiting example embodiment, the renderer 116 may establish a positional layout for the set of question images for a graphical user interface, the positional layout establishing at least one non-adjacent position between a pair of the least two images having one or more inter-image visually ascertainable relationships. For example, the renderer 116 may determine that the target device 110 has a screen capable of supporting a 5×4 grid of uniform size for displaying images (e.g., the target device has a resolution of 750×1334 pixels—each grid location being 150*267 pixels). The renderer 116 may assigned one of the two images to a furthest top right location on the screen (e.g., the image occupies the 600-750, 0-267 pixel coordinates) and the second to the bottom right hand side of the screen (e.g., 600-750, 1067-1334 pixel coordinates).

Alternatively, the renderer 116 may provide instructions for the target device 110 to render a selected sound into a format which is interpretable by software available to play sounds on the target device 110 (e.g., the renderer may convert the selected sound media object into an MP3 file).

Once the visual story challenge is rendered on the target device 110, the user provides an authentication input to the agent on the target device 110, which is provided to the system 101. For example, the authentication input can be a selection of a correct image, an incorrect image, a help button, etc.

A response evaluator engine 106 (hereinafter referred to as evaluator 106) is configured to evaluate the authentication input (i.e., input data set representative of a user selection of media objects (e.g., images) of the set of candidate answer media objects (e.g., images)) and determine whether to grant (or whether to provision) the target device 110 access to the electronic resources 112, in part based on determining whether the user is a human or a bot. Alternatively, the evaluator 106 may require further visual story challenges to ensure security, or the evaluator 106 may prevent the target device 110 from accessing the electronic resources 112, acting as a gatekeeper.

In example embodiments, the evaluator 106 determines whether to provide the target device 110 access to the electronic resources 112 based solely on whether the correct image or media object was selected in the authentication input.

In another non-limiting example embodiment, the evaluator 106 determines whether to provide the target device 110 access to the electronic resources 112 based on a combination of whether the correct image or media object was selected and pre-existing user tendency information (as described herein), such as mouse or input interface movements, User Agent (UA) details (e.g., the type of browser), machine/device "signature" (a collection of many datapoints such as display resolution, machine type, CPU speed, and so on).

The evaluator 106 may utilize a trained machine learning architecture to determine whether the target device 110 is operated by a human user or a bot. For example, the evaluator 106 may incorporate a set of parameters representative of machine learning architecture which has been trained to provide increased importance to mouse or input interface movements to determine whether the agent of target device 110 is operated by a human user or a bot.

The user tendency information may be compared to a repository of general (e.g., all mobile users who have used the online banking platform) or specific user tendency information (e.g., the specific user tendencies associated with individuals accessing the particular bank account, or using the particular device). In some embodiments, the repository is dynamically or periodically updated with information from feedback engine 108. In example embodiments, said repository is operated by a third party, such as an image hosting community service, with object titles and listings obtained from the third party service dynamically (decreasing a likelihood that the agent will have encountered this combination before).

In certain scenarios, the evaluator 106 receives an authentication input which is indicative of an incorrect image, and determines whether to render a second (or subsequent) visual story challenge, end the authentication process, or attempt to trap the operator of the target device 110.

The evaluator 106 may, based on whether the trap image was selected, determine whether to quarantine or trap the agent further or whether to provide a second visual story challenge. For example, in example embodiments where the user tendency information is suspicious and the trap image was selected, the evaluator 106 may signal the selector 104 to select a second visual story challenge which has increased difficulty to trap the bot to log the bot's actions and determine further available information (e.g., location, IP address, browser or agent information, etc.).

In a further non-limiting example embodiment, the user tendency information may only have a low importance suspicious event (e.g., a different device than a user typically uses) or a low magnitude suspicious event (e.g., a user is in an unexpected part of the state, but still within the state) and the evaluator 106 may not determine that the selection of the trap image was accidental, and provide a second visual story challenge without flagging the agent as a potentially malicious user.

The evaluator 106 may determine whether to provide the target device 110 access to the electronic resources 112 based on the nature of the request that the target device 110 is attempting. For example, the evaluator 106 may use a higher threshold to allow requests which are indicative of transfers of large funds from a bank of an amount that is unusual to be completed by online banking.

In further non-limiting example embodiments, the evaluator 106 may determine whether to provide the target device 110 access to the electronic resources 112 based on information associated with the nature of the request. For example, the evaluator 106 may determine whether further authentication is required based on determining that the request to transfer money out of an account via online banking is outside the regular transfer behaviour for that account owner.

The evaluator 106 may be configured to determine a probabilistic output based on the provided data in order to determine whether to grant access to the electronic resources. For example, the evaluator 106 may determine there is a 60% chance that the access should be granted (implicitly indicating that the user is human).

The evaluator 106 may be configured with a threshold probability required to grant access to the electronic resources. The threshold probability may be a determined probability to ensure that, with enough challenge stories, there is a nominal likelihood of a bot successfully being granted access to the electronic resources.

The feedback engine 108 is configured to collect and record all data from all authentication input and visual story challenges sets. In example embodiments, the feedback engine 108 stores information not pertaining to the authentication input and visual story challenge, such as the type of target device 110 used, the amount of time until an authentication input was received, and so forth.

The feedback engine 108 may further update or augment the media relation generator 102, the selector 104, or the evaluator 106.

In some embodiments, for example, the feedback engine 108 may determine that one or more visual story challenges are too difficult for users to discern. For example, a particular visual story challenge may be used 100 times with only one user being able to discern the overlapping visually ascertainable relationship. As a result, the feedback engine 108 may signal one of the media relation generator 102, the selector 104, the evaluator 106 to either not use/select that particular visual story challenge, or to treat it as faulty in assessing a selection of a trap image. A trap image example is the lion example as shown in the cat-mouse/feeding example.

Similarly, the feedback engine 108 may determine that one or more visual story challenges are too easy for bots to discern. For example, a particular visual story challenge may be used 1000 times with every user managing to identify the correct image base on the overlapping visually ascertainable relationship. As a result, the feedback engine 108 may signal one of the media relation generator 102, the selector 104, the evaluator 106 to either not use/select that particular visual story challenge, or to require a second visual story challenge to be used in conjunction with that particular visual story challenge. For example, the signal may be a new set of parameters provided to the evaluator 106 which reduce the weight of the particular image in assessing whether the agent is operated by a human or bot to near zero. Alternatively, the signal may be a signal to the media relation generator 102 to delete the particular challenge story.

Figure 3:
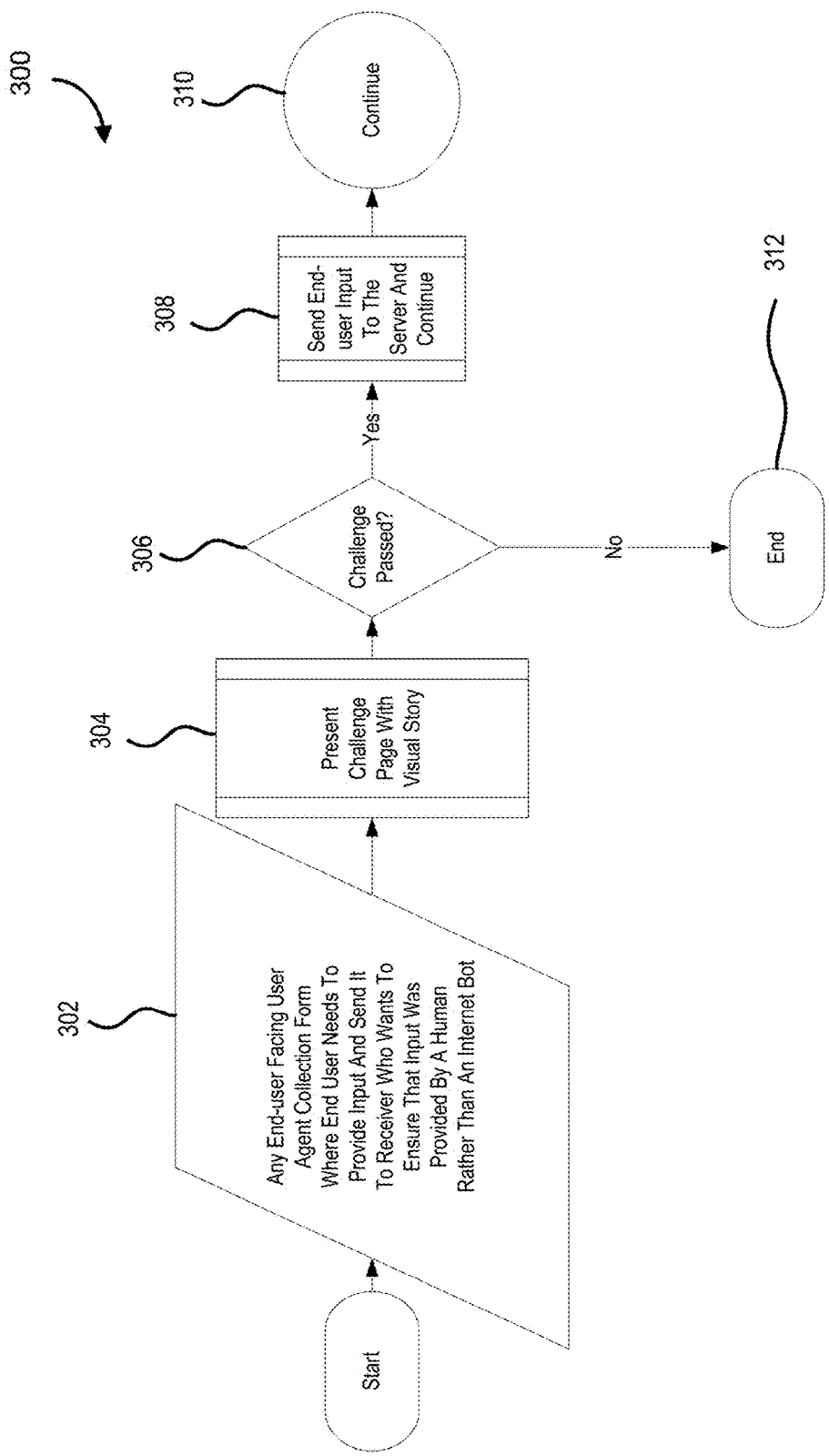
FIG. 3 is a method diagram illustrating an example visual story challenge presentation, according to some embodiments.

Referring now to FIG. 3, an example method 300 illustrating an example visual story challenge presentation (alternatively referred to as a visual story challenge) is shown.

At step 302, the system 101 receives a request to provide a visual story challenge which is based on a reverse tuning test and a corresponding request to access electronic resources 112. The request may originate from within the system 101. For example, where the system 101 and target device 110 are integrated within a financial institution network, the request may arise from the actions of a user interacting or using a platform and attempting to retrieve or access sensitive electronic resources (e.g. an employee attempting to use banking functionalities to make large transfers), such as personal banking information, or commercially sensitive information, such as offered interest rates.

In some embodiments, for example, the request to provide a visual story challenge originates remote the system 101. In a non-limiting example embodiment, the request may originate directly as a result of user input at the target device 110 which is seeking access to the electronic resources 112. For example, an online banking platform on a target device 110 (e.g., a mobile device), which provides access to banking electronic resources 112, may request the visual story challenge as a precondition to using the online banking platform before contacting the bank server and provide the bank server with a hash indicative of a successful authentication. Alternatively, the act of accessing certain web transactions may trigger an embedded authentication request, similar to a Captcha™.

In another non-limiting example embodiment, the request may originate from a third party (not shown), based on interaction between the third party and the target device 110. For example, a target device 110 may interact with a third party which stores sensitive personal information such as health records, and the third party may, based on a request from target device 110 to access the health records, either require the target device 110 to connect to system 101 to complete authentication, or request the visual story challenge itself in order to display to the target device 110.

In some embodiments, the request to provide the visual story challenge arises based on detecting or determining suspicious activity at the target device 110 or at the request originator.

The suspicious activity can be based on pre-existing information about the user or target device 110 attempting to connect to the electronic resources 112. For example, where system 101 is integrated with a financial institution, the financial institution may use existing user information within system 101 (e.g., at database 114) allowing system 101 to determine whether an authentication for the target device 110 should be required. In example embodiments, the visual story challenge of system 101 may be triggered automatically by the financial institution system which is not part of system 101 upon sensing suspicious activity at target device 110.

Suspicious activity can include the target device 110, or the request originator, connecting from a location which is indicative of suspicious activity. For example, where the target device 110 is typically located in the United States, but attempts to connect to electronic resources 112 from Canada, the system 101 may automatically trigger the displaying of the visual story challenge. The location of the device can be determined based on an IP address, or based on location information received from the device (e.g., GPS information), for example.

Suspicious activity can found be based on pre-existing user tendency information. For example, learning from data in users' or agents' past authentication attempts, such as location/network, time of day, device fingerprint, pattern of access, or keystroke dynamics can provide an indication that the agent is being operated by the user typically associated with the target device 110 or the user associated with the electronic resources 112 to which access is being requested (e.g., the user associated with the bank account at the financial institution).

In another non-limiting example embodiment, the suspicious activity based on user tendency information can include determining the type of browser used to attempt to access the electronic resources 112, the type of device that is being used, etc.

Suspicious activity can be found where the target device 110 failing a previous visual story challenge. For example, where the target device 110 fails a username/password authentication, the target device 110 may be required to complete the visual story challenge of system 101 in order to proceed.

Finally, suspicious activity can be found in scenarios where the underlying computing resource 112 which is being accessed has encountered previous suspicious activity. For example, the visual story challenge of system 101 can be requested where the bank account computing resource seeking to be accessed has itself experienced suspicious activity in the past, irrespective of other factors.

Upon receiving a request to provide the visual story challenge, the system 101, via selector 104, retrieves the set of question images and the set of candidate answer images.

At step 304, the renderer 116 renders and presents the visual story challenge (shown as the challenge page) which consists of the set of question images and the set of candidate answer images.

At step 306, the evaluator 106 determines whether the correct image was selected from the set of candidate answer images. In response to determining that the incorrect image was selected, the evaluator 106 may simply end the authentication without providing access, as shown in step 312.

In response to determining that the correct image was selected, the evaluator 106 permits the agent request to access to the electronic resources 112 to interact with the electronic resources 112, as shown in step 308.

At step 310, the agent of the target device 110 may be granted access without further authentication required to the electronic resources 112.

The system 101 includes a probabilistic model checking approach that can be used to quantify properties of new online authentication process. The model for the verification of process feasibility is used that implies qualitative verification and its quantitative evaluation.

The system 101 which is based on a model as described herein may determine that single authentication event (including an visual story challenge display and corresponding authentication input) may not be enough to confidently authenticate the agent, and that the authentication process may need to repeat authentication events multiple times.

Based on past successful authentications, the system 101 may be able to quantify how confident the system 101 is that a given agent is who he or she claims to be.

The system 101 may be configured to render a threshold number of visual story challenges to ensure that a bot defeating the threshold number of visual story challenges will be unlikely within a degree of confidence. Based on the threshold number of visual story challenges, the evaluator 106 may provide probabilistic outputs based on the provided data and authentication inputs. The probability of true positive detection may exponentially increases with each additional step (i.e., visual story challenge navigation) it will never reach 100%.

In some embodiments, the feedback engine 180 uses machine learning architectures (MLAs) to process stored data to continually improve the evaluator 106 ability to detect bots (e.g., updating the parameters used by evaluator 106 to determine whether to grant access or wither the operator of device 110 is a human). By adding MLAs, an improved approach may further increase the probability of true positive detection.

MLAs recognize patterns from previous data for the purpose of making decisions or predictions based on new data. The feedback engine 180 may use MLAs which can be supervised, unsupervised, and/or utilize reinforcement learning. Feedback engine 180, when implementing supervised learning, is capable to solve a large class of problems in the area of classification and regression.

A classification problem is presented to classify the observations (e.g., authentication inputs) into categorical discrete classes. In example embodiments, the feedback engine 108 is configured to use an MLA which classifies observation into four classes according to the Table 4. In some embodiments, for example, the feedback engine 180 includes an MLA which divides observations into two main classes (i.e., a binary classifier): the class of Miss case (alternatively stated, erroroneus access provided) and the class of all other cases.

The feedback engine 108 MLA may use classification algorithms, including algorithms such as Naive Bayes Classifier, Support Vector Machines, Decision Trees, Boosted Trees, Random Forest, Neural Networks, Nearest Neighbour.

As more data is provided to feedback engine 180 MLA, the feedback engine 180 becomes better and consequently over-time the system improves itself.

Incorporating MLAs in the feedback engine 108 or the evaluator 106 can be useful to address new bots, or bots which increase their skills over time. The MLAs can provide for continuous improvement, and the improvement can be rapid depending on the number of new data collected by the system 101.

In example embodiments, the machine learning architecture described in relation to the feedback engine 108 is incorporated into evaluator 106.

In some embodiments, the threshold number of visual story challenges is based in part on a probability of a bot successfully navigating the visual story challenges. In some embodiments, the threshold number of visual story challenges is based on the assumption that the bot randomly selects media objects.

As will be described herein, the threshold number can be based on a true positive rate, a false positive rate, a number of expected steps to reach a desired state or outcome, and so forth.

It can be assumed that user interface components, user agents, and machine or device signatures can recognize bots 80% of time. The system presented in some approaches that employs behavioural biometrics, including mouse and keystroke dynamics is capable to detect 97.9% of blog bots with a false positive rate of 0.2%.

In order to model a bot successfully navigating the visual story challenges based on randomly selecting media objects, it can be assumed that a human user is always more skillful than the subject bot, meaning that the human is more likely to discover the relation between images and especially inside an image compared to the bot. In a conservative estimation, Applicant assumes that the system 101 can, in example embodiments, positively distinguish bot from human in 80% of time.

The visual story challenge will inevitably include scenarios where (1) the bot selects the correct image and (2) a human selects an incorrect image. In the first case, when the bot selects correct image without additional verification, the bot may be granted access to unauthorized data. In the second case, the user will not have access to his own data.

Four possible combinations of visual story challenges interactions and their impact on the system 101 are shown in Table 1.

TABLE 1

Authentication options

| Image | Human | Bot | Impact | Damage |
|---|---|---|---|---|
| Correct | Yes | No | No | No |
| Correct | No | Yes | Yes | Severe |
| Incorrect | Yes | No | Yes | Low |
| Incorrect | No | Yes | No | No |

The system 101 may be designed in such a way that the probability of severe damage caused by the bot during lifetime of the system is extremely low, or close to impossible by using a large number for the threshold number of visual story challenges. The system 101 may be able to, at the same time, minimize the damage caused by a failure to authenticate right user by using the threshold number of visual story challenges which corresponds to a desired estimated likelihood of a bot navigating multiple visual story challenges.

In some scenarios, human users of the system 101 are divided into three $\sigma$ groups based on the image recognition skills. This may be a user tendency stored as described herein.

In such an example embodiment, the approach may include utilizing a normal distribution to represent average human users of the level $\sigma$ 1 being able to select correct images 68% percent of time, advanced customers of level $\sigma$ 2 being able to select correct images 95% of time, and exceptional customers being able to select correct images 98% of time. The number of groups may be used to represent user ability to discern inner or outer relationships may vary.

In some embodiments, all human users may initially be placed at the level 1 and move to higher levels based on performance. For example, when the system 101 receives a request to access electronic resources 112 associated with a previously unseen user (e.g., an online banking account for a new customer), the system 101 may generate a profile for that user and assign a level 1 ability. With each challenge story the user passes, the system 101 may reevaluate the user's ability. For example, if the user has difficulty passing a level two challenge story, or if there is a subsequent user call to the account support services related to accessing the electronic resources 112, the system 101 may designate said user with a lower or the lowest difficulty setting. Alternatively, users who solve challenge stories very quickly may be presumed to have a higher ability to navigate challenge stories, and therefore be assessed at being a higher level.

In some variant embodiments, the user skill may be associated with the likelihood that the user may have a compromised system or credentials. For example, where the user information has been compromised to a large extent (e.g., the user password needs to keep being changed as a result of internet breaches), the user may be placed at a lower skill level. Alternatively, the user may be placed at a higher skill level to indicate the increased likelihood of bot activity associated with the user.

In example embodiments, users are assigned a level based on a predicted ability. For example, a user who never forgets his password may be judged to be more skillful and placed in a higher level.

In such an example embodiment, the stories or visual story challenges presented to agents can be divided into three groups: short (e.g., 3 media objects in both the question and candidate answer sets), tall (e.g., 4 media objects in both the question and candidate answer sets), and grande (e.g., 5 media objects in both the question and candidate answer sets).

In the model, the system 101, for example via media relation generator 102, is configured to make visual story challenges such that it is more difficult to find outer relations between five media objects as compared to between three media objects.

Table 2 shows a graph of image selection probabilities vs. customer level and story level based on the assumptions for the example embodiment:

| Customer Level | Story | $p_{00}$ | $p_{01}$ | $p_{02}$ | $p_{03}$ |
|---|---|---|---|---|---|
| σ1 | short | 0.997 | 0.003 | 0.8 | 0.2 |
| σ1 | tall | 0.95 | 0.05 | 0.8 | 0.2 |
| σ1 | grande | 0.68 | 0.32 | 0.8 | 0.2 |
| σ2 | short | 0.99936 | 0.00064 | 0.8 | 0.2 |
| σ2 | tall | 0.997 | 0.003 | 0.8 | 0.2 |
| σ2 | grande | 0.95 | 0.05 | 0.8 | 0.2 |
| σ3 | short | 0.99999942 | 0.00000058 | 0.8 | 0.2 |
| σ3 | tall | 0.99936 | 0.00064 | 0.8 | 0.2 |
| σ3 | grande | 0.997 | 0.003 | 0.8 | 0.2 |

The first probability column ($p_{o0}$) denotes the likelihood of the agent correctly guessing the correct image in a single visual story challenge, and reflects the increasing difficulty of correctly navigating visual story challenges with more images. The second probability column ($p_{o1}$) denotes the likelihood of the agent incorrectly guessing the correct image in a single visual story challenge. The third probability column ($p_{o2}$) denotes the assumption that the system 101 can accurately guess a bot 80% of the time, with the corresponding fourth probability column ($p_{03}$) denoting the assumption that the system 101 in accurately determines a bot 20% of the time.

Table 3 shows the assumed probabilities that bot will select the correct image and be positively identified by the system 101 in such an example embodiment:

| Bot Level | Story | $p_{00}$ | $p_{01}$ | $p_{02}$ | $p_{03}$ |
|---|---|---|---|---|---|
| advanced | short | 0.50 | 0.5 | 0.8 | 0.2 |
| advanced | tall | 0.40 | 0.6 | 0.8 | 0.2 |
| advanced | grande | 0.35 | 0.65 | 0.8 | 0.2 |

Figure 4A:
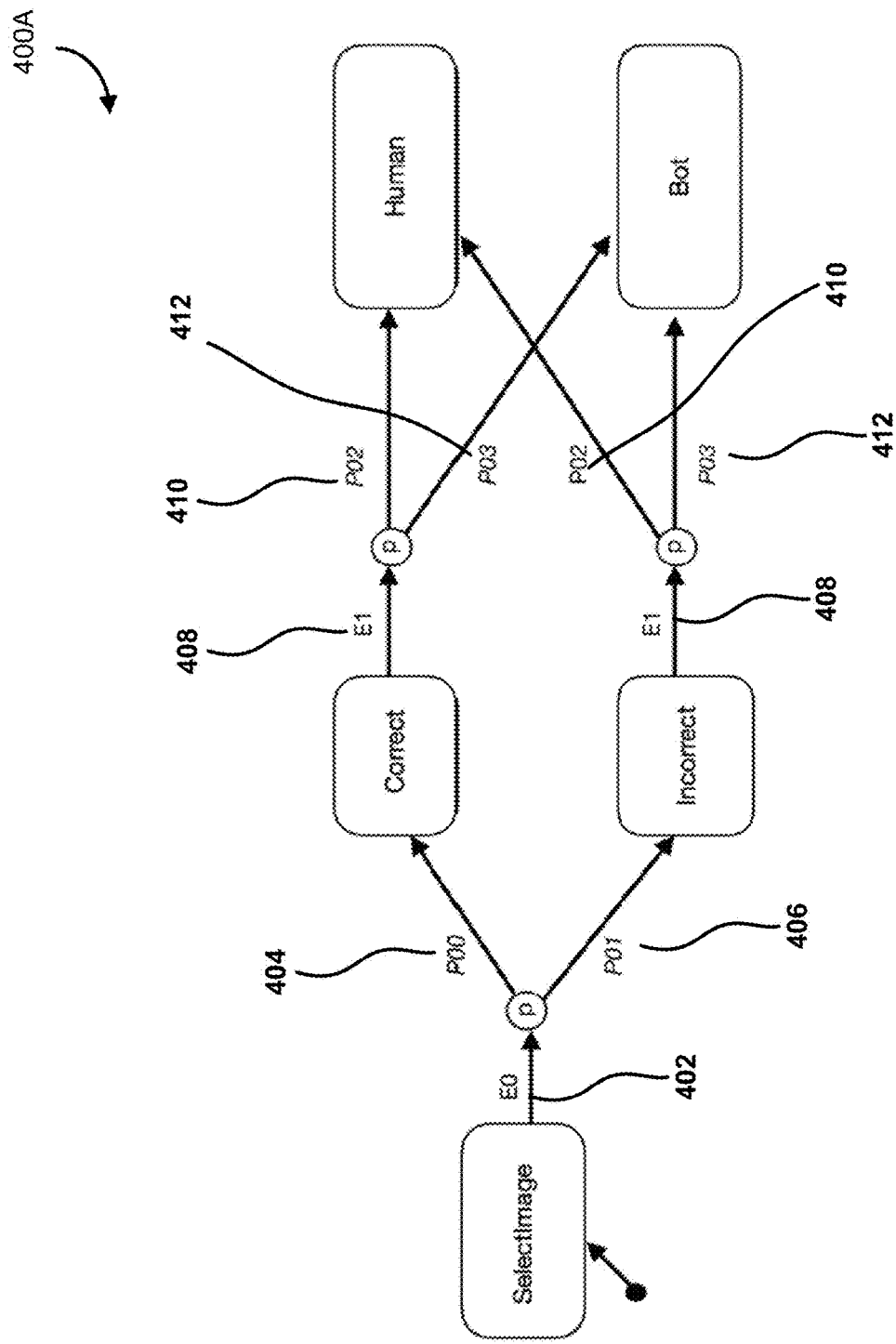
FIG. 4A is a probability tree diagram for an example system distinguishing between human user and bot computing resource access requests, according to some embodiments.
Figure 4B:
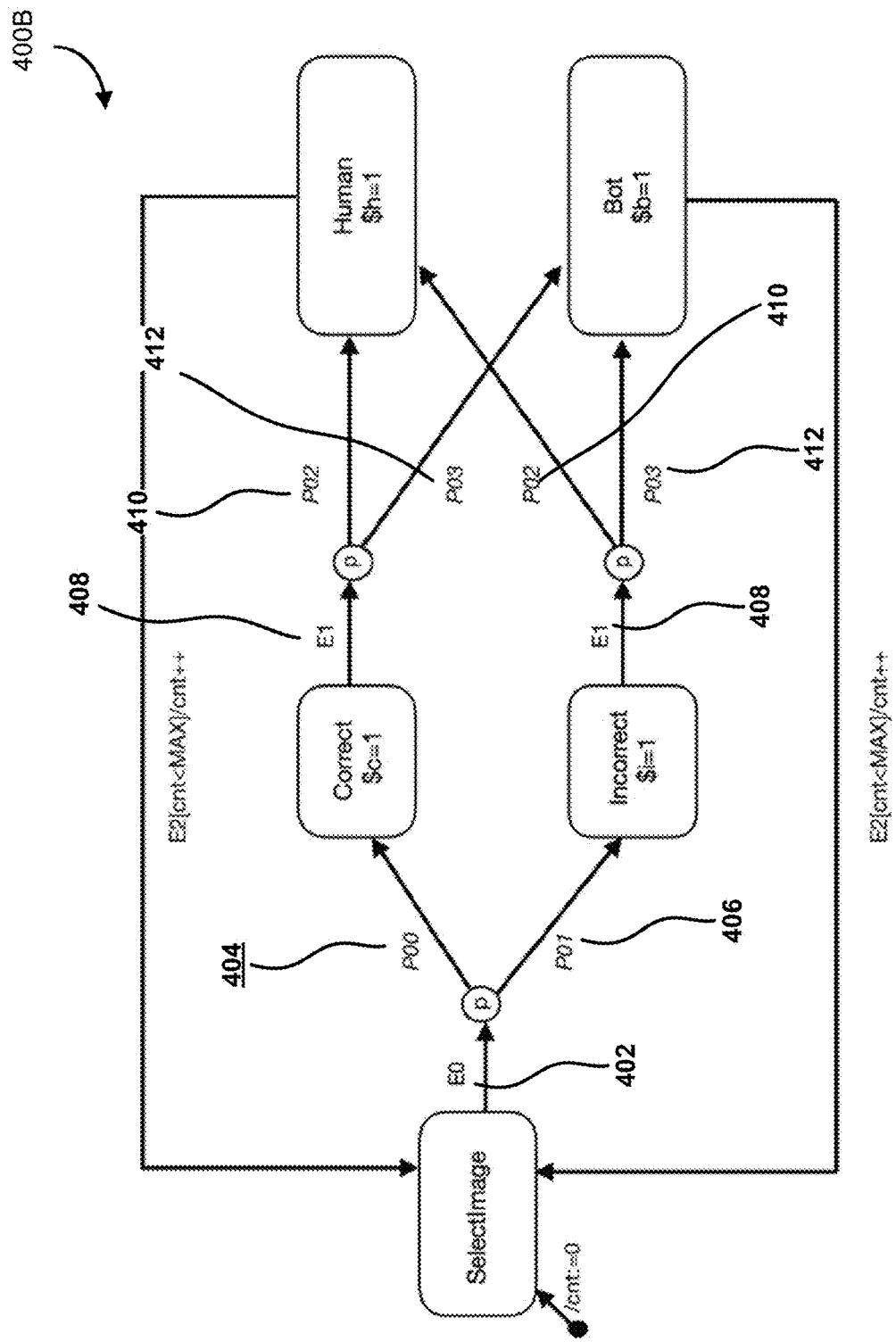
FIG. 4B a probability tree diagram for an example system distinguishing between human user and bot computing resource access requests, according to some embodiments, where a probabilistic model data architecture is applied.

Referring now to FIG. 4A and FIG. 4B, probability tree diagrams for example system distinguishing between agents, requesting access to resources, operated by human users and bots. The models 400A and 400B of FIG. 4A and FIG. 4B assume that the visual story challenges are used or repeated multiple times without changing their difficulty level.

The model 400A includes the event that represents image selection that is shown by transition state 402, denoted by E0. The transition state 402 has two alternatives: with probability 404 (denoted by $p_{00}$) that the agent selects (or alternatively stated that the system 101 goes into) the correct state, and the probability 406 $p_{01}$ that the agent selects (or alternatively stated that the system 101 goes into) the incorrect state.

The transition state 408 (denoted by E1) represents the event that the evaluator 106 determines that the agent is either operated by a human or robot. With the probability 410 (denoted by $p_{02}$) indicative of a probability of the evaluator 106 determining that the agent is operated by a human (alternatively stated, visiting or experiencing a human state), and the probability 412 (denoted by $p_{03}$) indicative of a probability that the evaluator 106 determines that the agent is operated by a bot (alternatively stated, visiting or experiencing a bot state).

The probabilities 404, 406, 410 and 412 may be estimated based on information stored by the system 101. For example, the probabilities may be estimated by the system 101 based on the data acquired from the UI components of the target device 110, such as mouse movements, and the type of user agent, and so forth.

Based on the probabilities shown in Table 3, the probability that a human selects the correct image, and that the system 101 confirms that the image is selected by a human is:

$$0.68*0.8=0.544 \qquad (1)$$

As presented in Table 4 below, which shows bot detection outcomes, this is defined as the true positive rate.

| True Positive - Hit | False Positive - False Alarm |
|---|---|
| False Negative - Miss | True Negative - Normal |

The meaning of true positive is that when the system 101 predicts that the operator of the target device 110 was a bot, it was a correct prediction. When the bot was the operator but this fact not detected by system 101, the system 101 can be said to have predicted a false negative case. A false negative case has the most serious consequences for system 101.

Accordingly, based on Table 3, the probability that the human user selects the correct image, but that the system 101 thinks that the correct image was selected by bot or is a false positive is:

$$0.68*0.2=0.136 \qquad (2)$$

The system 101 may be re-configured, or automatically reset or randomize parameters in response to detecting that the authentication process which includes the visual story challenges can only positively identify a human user less than 50% of time (e.g. has a low confidence value).

In example embodiments, the threshold number of visual story challenges is based on a model, for example the model shown in FIG. 4B, where the transition events are iteratively repeated until a desired expected value of correctly determining a bot is reached based on the probabilities 404, 406, 410 and 412. For example, the threshold number of visual story challenges may be determined by simulating visual story challenge events based on the based on the probabilities 404, 406, 410 and 412, until the rate of true positive is increased past a certain value (e.g., 97+%).

The model 400B, for example as shown in FIG. 4B, can with each iteration show the probability of true positive detection rate increasing, while false positive decreases. For example, the model 400B may determine that the system 101 needs to repeat authentication (e.g., show visual story challenges) up to specified MAX number of times (e.g., the threshold number of visual story challenges). For the purposes of the experiment, the maximum number of retries was fixed to five.

In example embodiments, the models 400A and 400B can assign a reward to each state to be used to reason about a wider range of quantitative measures relating to model behavior. For example, the system 101 can compute the expected number of transitions that pass through the correct state and base a reward for achieve the states to determine the threshold number of visual story challenges. For example, correctly navigating a visual story challenge which is easy can lead to a lower reward as it is expected to be correctly navigated, and so this may not provide further information to distinguish between agents operated by human users and bots.

Figure 5:
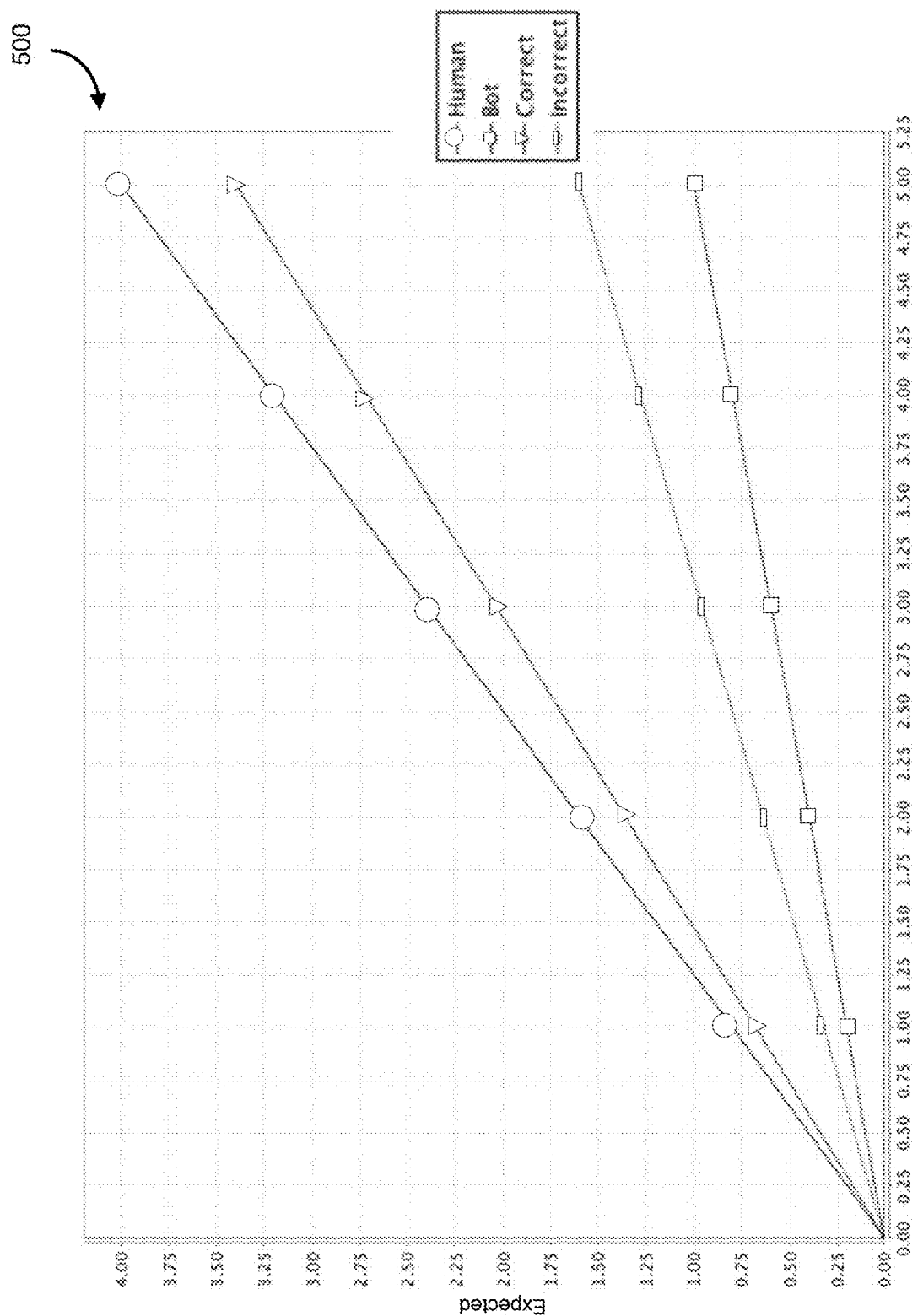
FIG. 5 is a chart of expected outcomes mapped against steps for a σ1 customer, according to some embodiments.

FIG. 5 is a chart 500 of showing the expected outcomes (the states, namely correct, incorrect, human and bot) mapped against steps (i.e., the number of visual story challenges that were presented to an agent) for $\sigma$ 1 customer.

In FIG. 5, the expectation to visit the states Correct, Incorrect, Human, Bot in each step is shown. For instance, it is expected that in five steps $\sigma$ 1 user detects correct image 4 times. The threshold number of visual story challenges can be based on a desired value of the states Correct, Incorrect, Human, and Bot.

Those expected outcomes may in example embodiments be calculated by a probabilistic model checker PRISM, based on the probabilistic computational tree logic (PCTL) reward formula:

$$R\{"h"\}max=?[F(\text{root=SelectImage})\&(\text{cnt=Step})] \qquad (3)$$

Reward formula 3 calculates the costs of being in the state Human. The path property "F" is eventually or future operator.

The state costs is specified according to pCharts syntax. The notation "$h=1" at the state in FIG. 5 means every time state Human is reached, the variable h will increase its value by maximum 1. If the probability that the state is reached is p, $0 \le p \le 1$, h will increase for $\Delta = p*h$. The calculation for other three states Correct, Incorrect, and Bot is done over similar formulae, and the result is shown in graph in FIG. 6.

Next the approach includes estimating the probability of how many times the Correct state will be reached with respect to the number of authentication iteration steps.

Figure 6:
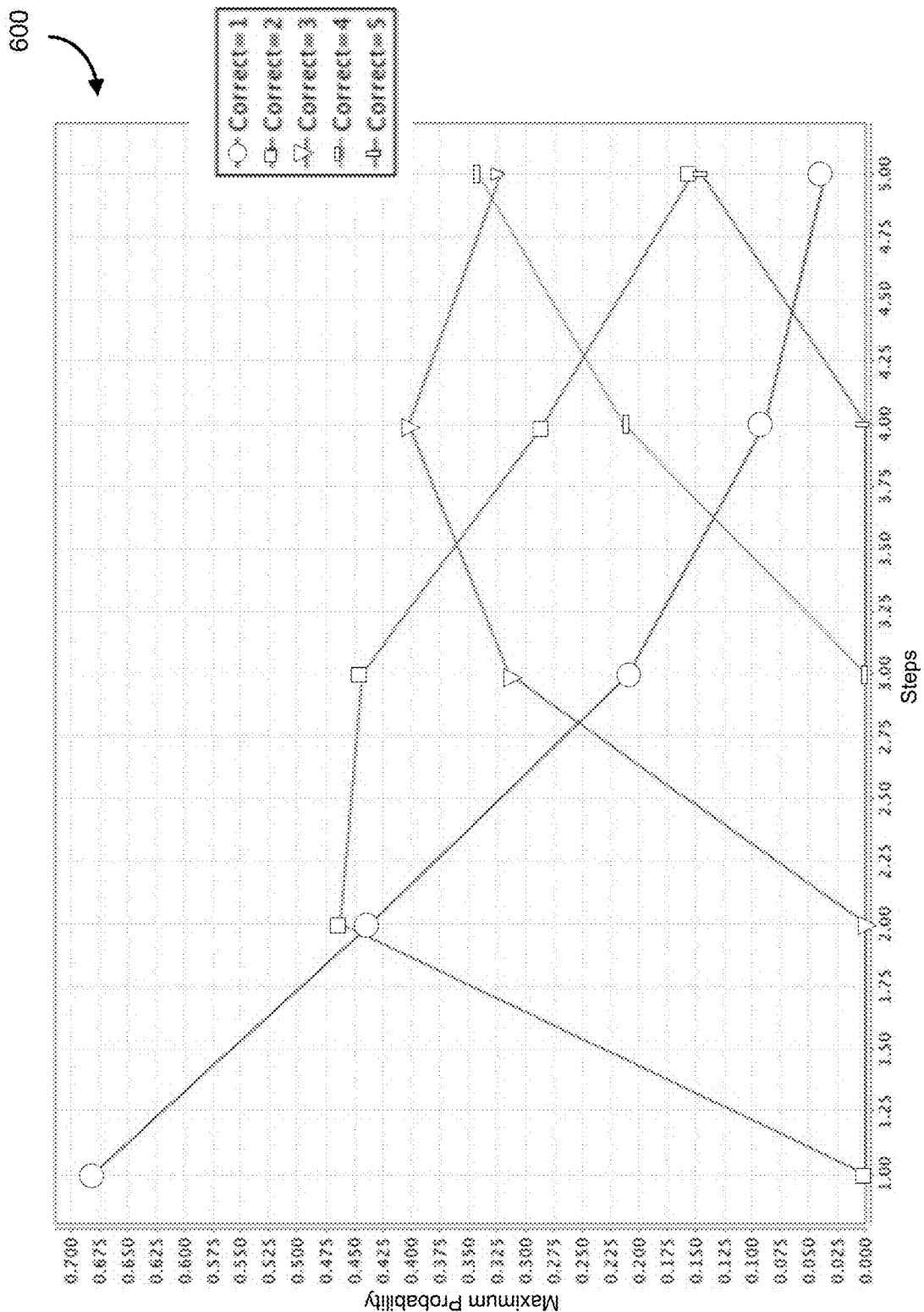
FIG. 6 is a chart indicating probabilities to have a particular number of correct states in each step for a σ1 customer mapped against steps illustrative of experimental results, according to some embodiments.

FIG. 6 is a chart 600 indicating probabilities to have a particular number of Correct states in each step for a $\sigma$ 1 customer mapped against steps illustrative of experimental results, according to some embodiments.

The calculations done in FIG. 6 are done based on the PCTL formula shown below:

$$P\min=?[F(\text{root=SelectImage})\&(\text{cnt=Steps})] \qquad (4)$$

As shown in the chart 600, based on the probabilities in Table 3, with the probability of a $\sigma$ 1 user getting the correct answer of %0.68 of the time, the Applicant can expect the correct state to be reached in one step. The probability that the Correct state is reached in two steps twice is %0.462, and that the Correct state is reached only one time in two steps is %0.435.

Figure 7:
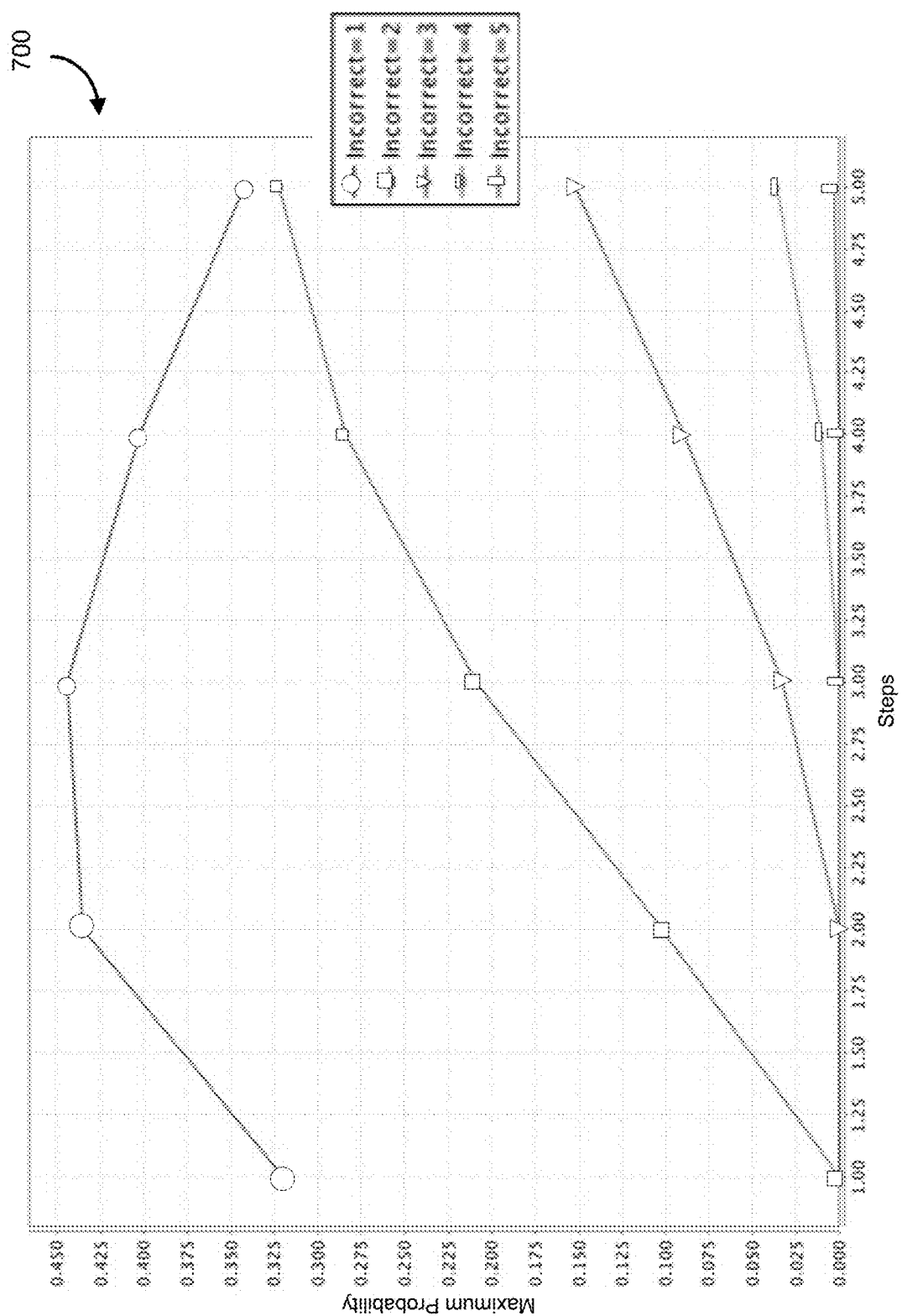
FIG. 7 is a chart indicating probabilities to have a particular number of incorrect states in each step for a σ1 customer, illustrative of experimental results, according to some embodiments.

Similarly, based on a similar formula the Applicant calculates the probability of how many times the Incorrect state will be reached with respect to the number of steps. Those calculations are shown on graph in FIG. 7. FIG. 7 is a chart 700 indicating probabilities to have a particular number of Incorrect states in each step for $\sigma$ 1 customer, illustrative of experimental results, according to some embodiments.

In the example of user $\sigma$ 1 being the least skillful and if the system 101 can distinguish human from bot %80 of time, even with repeated visual story challenges it will be hard to determine in the first three visual story challenge iterations to positively identify a least skillful user. While repeating process more than three times will increase probability of positive detection, it may be inconvenient to use.

For more skillful $\sigma$ 2 users the probability to select the correct image related to grande story is 0.95 or 95% and for the most skillful is it 0.997 or 99.7%.

Figure 8:
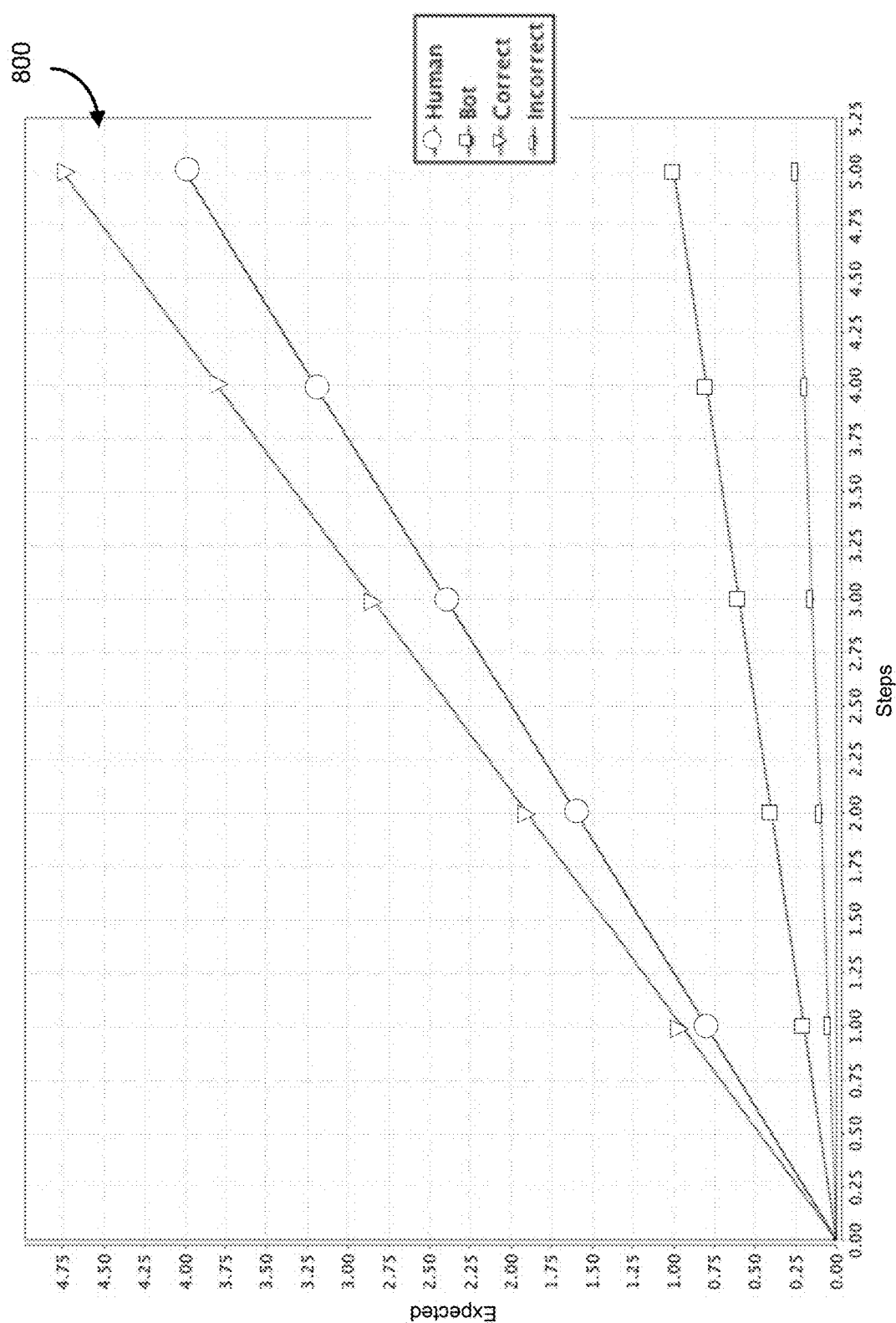
FIG. 8 is a chart showing results for more skillful σ2 customers, in relation to expected outcomes, according to some embodiments.
Figure 9:
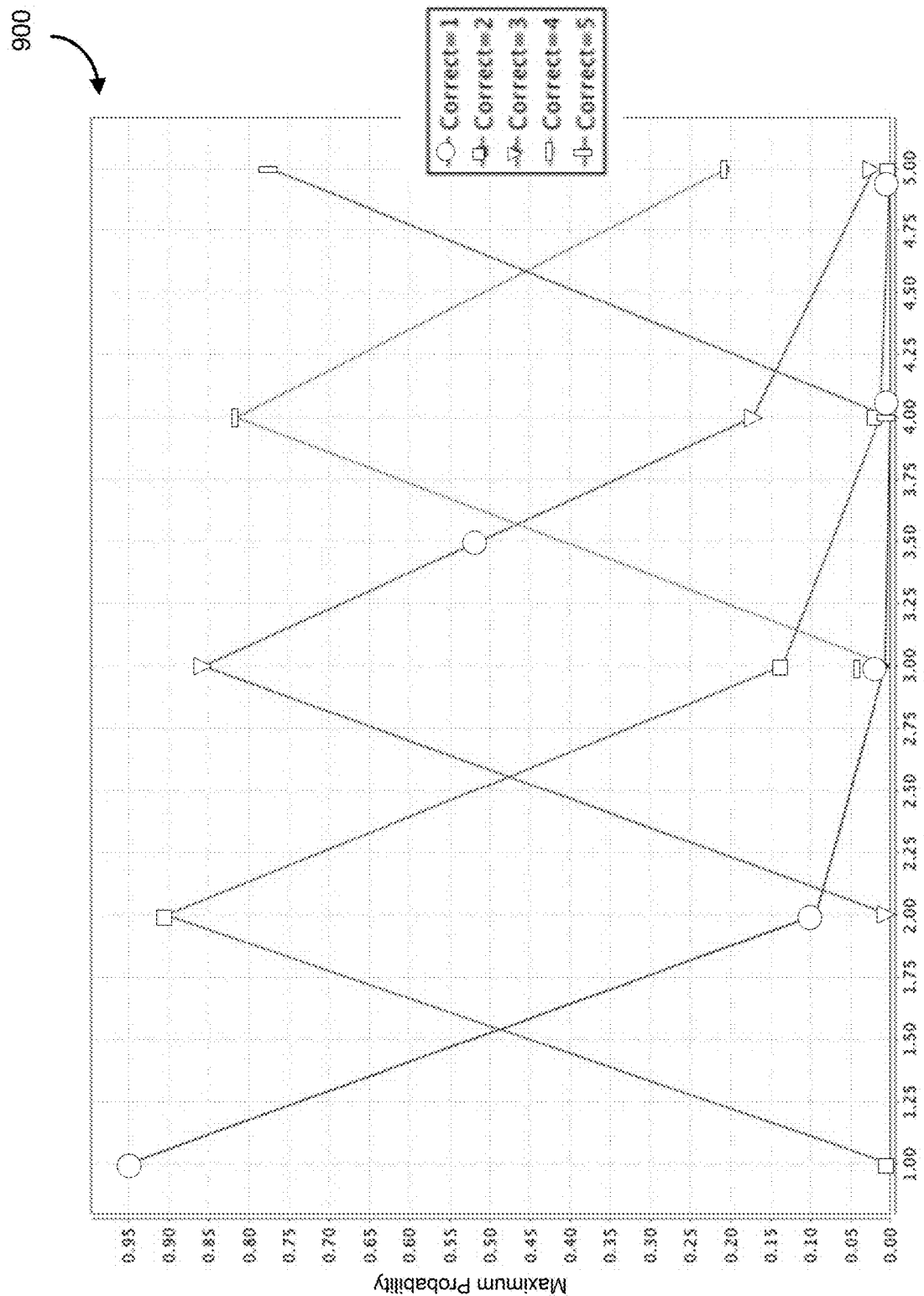
FIG. 9 is a chart showing results for more skillful σ2 customers, in relation to correct outcomes, according to some embodiments.
Figure 10:
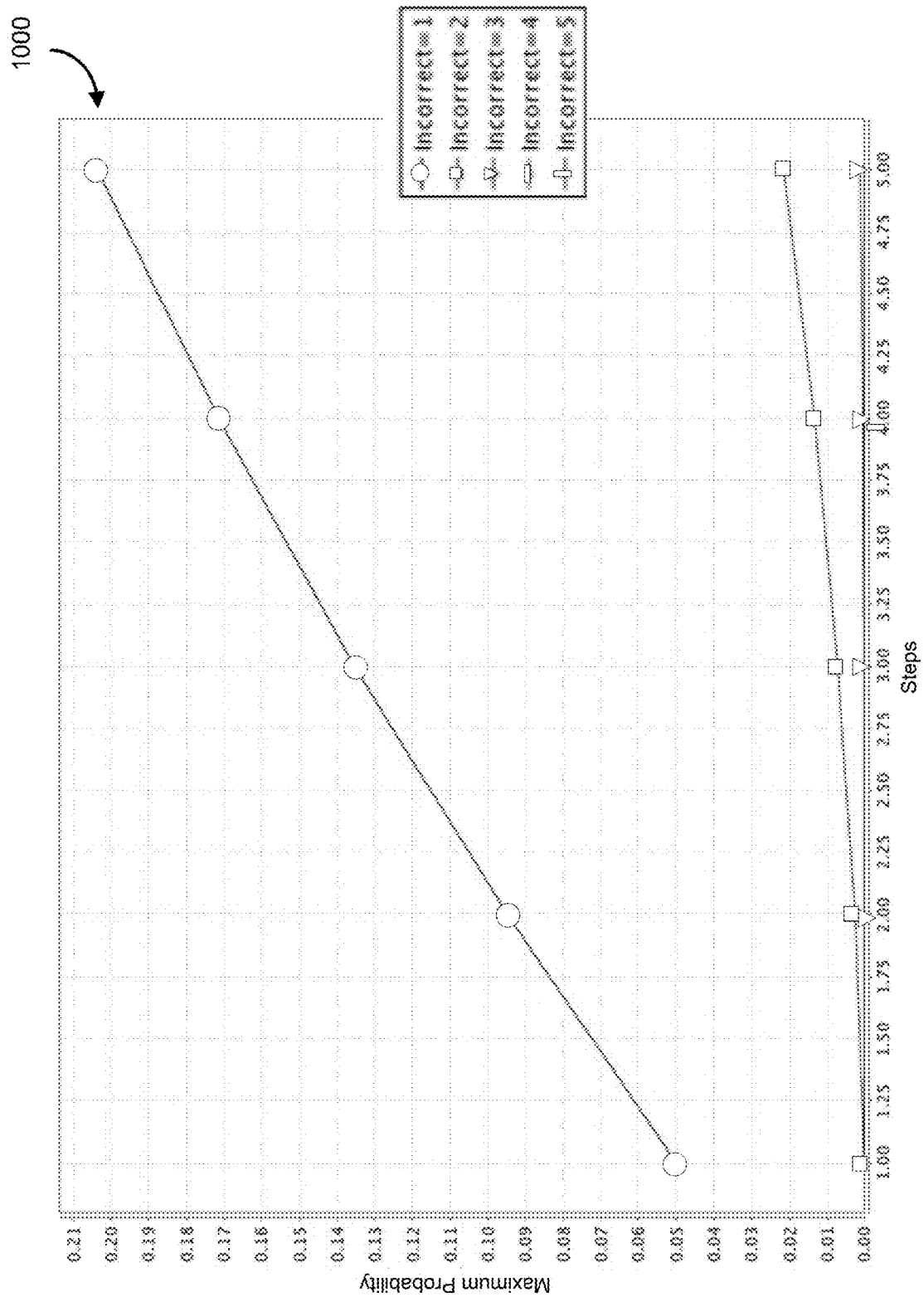
FIG. 10 is a chart showing results for more skillful σ2 customers, in relation to incorrect outcomes, according to some embodiments.
Figure 11:
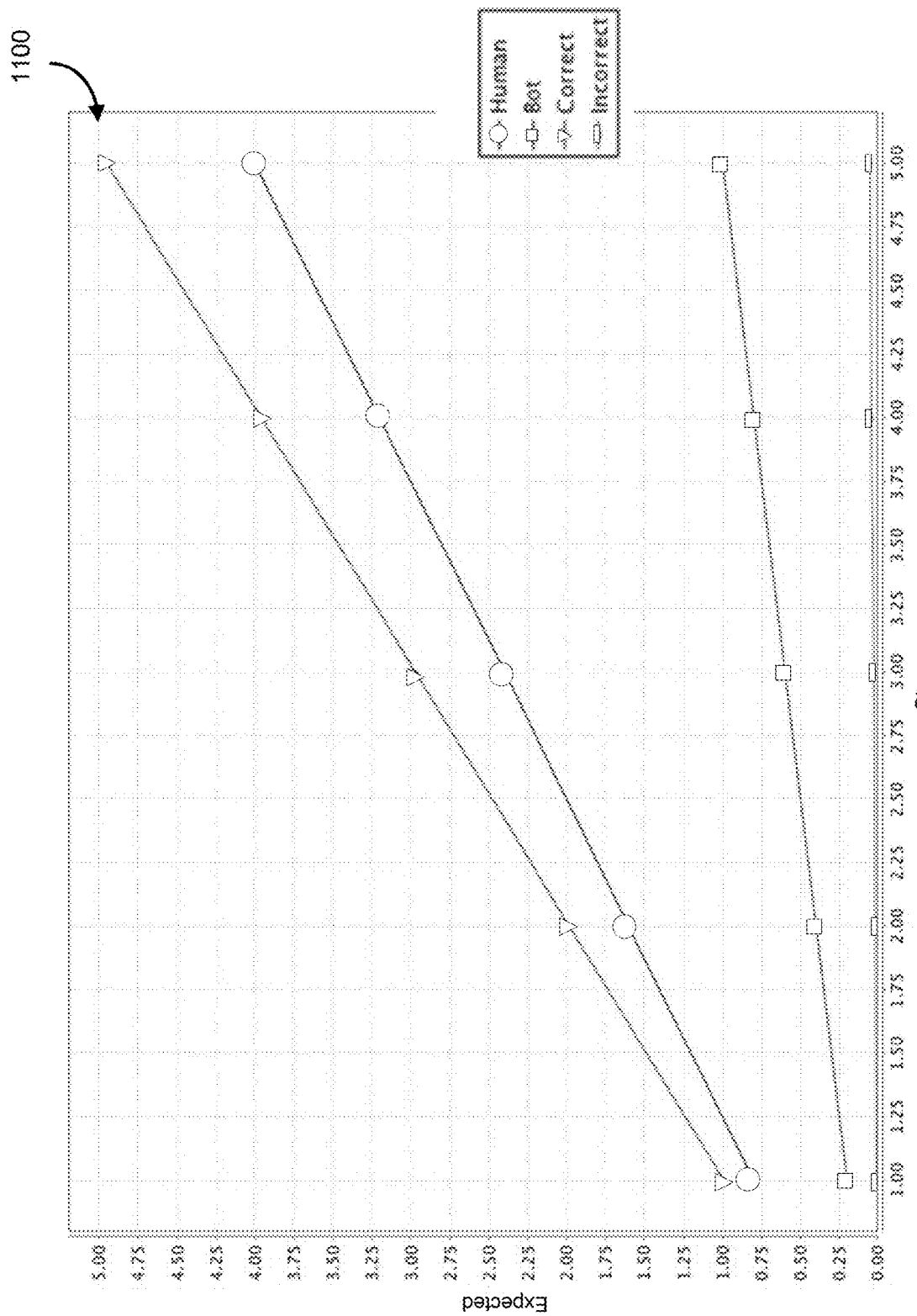
FIG. 11 is a chart showing results for more skillful σ3 customers, in relation to expected outcomes, according to some embodiments.
Figure 12:
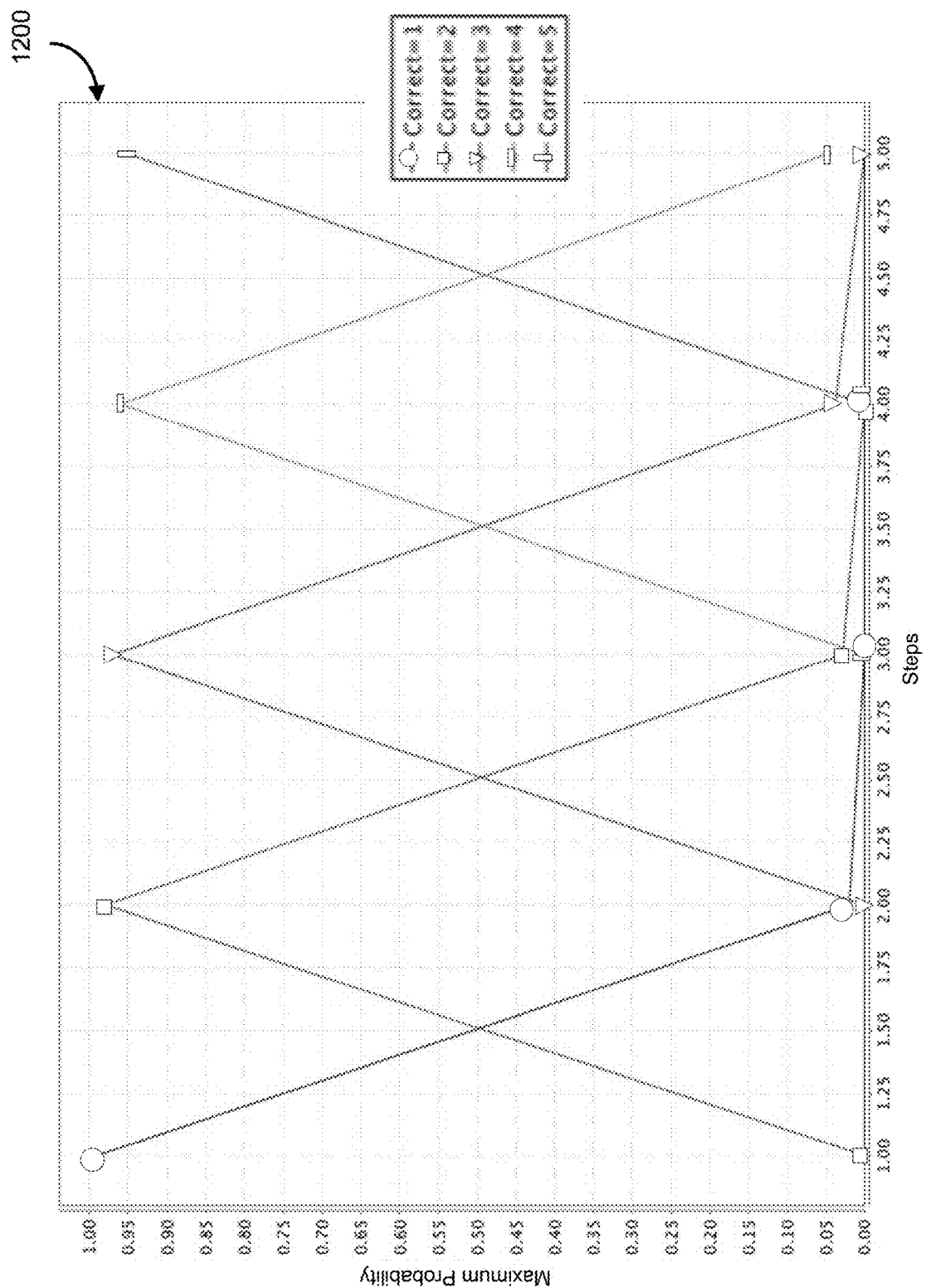
FIG. 12 is a chart showing results for more skillful σ3 customers mapped against steps for, in relation to correct outcomes, according to some embodiments.
Figure 13:
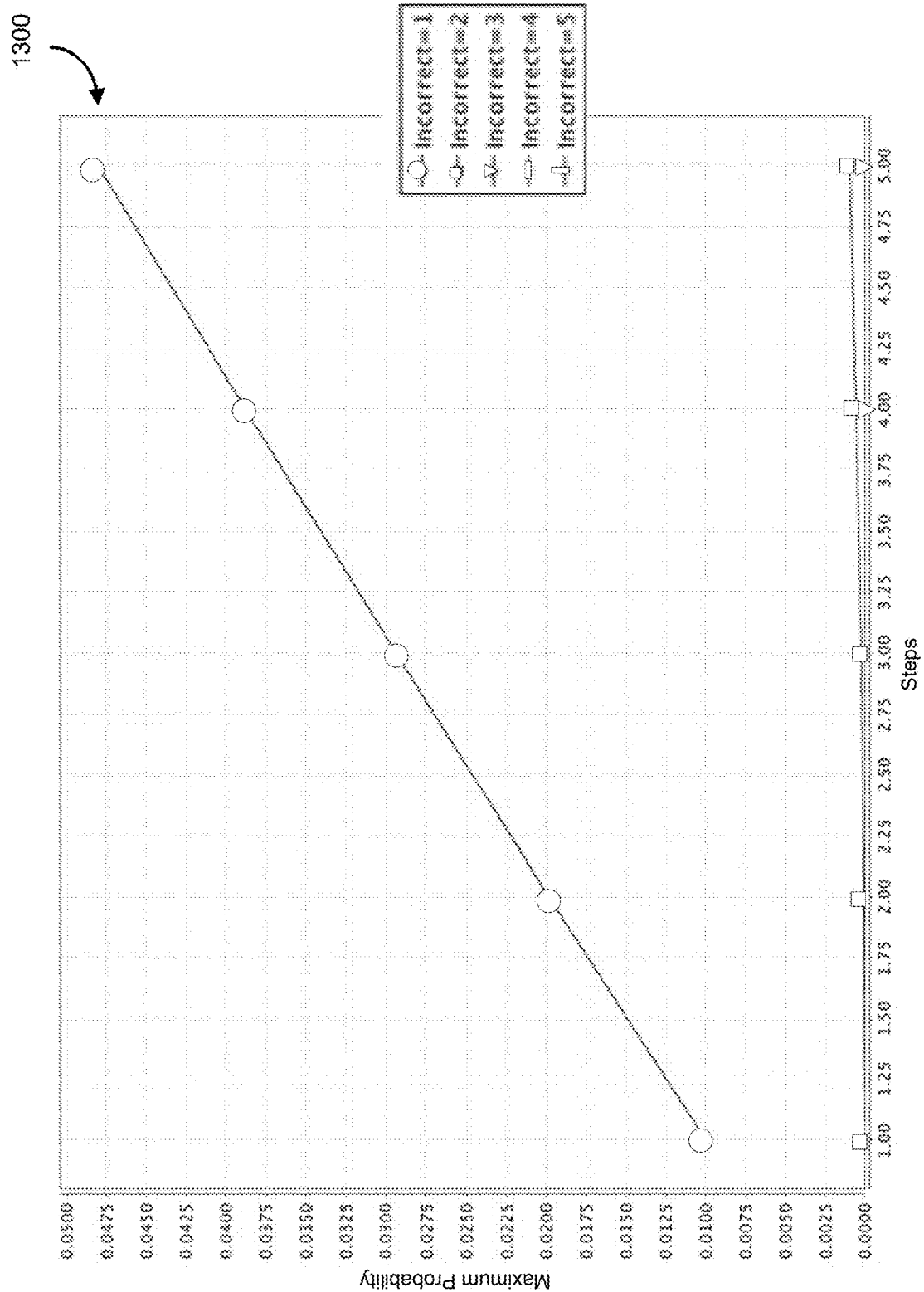
FIG. 13 is a chart showing results for more skillful σ3 customers, in relation to incorrect outcomes, according to some embodiments.

Generated graph related to $\sigma$ 2 and $\sigma$ 3 customers are shown in FIGS. 8, 9, 10 and FIGS. 11, 12, and 13. FIG. 8 is a chart 800 showing results for more skillful $\sigma$ 2 customers, in relation to expected outcomes, similar to FIG. 5. FIG. 9 is a chart 900 showing results for more skillful $\sigma$ 2 customers, in relation to correct outcomes, similar to FIG. 6. FIG. 10 is a chart 1000 showing results for more skillful $\sigma$ 2 customers, in relation to incorrect outcomes, similar to FIG. 7. FIG. 11 is a chart 1000 showing results for more skillful $\sigma$ 3 customers, in relation to expected outcomes, similar to FIG. 5 and FIG. 8. FIG. 12 is a chart 1100 showing results for more skillful $\sigma$ 3 customers, in relation to correct outcomes, similar to FIGS. 6 and 9. FIG. 13 is a chart 1200 showing results for more skillful $\sigma$ 3 customers, similar to FIGS. 7 and 10.

In some embodiments, the ability to distinguishing between bot and human is not fixed, and with increased interaction with bots through incremental visual story challenges, the probability of bot detection increases. While in short period of time the bot may learn how to behave like human, as time progress, it becomes more and more difficult for the bot to hide from the system 101.

This probability can be modelled based on an exponential distribution $1-e^{-steps}$ which increases the detection likelihood with increased visual story challenge interactions. Table 5 below shows the bot detection probability based on the exponential distribution as a function of number of visual story challenges navigated by the bot:

| Step | 1 | 2 | 3 |
|---|---|---|---|
| Probability ($p_{o2}$) | 0.63 | 0.86 | 0.95 |

Increasing bot detection in the model of subject human, will not have an effect on the number of visited Correct and Incorrect states shown in FIGS. 6, 9, 12, 7, 10, 13 but will have an impact on the FIGS. 5, 8, 11.

Figure 14:
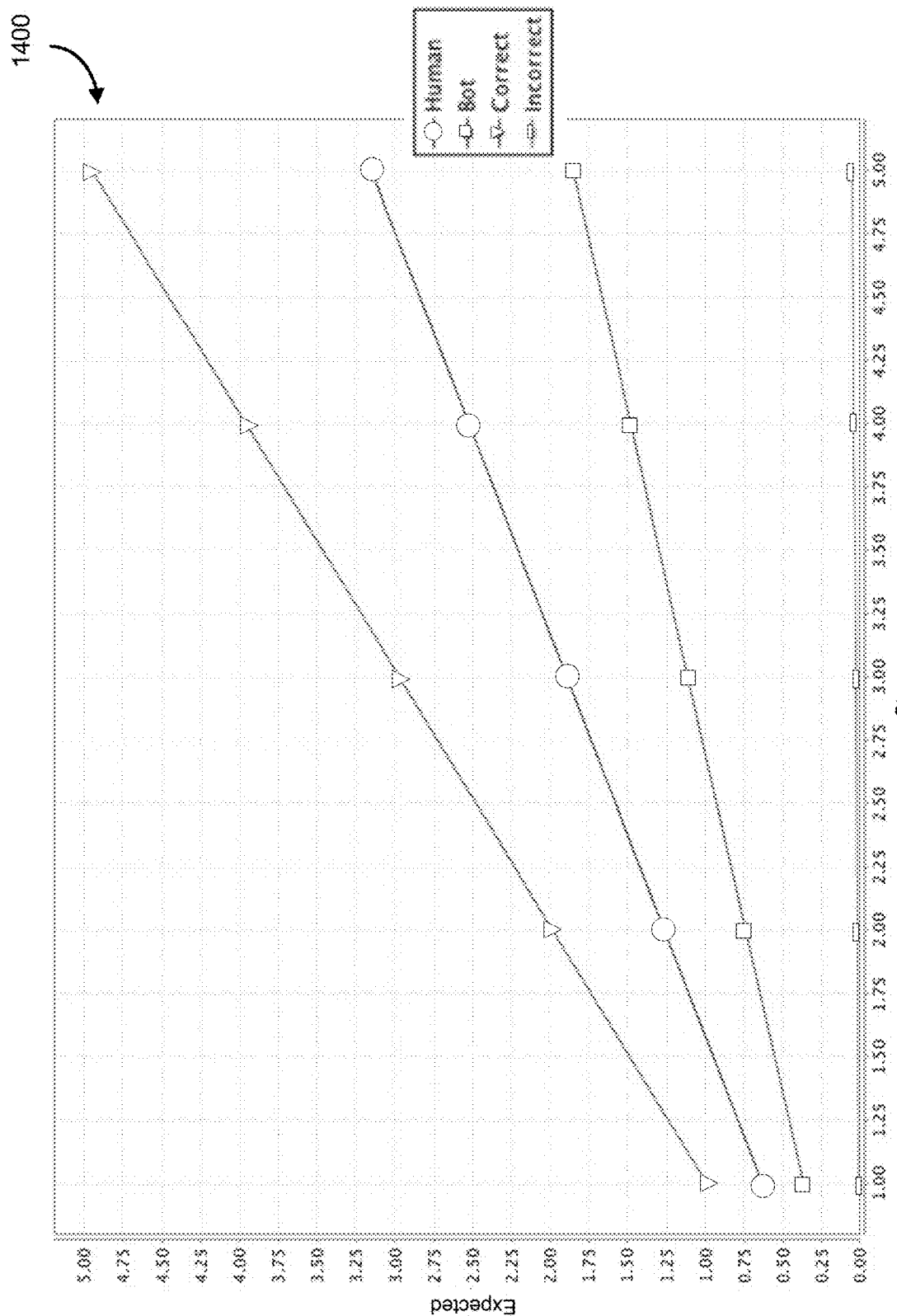
FIG. 14 is a chart showing expected outcomes for a σ1 skilled user based on the number of steps, according to some embodiments.
Figure 15:
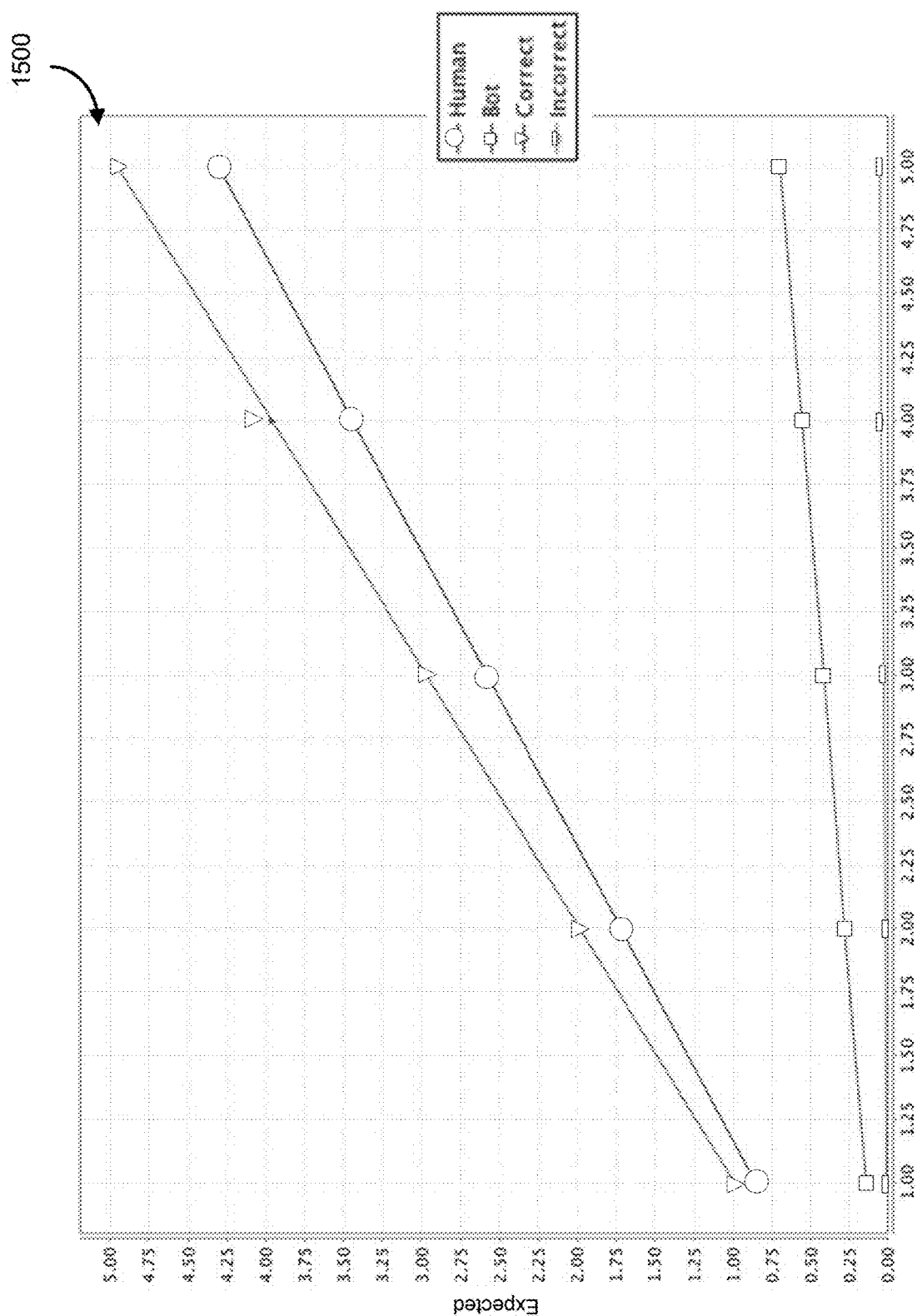
FIG. 15 is a chart showing expected outcomes for a σ2 skilled user based on the number of steps, according to some embodiments.
Figure 16:
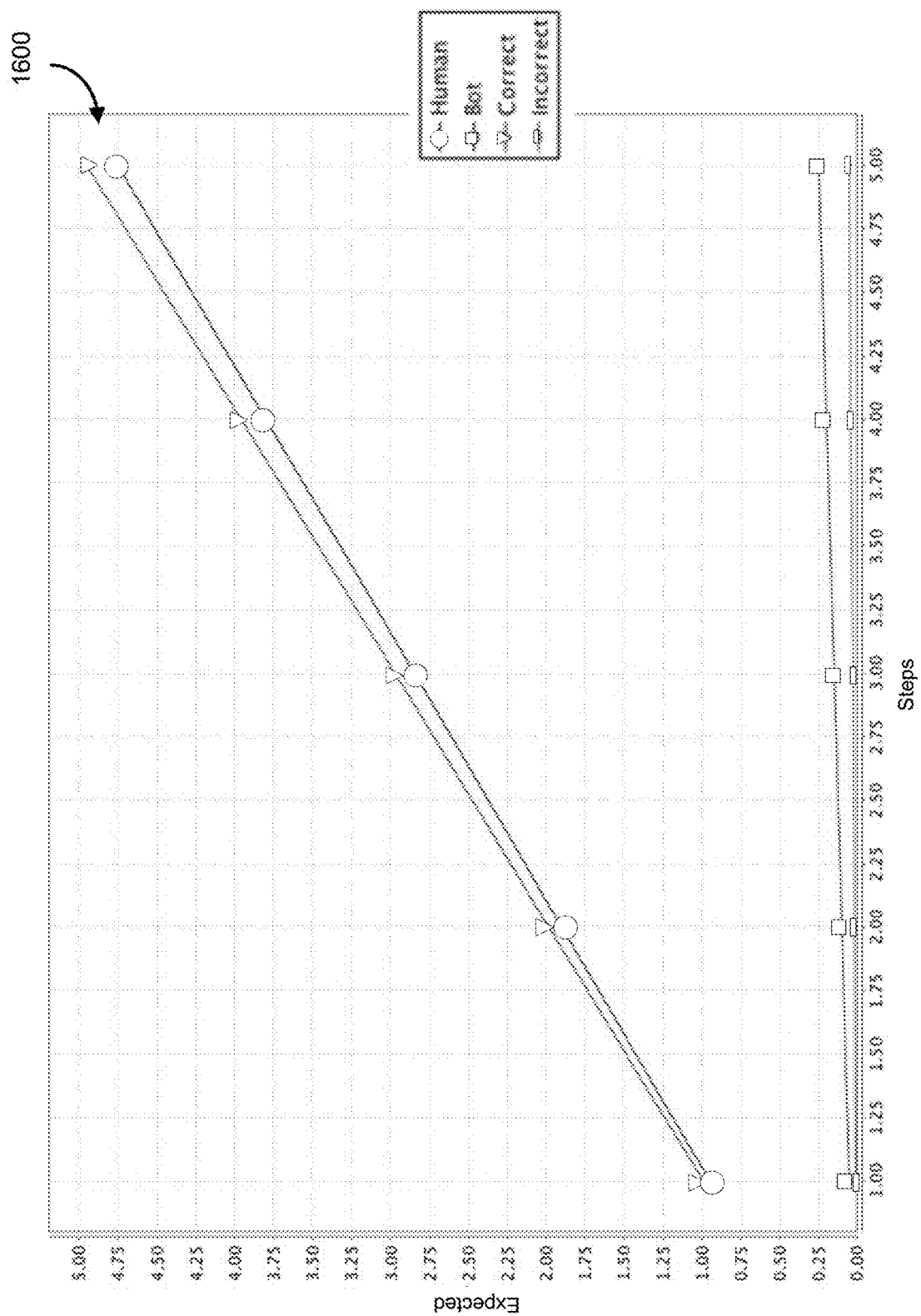
FIG. 16 is a chart showing expected outcomes for a σ3 skilled user based on the number of steps, according to some embodiments.

FIGS. 14, 15, and 16, show respectively, charts 1400, 1500 and 1600 showing the expected outcomes (the states, namely correct, incorrect, human and bot) mapped against steps (i.e., the number of visual story challenges that were presented to the agent) for a $\sigma$ 1 user with one visual story challenge iteration, a $\sigma$ 2 user with two visual story challenge iterations, a $\sigma$ 3 user with three visual story challenge iterations. As shown across FIGS. 14, 15, and 16, with each iteration, the probability of true positive identification increases.

To summarize, the threshold number of visual story challenges to be rendered may be determined based on expected detection by system 101 of the Correct, Incorrect, Human, Bot states as described in FIGS. 4 to 16.

Another two possibilities include a bot being detected where the operator of target device 110 is not a bot, which the Applicant shall refer to as false positives. This is a so called false alarm. It may create some inconvenience for a human user, but not serious consequences (e.g., fraud, etc.). Last possibility is true negative when the Applicant did not detect a bot and it was not a bot. That is a normal situation. Following the example from (2) Applicant define false negative rate as:

$$\frac{\text{Miss}}{\text{Hit} + \text{Miss}} \quad (5)$$

and false positive rate as:

$$\frac{\text{False Alarm}}{\text{False Alarm} + \text{Normal}} \quad (6)$$

Using the data for the worst case scenario, an approach can establish that the false negative rate with maximum number of retries equal to five is 0.032%. However, the expected false negative rate is much smaller at $3.125*10^{-5}\%$ and in the best case is $2.43\%*10^{-11}$.

Figure 17:
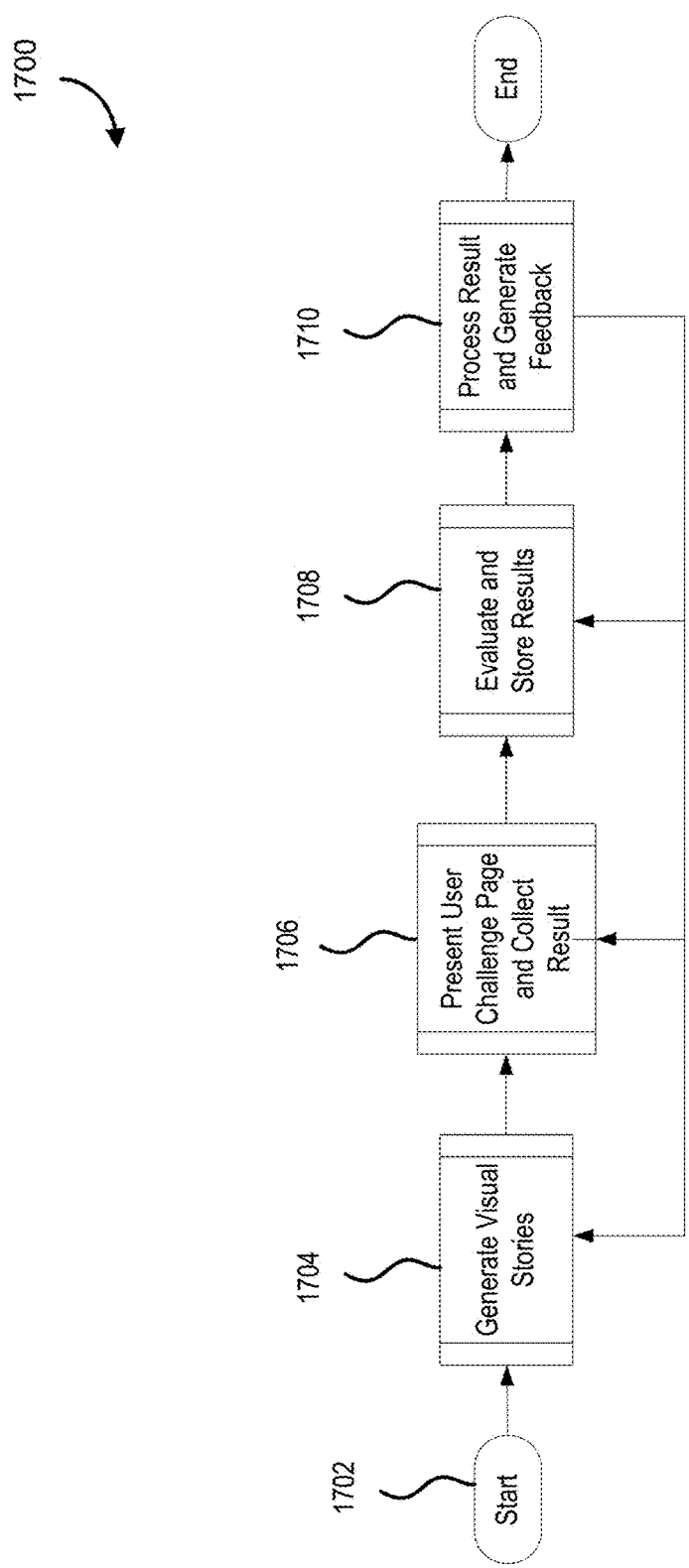
FIG. 17 is a method diagram illustrating an example visual story challenge backend processing, according to some embodiments.

Referring now to FIG. 17, method 1700 illustrating example visual story challenge backend processing of system 101 is shown.

At step 1702, the system 101 is initialized.

At step 1704, the media relation generator 102 may generate media objects for the visual story challenge which satisfy the required difficulty criteria. The media relation generator 102 may for example perform method 1800, described herein.

At step 1706, the target device 110 is provided with the visual story challenge by system 101 for display on, for example, a screen of the target device 110, and the input from the target device 110, for example from a keyboard is received by the system 101. The target device may be required to further send data regarding the operation of the target device, such as browser information. The target device 110 may be provided with the visual story challenge by system 101 in accordance with method 1900, for example.

At step 1708, the evaluator 106 determines whether the operator of the target device 110 should be provided with access to the electronic resources 112. In example embodiments, the evaluator utilizes a MLA trained on past interactions with other devices, which may include previous interactions with the target device 110, and the further data sent by the target device 110, to determine whether the operator of the target device 110 is a bot. The evaluator 106 may determines whether the operator of the target device 110 should be provided with access to the electronic resources 112 in accordance with method 2000, for example.

At step 1710, the feedback engine 108 receives information relation to step 1708, and generates updates constituent elements of the system 110. For example, the feedback engine may perform method 2100.

In example embodiments, the feedback engine 108 independently reviews whether, based on the information provided in step 1706, whether the evaluator 106 should have provided access and generates feedback which reflects the assessment. In the event of disagreement between the evaluator 106 and the feedback engine 108, the system 110 may flag the request, or generate an alert indicting the disagreement.

Figure 18:
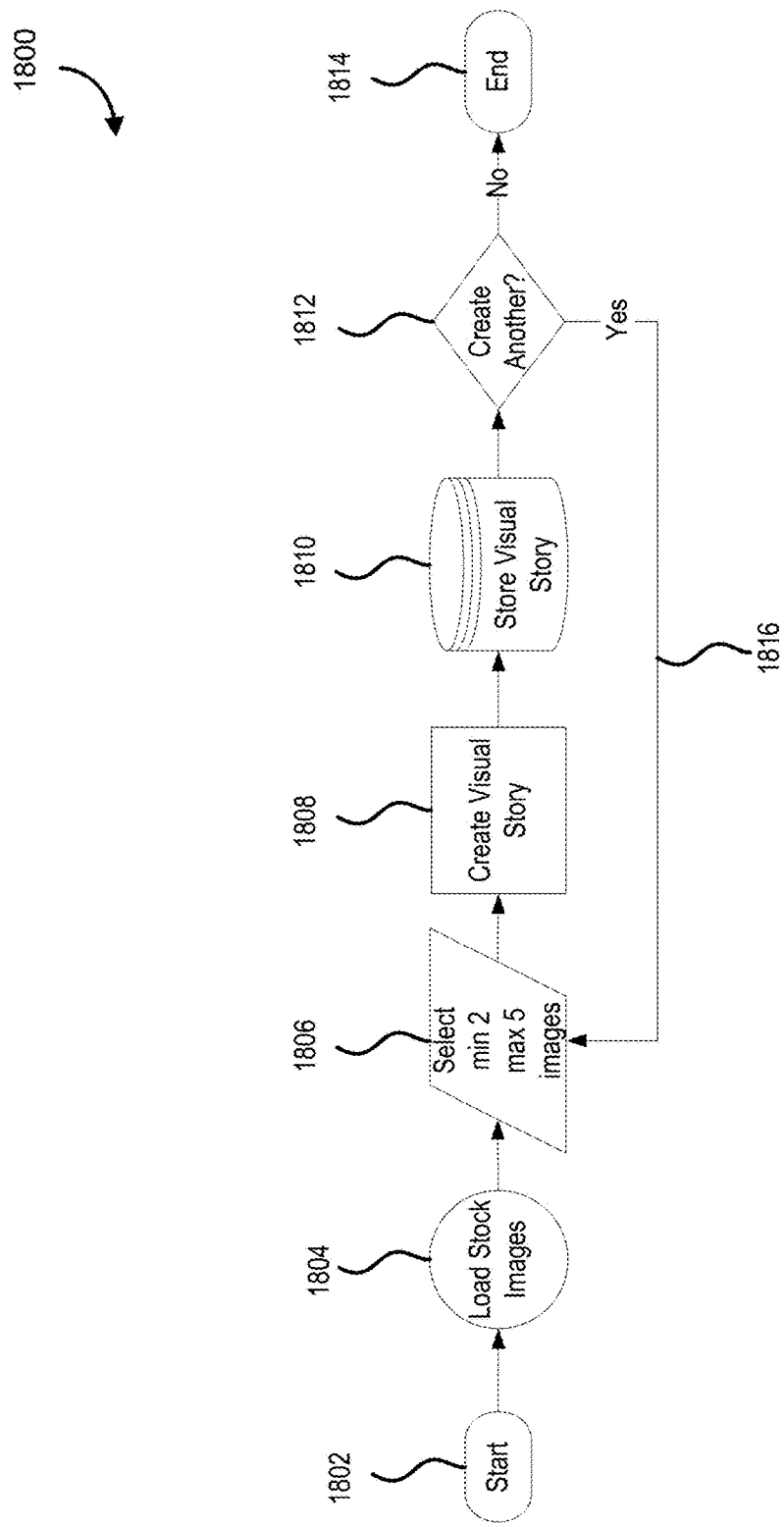
FIG. 18 is a method diagram illustrating an example visual story challenge backend generation, according to some embodiments.

Referring now to FIG. 18, a method 1800 of generating visual story challenges is shown.

At step 1802, the media relation generator 102 may receive a request to generate a visual story challenge. In some embodiments, step 1802 indicates a system 101 booting for the first time. The request may be in response to existing visual story challenges in, for example, the image repositories being removed from use.

At step 1804, the media relation generator 102 may load media objects. For example, the media objects may be retrieved from the web (e.g., a copyright free stock image data set available online).

At step 1806, the media relation generator 102 may determine or receive information as to the amount of media objects each visual story challenge should include.

At step 1808, the media relation generator 102 determines the one or more inter-image visually ascertainable relationships and the one or more intra-image visually ascertainable relationships of the loaded media objects and assembles visual story challenge based on overlapping visually ascertainable relationships.

At step 1810, the media relation generator 102 stores the assembled visual story challenge.

At step 1812, the media relation generator 102 determines whether to create a further visual story challenge. In an example embodiment, the media relation generator 102 continues to assemble visual story challenges while there are media objects retrieved at step 1802 which satisfy the necessary more inter-image visually ascertainable relationships and the one or more intra-image visually ascertainable relationships criteria.

The media relation generator 102 may operate create a further visual story challenges based whether the available media objects fulfill a criteria. For example, media relation generator 102 may continue to generate visual story challenges if media objects retrieved at step 1802 are able to satisfy a difficulty criteria.

Figure 19:
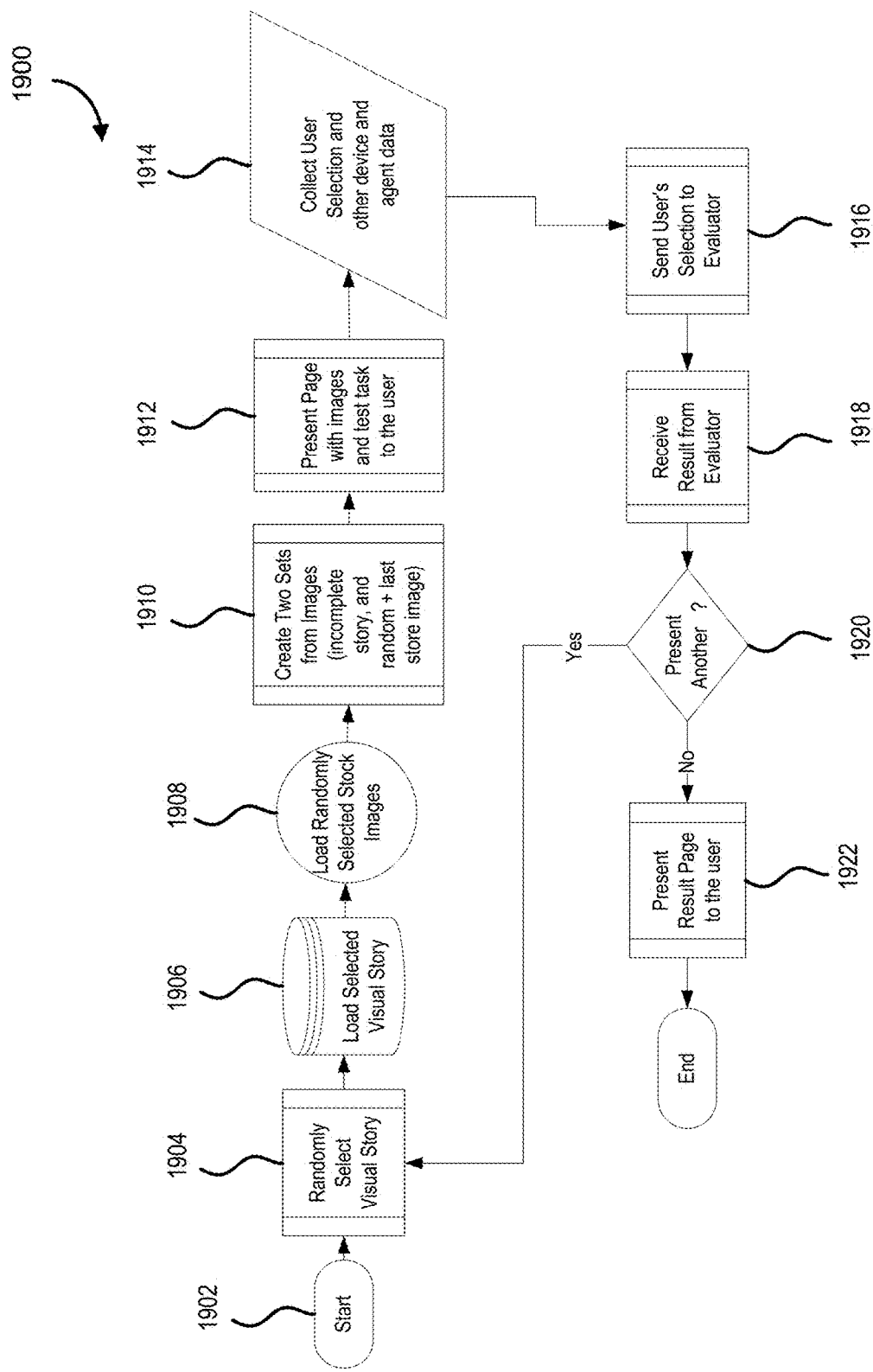
FIG. 19 is a method diagram illustrating an example variant of a process for visual story challenge backend generation, according to some embodiments.

Referring now to FIG. 19, a method 1900 illustrating an example variant of a process for visual story challenge backend generation is shown. For example, the system 101 may receive a request from a financial institution to authenticate an agent attempting to access sensitive information through an online banking platform.

At step 1902, the system 101 receives a request to authenticate an operator of the target device 110.

At step 1904, the selector 104 randomly selects the visual story challenge (denoted as a visual story in FIG. 19). In some embodiments, as described herein, the selector 104 selects the visual story challenge based on a desired difficulty, or determined location of the target device 110, and so forth.

At step 1906, the renderer 116 retrieves the selected visual story challenge from storage, for example from database 114.

At step 1908, the selector 104 may load or retrieve stock images from a separate database which are intended to be used for noise in the set of candidate answer questions. For example, the selector 104 may retrieve random noise media objects from a noise image repository within system 101. The selector 104 may retrieve random noise media objects upon demand from a database maintained by a third party. In example embodiments, the selector 104 retrieves candidate noise media objects and determines whether they share the overlapping visually ascertainable relationship prior to selecting the noise media objects.

According to some embodiments, for example, the step 1908 is optional, and the stored visual story challenges include the noise media objects.

At step 1910, the media relation generator 102 may create or delineate the set of question media objects and the set of candidate answer media objects based on the media objects retrieved in steps 1906 and 1908.

At step 1912, the renderer 116 renders the media objects and presents them to the target device 110.

At step 1914, the evaluator 106 receives the authentication input from the target device 110 and other data that may be collected from the target device 110.

At step 1916, the evaluator 106 determines whether to grant access to the electronic resources 112 based on at least the authentication input. The evaluator may perform method 2000.

At step 1918, the evaluator 106 may be configured to provide the party requesting authentication of the result of step 1916. For example, where the operator of the target device 110 is attempting to access an online banking platform, and failed the visual story challenge, the evaluator 106 may report this failure to the financial institution which requested the authentication.

At step 1920, the evaluator 106 determines whether to present a subsequent visual story challenge, as described herein. In response to the evaluator 106 determining that a subsequent visual story challenge is appropriate, the evaluator may transfer the target device 110 back to step 1904.

At step 1922, where the evaluator 106 determines that further visual story challenges are not required (e.g., the evaluator 106 has determined above a confidence threshold that the agent is either operated by a bot or human), the results of the determination are presented to the target device 110.

Figure 20:
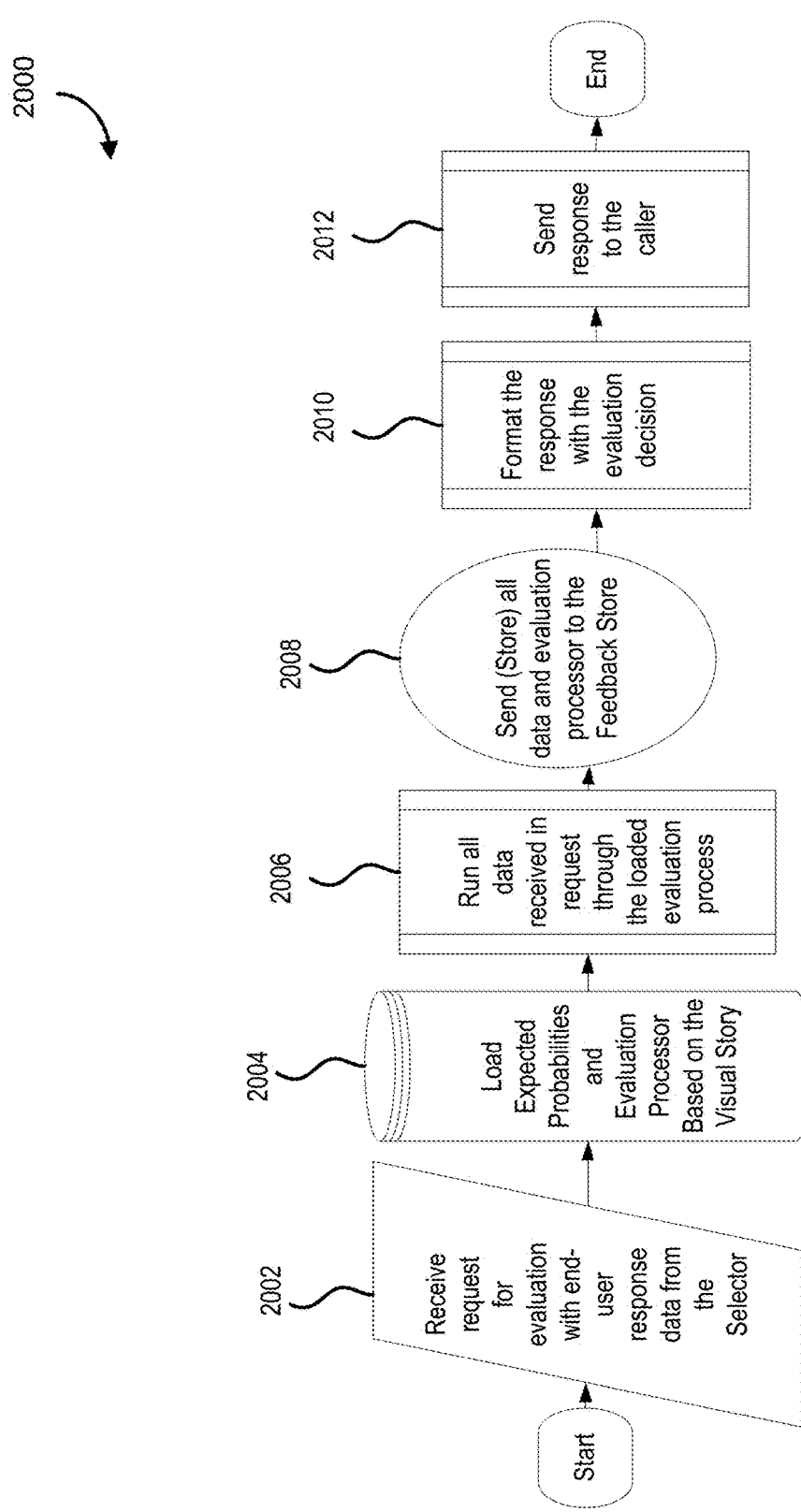
FIG. 20 is a method diagram illustrating an example process for determining a human user, according to some embodiments.

Referring now to FIG. 20, a method 2000 illustrating an example process for determining whether an agent is operated by a human user is shown.

At step 2002, the evaluator 106 receives a request to evaluate the agent from the selector 104. In example embodiments, the selector 104 sends the request and retrieved visual story challenge input. In some embodiments the selector 104 sends the request and the evaluator 106 retrieves the visual story challenge input from the target device 110.

At step 2004, the evaluator 106 may load expected probabilities of bot and human detection, for example as described in respect of FIGS. 5, 8 and 11, based on the predicted likelihood of the human/bot correctly determining the correct media object and based on the predicted difficulty of the selected visual story challenged.

At step 2006, the evaluator 106 processes the received response. For example, the evaluator 106 may determine the probability of false and true positive, and false and true negatives. Upon determining the said probabilities, the evaluator 106 may determine whether the response provides a great enough probability level of a true positive or a low enough probability of a false positive (referred to alternatively as a confidence threshold).

Step 2006 may also include the evaluator 106 evaluating the user tendency information stored and the information received from the target device 110. For example, the probability of a true positive may be determined in part by determining that the agent location is suspicious.

At step 2008, the evaluator 106 sends the user tendency information, the information received from the target device 110, the visual story challenge input, evaluator 106 parameters, and intermediate determination calculations to the feedback engine 108.

At step 2010, the evaluator 106 may format the determination of whether the agent is a operated by a bot for providing to the requester of the authentication. For example, a requestor may require certain information to interact with the requestor API. For example, a financial institution requestor (i.e., caller) may require that the evaluator 106 determination is stripped of identifying information.

At step 2012, the evaluator 106 decision is provided to the caller. For example, the evaluator 106 sends the financial institution caller a response that the agent has not been authenticated.

Figure 21:
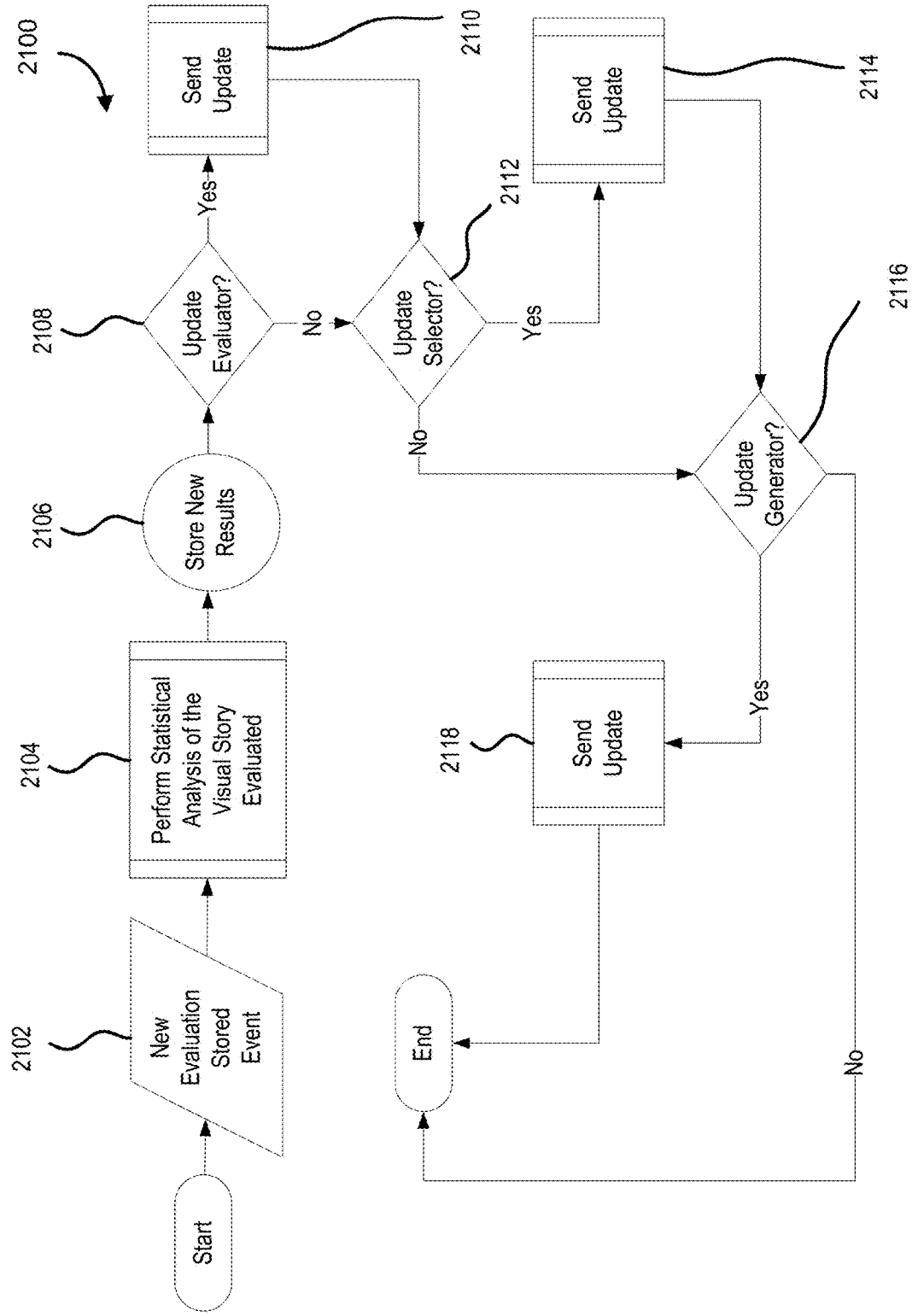
FIG. 21 is a method diagram illustrating an example process for visual story evaluator feedback incorporation, according to some embodiments.

Referring now to FIG. 21, a method 2100 illustrating an example process for visual story evaluator feedback incorporation is shown.

At step 2102, the feedback engine 108 receives new data from the evaluator 106.

At step 2104, the feedback engine 108 performs a statistical analysis of the visual story evaluated. For example, the feedback engine 108 may review the history of all visual story challenge inputs for the particular visual challenge story, and determine how likely or unlikely the outcome was. Moreover, the feedback engine 108 may review the amount of visual story challenges required to determine whether the agent was operated by a bot or a human, and how non-visual challenge story inputs were evaluated.

At step 2106, the feedback engine 108 stores the new statistical analysis. For example, where this was the second time that a particular visual story challenge was shown, and the outcome is a determination that the bot operated agent was successfully rejected, that statistic can be added to the first instance.

At step 2108, based on the stored results, the feedback engine 108 may determine whether to update the evaluator 106. For example, the feedback engine 108 may determine that the particular visual story challenge is difficult to bots but easy for humans to navigate, and that the evaluator 106 can have greater certainty that the agent is operated by a bot when that particular visual story challenge is failed. Alternatively, the feedback engine 108 may determine that the particular visual story challenge occurred as expected, and that no update to the evaluator 106 is required.

At step 2110, in response to determining the evaluator 106 needs to be updated, the feedback engine 108 may send instructions or updated parameters for the evaluator 106.

At step 2112, the feedback engine 108 determines whether to update the selector 104. For example, where the feedback engine 108 determined that the visual story challenge information received from step 2102 confirmed existing statistical information about the particular visual challenge story as being too difficult for a human user to navigate, the feedback engine 108 may instruct the selector 104 to avoid selecting that particular visual challenge story.

At step 2114, in response to the feedback engine 108 determining that the selector 104 should be updated in step 2112, the feedback engine 108 may send instructions or updated parameters for the selector 104 to the selector 104.

At step 2116, the feedback engine 108 determines whether the media relation generator 102 needs to be updated. The feedback engine 108 may determine the update the media relation generator 102 in a manner similar to the feedback engine 108 updating the selector 104.

Step 2118, in response to the feedback engine 108 determining to update media relation generator 102, the feedback engine 108 may send instructions to update the media relation generator 102 or may send updated parameters for the media relation generator 102.

Alternatively the feedback engine 108 may determine at step 2116 that the media relation generator 102 does not need to be updated, and ends the method 2100.

Figure 22:
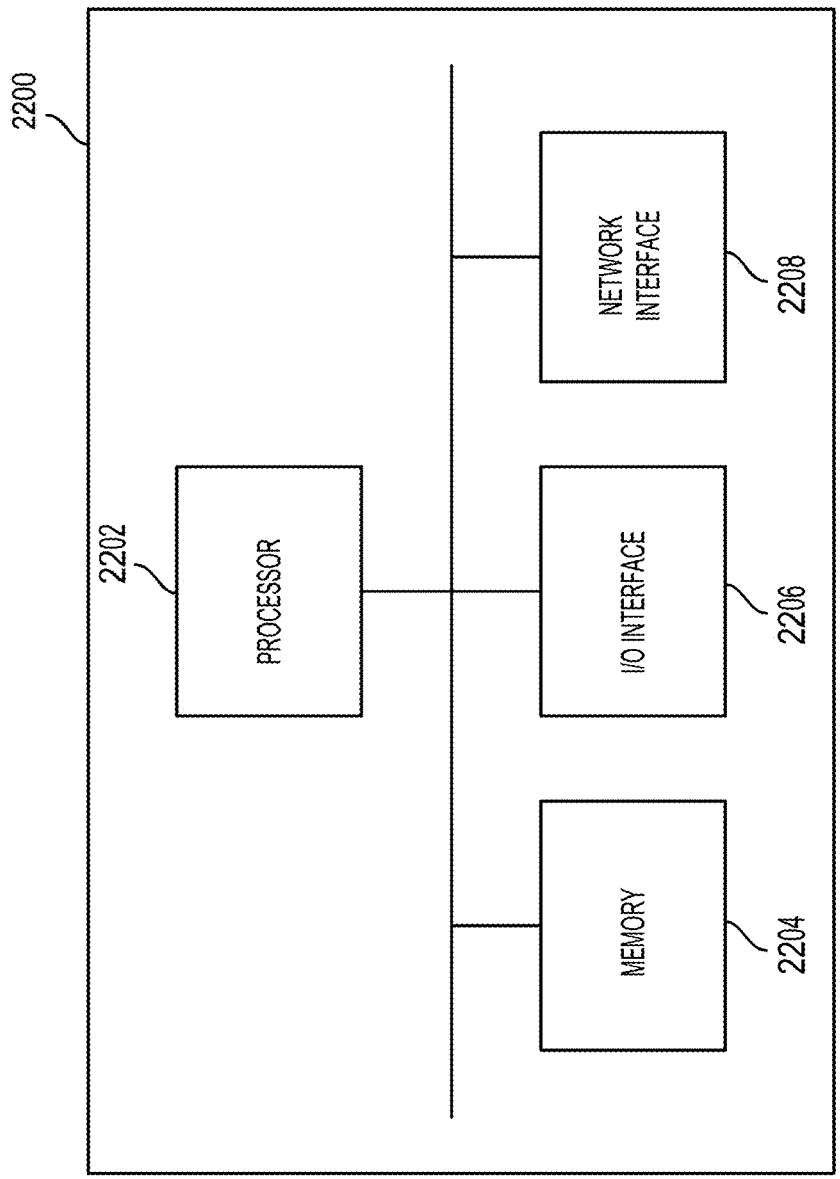
FIG. 22 is an example computing system, according to some embodiments.

FIG. 22 is a schematic diagram of computing device 2200 which may be used to implement system 101, in accordance with an embodiment.

As depicted, computing device 2200 includes at least one processor 2202, memory 2204, at least one I/O interface 2206, and at least one network interface 2208.

Each processor 2202 may be, for example, a microprocessor or microcontroller (e.g., a special-purpose microprocessor or microcontroller), a digital signal processing (DSP) processor, an integrated circuit, a field programmable gate array (FPGA), a reconfigurable processor, a programmable read-only memory (PROM), or combinations thereof.

Memory 2204 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 2206 enables computing device 2200 to interconnect with one or more input devices, such as a keyboard, mouse, camera, touch display and a microphone, or with one or more output devices such as a display and a speaker.

Each network interface 2208 enables computing device 2200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WMAX), SS7 signaling network, fixed line, local area network, wide area network, and others, or a combination of these.

For simplicity only, one computing device 2200 is shown but system 101 or target device 110 may include multiple computing devices 2200. The computing devices 2200 may be the same or different types of devices. The computing devices 2200 may be connected in various ways including directly coupled, indirectly coupled via a network, and distributed over a wide geographic area and connected via a network (which may be referred to as "cloud computing").

For example, and without limitation, a computing device 2200 may be a server, network appliance, embedded device, computer expansion module, personal computer, laptop, personal data assistant, cellular telephone, smartphone device, UMPC tablets, video display terminal, gaming console, or other computing devices capable of being configured to carry out the methods described herein.

In some embodiments, each of the media relation generator 102, the selector 104, the response evaluator 106, the renderer 116, and the feedback engine 108 are a separate computing device 2200. In some embodiments, the media relation generator 102, the selector 104, the response evaluator 106, the renderer 116, and the feedback engine 108 are operated by a single computing device 2200 having a separate integrated circuit for each of the said components. A combination of software and hardware implementation of the media relation generator 102, the selector 104, the response evaluator 106, the renderer 116, and the feedback engine 108 is contemplated. In some embodiments, all or parts of media relation generator 102, the selector 104, the response evaluator engine 106, the renderer 116, and the feedback engine 108 may be implemented using programming languages. In some embodiments, these components of system 101 may be in the form of one or more executable programs, scripts, routines, statically/dynamically linkable libraries.

Figure 23:
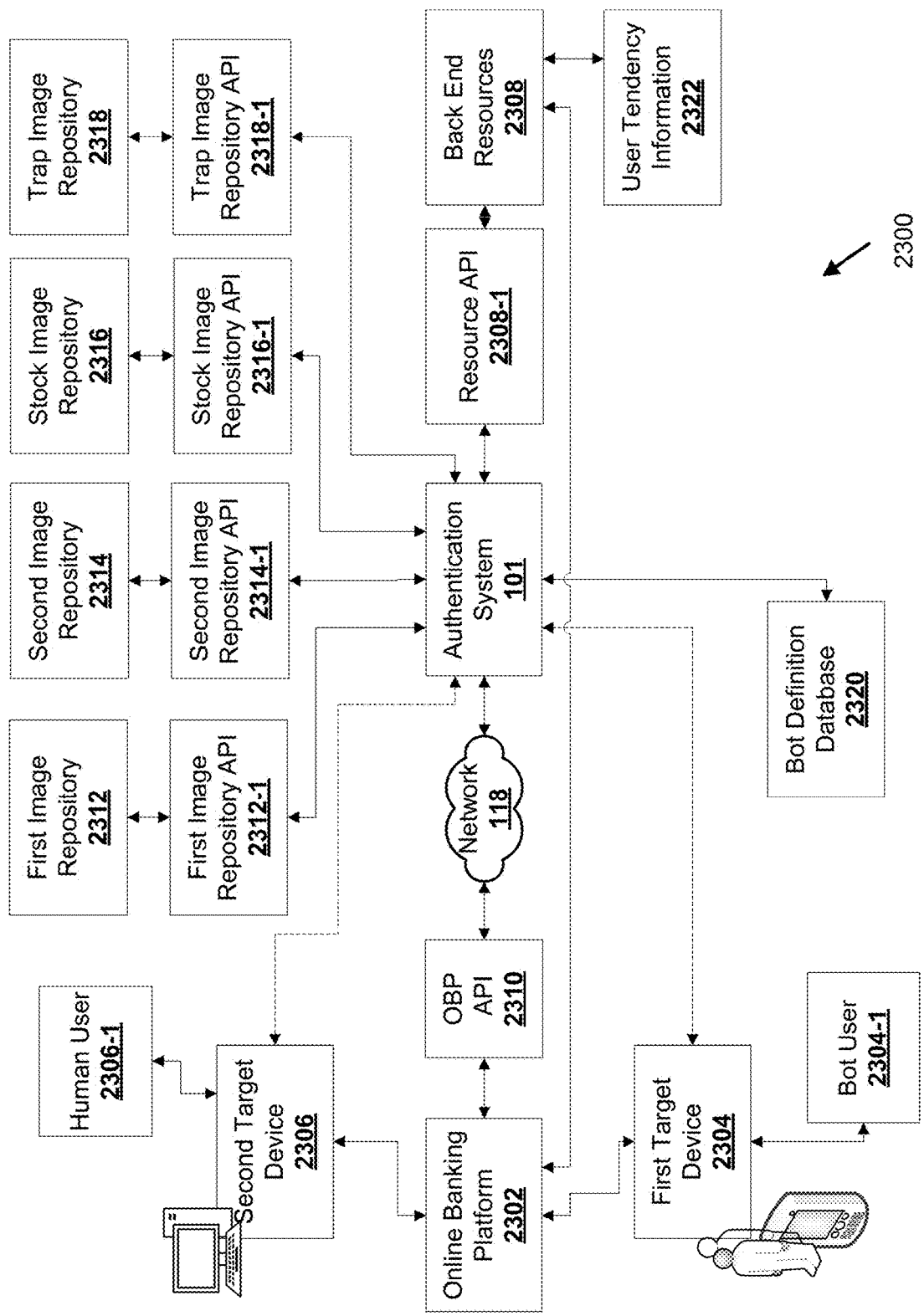
FIG. 23 is an example online banking system including an authentication system, according to some embodiments.

FIG. 23 shows an example online banking system 2300 for authenticating an agent for online banking. In system 2300, a plurality of users, including human user 2306-1, and bot user 2304-1, request to access back end resources 2308 via an online banking platform 2302, with the human user 2306-1, and bot user 2304-1 using the first target device 2304 and the second target device 2306 to generate the request, respectively.

The human user 2306-1 may be attempting to use the online banking platform 2302 for a variety of reasons including, but not limited to, checking personal banking information such as investment portfolio performance, completing banking transactions, such as transferring money to an intended recipient, or retrieving personal information for storage in a separate system, such as retrieving tax information for filing with appropriate authorities.

In example embodiments, the bot user 2304-1 may be attempting to authenticate fraudulent transactions, compromise personal information stored on the back end system 2308, or intercept traffic to back end resources 2308 and impersonate the back end resources 2308.

In system 2300, the online banking platform 2302 is configured to authenticate agents attempting to access the back end resources 2308 with the authentication system 101. In example embodiments, the online banking platform 2302 requires agents to complete authentication with the authentication system 101 directly, as shown in the dotted connection between the target devices and the authentication system 101, after which the target devices are required to provide the online banking platform 2302 with proof of authentication.

Alternatively, in example embodiments, the online banking platform 2302 requests a challenge story from the authentication system 101. The authentication system 101 may provide, via renderer 116, the challenge story to the online banking platform 2302. The authentication system 101 may connect to an online banking platform (OBP) application programming interface (API) 2310, and directly provide the challenge story to the target agent through the online banking platform 2302, and notify the online banking platform 2302 of successful authentication.

The OBP API, or an API, may specify the syntax and requirements for interacting with the computing resource associated with the API. For example, the OBP API may specify that a first requirement of interacting with the online banking platform is that communications are encrypted at least according to a certain standard.

As described herein, the online banking platform 2302 may provide the authentication system 101 with user tendency information, an indication of whether suspicious activity has been detected, and so forth.

The online banking platform 2302 may request authentication before the agent logs into an online banking platform, or after the agent has provided acceptable credentials (e.g., a username and password) to access the back end resources 2308.

In order to authenticate the agent, the authentication system 101 may retrieve from the first image repository 2312, via the first image repository API 2312-1, at least two images which share one or more inter-image visually ascertainable relationships. The first image repository 2312 may be co-located in the same system as authentication system 101, located on server or computer system remote to authentication system 101, or otherwise. The first image repository 2312 may be a digital repository of media objects stored on a cloud computing system (not shown).

Similarly the authentication system 101 may retrieve from the second image repository 2314, via the second image repository API 2314-1, at least one image having intra-image visually ascertainable relationships. As with the first image repository 2312, the second image repository 2314 may be a separate digital or physical database, located within a system local to the authentication system 101, or remote to the system 101, such as on a cloud storage system, or otherwise.

In example embodiments, the authentication system 101 may retrieve from the stock image repository 2316, via the stock image repository API 2316-1, one or more noise images to be used in the challenge story as candidate answer images. Similar to the second image repository 2314, the stock image repository 2316 may be a separate digital or physical database, located within a system local to the authentication system 101, or remote to the system 101, such as on a cloud storage system.

In example embodiments, the authentication system 101 may retrieve from the trap image repository 2318, via the trap image repository API 2318-1, one or more trap images to be used in the challenge story as candidate answer images. Similar to the second image repository 2314, the stock image repository 2316 may be a separate digital or physical database, located within a system local to the authentication system 101, or remote to the system 101, such as on a cloud storage system.

After the authentication system 101 has retrieved the necessary images (for example via the selector 104), the authentication system 101 renders the challenge story to the target devices 2304 and 2306, via the banking platform 2302, or otherwise. Rendering the challenge story to the target devices 2304 and 2306 may include rendering the challenge story on the entire screen of the target user device. In some embodiments, the challenge story is rendered in a portion of the screen concurrent with the online banking platform 2302 images. For example, the challenge story may be rendered similar to a Captcha™ within an online banking platform 2302.

The online banking platform 2302 may receive the authentication input (e.g., input received in response to the challenge story) from the target devices 2304 and 2306 and provide it to the authentication system 101. Alternatively, the authentication system 101 is configured to receive the authentication input directly and determine the likelihood that the agent is either a human user or a bot user, as described herein.

The authentication system 101 may retrieve bot definitions or other bot related data which aids in identifying bots from a bot definition database 2320. The bot definition database 2320 may be run by third-party, such as a security company, or an open source repository of available information on bot tendencies.

In some embodiments, the authentication system 101 receives from the back end resources 2308 information associated with the type of computer resources 2308 which are being accessed, shown as user tendency information database 2322. For example, the user tendency information database 2322 may include a profile for each user associated with the back end resources 2308 (e.g., bank account) which includes a likely user typing speed associated with the human user who typically accesses the bank account to which requests are accessed. In some embodiments the user tendency information includes information about an employee seeking who is known to be making the request to inter-office back end resources 2308.

Once the authentication system 101 determines that the agent is operated by a human, the authentication system 101 may provide the result to the online banking platform 2302 which may directly connect the agent to the back end resources 2308 (once the user proves their entitlement to access to the particular back end resources (e.g., provides the correct banking login information). In some embodiments, the authentication system acts as a gatekeeper through which all information passes, and the authentication system 101 directly provides access to the user to the back end resources 2308, while maintaining track of or logging the user interaction with the back end resources 2308.

Referring now to FIG. 24, an example code representation 2400 of a media data object having inner and outer relationship metadata is shown.

In example embodiments, the example code representation 2400 is prepared before initializing the system. In some embodiments, example code representations for each media object are prepared before the system is initialized.

In the embodiment shown, the code representation 2400 includes a first image representation 2402 (for example, code or metadata associated with first image 206), a second image representation 2404 (for example, code or metadata associated with the second image 208), and the third image representation 2406 (for example, code or metadata associated with the third image 212).

Each image representation may have a unique identifier associated with the image representation. In the shown embodiment, each image representation is denoted by a descriptive object name, such Cat1, Mouse1, and Cat and Kitten. In some variants, the unique identifier is a feature of the image object, stored separately from the object name.

The first image representation 2402, shown as an XML object, includes the inter-image relationship attributes 2408 and 2410. In the example embodiment shown, the inter-image relationship attribute 2408 is specifically linked to a second image object, Mouse1 and Lion1 based on the feature name. In some embodiments, for example, the inter-image relationship attribute 2408 lists potential attributes that may be associated with various images, and not specific images.

The first image representation 2402 may include a difficulty feature associated with each image specific inter-image relationship attribute (e.g., 2408 and 2410). For example, in the shown embodiment, the difficulty feature 2412 associated with the inter-image relationship feature 2408 has a greater difficulty compared to the difficulty feature associated with the inter-image relationship attribute 2410.

Each image representation can include an intended region feature to identify where the image should be used. The intended region feature (e.g., shown as intended region feature 2414) may specify the intended region with differing degrees of granularity. For example, the intended feature may be specified based on regions defined by states, counties, countries, continents, and so forth.

The third image representation 2406, includes an intra-image relationship feature 2416. The intra-image relationship feature 2416 may be provided independent of intended inter-image relationship features, as shown, or associated with a specific inter-image relationship features.

The third image representation 2406 includes a difficulty feature 2418 that is specifically linked to the Cat1 and Mouse1 image representations, 2402 and 2404, respectively. In example embodiments, the difficulty feature 2418 for an image having intra-image relationships can be stored independent of other image representations. For example, the difficulty feature 20 418 may be based on a determination of the cognitive distance between the objects in the third image 212.

Where inter-image relationship features are not associated with another image, or where intra-image relationship features are not associated with other images, the media relations generator 102 may be able to create or select new challenge stories by associating or finding image representations by finding images having overlapping relations between inter-image relationship features and intra-image relationship features.

In example embodiments, the set of question images and the set of candidate answer images are stored in a relationship object (not shown). For example, the relationship object may store the set of question images which includes at least two objects having one or more inter-image visually ascertainable relationships and at least one image having one or more intra-image visually ascertainable relationship, and the set of candidate answer images including a trap image, a correct image, one or more syntax noise images, one or more semantic noise images, and so forth.

The relationship object can include a plurality of noise images, such that every time the relationship object is used in an authentication challenge story, the relationship object may populate unique sets of candidate answer images. For example, the relationship object may include ten noise images in the set of candidate answer images and only 3 images in the set of question images, allowing for many unique combinations of candidate answer images in combination with the set of question images.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As will be appreciated from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

The foregoing discussion provides many example embodiments of the example subject matter. Although each embodiment represents a single combination of elements, the subject matter is considered to include all possible combinations of the disclosed elements. Thus if one embodiment comprises elements A, B, and C, and a second embodiment comprises elements B and D, then the subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A system for computationally discriminating whether an agent is a human or an automated process, the system including one or more computer processors operating in conjunction with computer memory and data storage, the one or more computer processors configured to:
   render, on a display, a set of question images, the set of question images including at least two question images having one or more inter-image visually ascertainable relationships, and at least one question image having an intra-image visually ascertainable relationship between different objects within the at least one question image having the intra-image visually ascertainable relationship, wherein one inter-image visually ascertainable relationship from the one or more inter-image visually ascertainable relationships has one overlapping visually ascertainable relationship with the intra-image visually ascertainable relationship, wherein the different objects having the intra-image visually ascertainable relationships exclude word objects and are located within a single question image;
   select an incorrect subset of images comprising a plurality of trap images associated with one or more additional inter-image visually ascertainable relationships of the at least two question images, the additional one or more inter-image visually ascertainable relationship, the plurality of trap images selected to encourage a syntax or semantic error by an automated system based on the one or more additional inter-image visually ascertainable relationships of the at least two question images;
   render, on the display, a set of candidate answer images, the set of candidate answer images including at least the incorrect subset of images and a correct image, the correct image portraying the overlapping visually ascertainable relationship, wherein the set of candidate answer images exclude the set of question images and variants of images in the set of question images; and
   determine whether access to one or more electronic resources should be granted based upon an input data set representative of a user selection of at least one answer image from the set of candidate answer images.

2. The system of claim 1, wherein the at least two question images having the one or more inter-image visually ascertainable relationships are selected from a first image repository storing a first plurality of images and first metadata indicating inter-image visually ascertainable relationships between images of the first plurality of images; and wherein the at least one question image having the intra-image visually ascertainable relationship is selected from a second image repository storing a second plurality of images and second metadata indicating the intra-image visually ascertainable relationships relating to each image in the second plurality of images.

3. The system of claim 2, wherein the one or more computer processors are configured to:
   select a seed image from the first image repository, the seed image having a machine vision recognition characteristic below a pre-defined difficulty threshold;
   select a corresponding image from the first image repository having the one or more inter-image visually ascertainable relationships with the seed image, the seed image and the corresponding image being utilized for the set of question images.

4. The system of claim 2, wherein the one or more computer processors are configured to:
   select a seed image from the second image repository, the seed image having a machine vision recognition characteristic below a pre-defined difficulty threshold and having the intra-image visually ascertainable relationship;
   select the at least two question images having one or more inter-image visually ascertainable relationships based on the overlapping visually ascertainable relationship.

5. The system of claim 1, wherein upon a determination that a selected trap image of the plurality of trap images is the user selection, the one or more computer processors are configured to build or update a bot profile of the agent based on at least one of input characteristics of the agent, an IP addressed used, the bot profile being utilized to identify similar profiles to be marked as suspicious.

6. The system of claim 1, wherein upon a determination that a selected trap image of the plurality of trap images is the user selection, the one or more computer processors are configured to flag the agent as a potential malicious agent.

7. The system of claim 1, wherein the one or more computer processors are configured to:
   establish a positional layout for the set of question images for a graphical user interface, the positional layout establishing at least one non-adjacent position between a pair of the least two images having one or more inter-image visually ascertainable relationships.

8. The system of claim 1, wherein the one or more computer processors are configured to: select the overlapping visually ascertainable relationship based upon a geographic indication of where a user is residing.

9. The system of claim 1, wherein the at least two question images having one or more inter-image visually ascertainable relationships include respectively a first object and a second object, the inter-image visually ascertainable relationships being relationships between the first object and the second object, and wherein the at least one question image having the intra-image visually ascertainable relationship includes a third object and a fourth object, the intra-image visually ascertainable relationship being a relationship between the third object and the fourth object within the at least one question image having the intra-image visually ascertainable relationship.

10. The system of claim 1, wherein the one or more computer processors are further configured to:
grant access to the electronic resources to the agent in response to determining the user selection of images includes the correct image.

11. The system of claim 1, wherein the at least two question images having one or more inter-image visually ascertainable relationships and the at least one question image having the intra-image visually ascertainable relationship are stored within a relationship object, the relationship object further storing the set of candidate answer images.

12. A method for computationally discriminating whether an agent is a human or an automated process comprising:
rendering, on a display, a set of question images, the set of question images including at least two question images having one or more inter-image visually ascertainable relationships, and at least one question image having an intra-image visually ascertainable relationship between different objects within the at least one question image having the intra-image visually ascertainable relationship, wherein one inter-image visually ascertainable relationship from the one or more inter-image visually ascertainable relationships has one overlapping visually ascertainable relationship with the intra-image visually ascertainable relationship, wherein the different objects having the intra-image visually ascertainable relationships are located within a single question image;
selecting an incorrect subset of images comprising a plurality of trap images associated with one or more additional inter-image visually ascertainable relationships of the at least two question images, the additional one or more inter-image visually ascertainable relationships being different from the one overlapping visually ascertainable relationship, the plurality of trap images selected to encourage a syntax or a semantic error by an automated system based on the one or more additional inter-image visually ascertainable relationships of the at least two question images;
rendering, on the display, a set of candidate answer images, the set of candidate answer images including at least the incorrect subset of images and a correct image, the correct image portraying the overlapping visually ascertainable relationship, wherein the set of candidate answer images exclude the set of question images and variants of images in the set of question images; and
determining whether access to one or more electronic resources should be granted based upon an input data set representative of a user selection of at least one answer image from the set of candidate answer images.

13. The method of claim 12, further comprising:
selecting the at least two question images having one or more inter-image visually ascertainable relationships from a first image repository storing a first plurality of images and first metadata indicating inter-image visually ascertainable relationships between images of the first plurality of images; and
selecting the at least one question image having the intra-image visually ascertainable relationship from a second image repository storing a second plurality of images and second metadata indicating the intra-image visually ascertainable relationship relating to each image in the second plurality of images.

14. The method of claim 13, further comprising:
selecting a seed image from the second image repository, the seed image having a machine vision recognition characteristic below a pre-defined difficulty threshold and having intra-image visually ascertainable relationship; and
selecting the at least two question images having one or more inter-image visually ascertainable relationships based on the overlapping visually ascertainable relationship.

15. The method of claim 12, wherein upon a determination that a selected trap image of the plurality of trap images is the user selection, building or updating a bot profile of the agent based on at least one of input characteristics of the agent, an IP addressed used, the bot profile being utilized to identify similar profiles to be marked as suspicious.

16. The method of claim 12, further comprising:
in response to determining that a selected trap image of the plurality of trap images is the user selection, flagging the agent as a potential malicious user.

17. The method of claim 12, further comprising:
establishing a positional layout for the set of question images for a graphical user interface, the positional layout establishing at least one non-adjacent position between a pair of the least two images having one or more inter-image visually ascertainable relationships.

18. The method of claim 12, further comprising selecting the overlapping visually ascertainable relationship based upon a geographic indication of where the agent is residing.

19. The method of claim 12, further comprising granting access to the electronic resources to the agent in response to determining the user selection of images includes the correct image.

20. A non-transitory computer readable storage medium having stored therein computer executable program code for discriminating whether an agent is a human or an automated process, which when executed by a processor, causes the processor to:
render, on a display, a set of question images, the set of question images including at least two question images having one or more inter-image visually ascertainable relationships, and at least one question image having an intra-image visually ascertainable relationship between different objects within the at least one question image having the intra-image visually ascertainable relationship, wherein one inter-image visually ascertainable relationship from the one or more inter-image visually ascertainable relationships has one overlapping visually ascertainable relationship with the intra-image visually ascertainable relationship, wherein the different objects having the intra-image visually ascertainable relationships are located within a single question image;
select an incorrect subset of images comprising a plurality of trap images associated with one or more additional inter-image visually ascertainable relationships of the at least two question images, the additional one or more inter-image visually ascertainable relationships being different from the one overlapping visually ascertainable relationship, the plurality of trap images selected to encourage a syntax or a semantic error by an automated system based on the one or more additional inter-image visually ascertainable relationships of the at least two question images;
render, on the display, a set of candidate answer images, the set of candidate answer images including at least the incorrect subset of images and a correct image, the correct image portraying the overlapping visually ascertainable relationship, wherein the set of candidate answer images exclude the set of question images and variants of images in the set of question images; and determine whether access to one or more electronic resources should be granted based upon an input data set representative of a user selection of at least one answer image from the set of candidate answer images.

* * * * *